United States Patent US 10,928,710 B2
Wynalda, Jr. et al. (45) Date of Patent: Feb. 23, 2021

(54) DEVICE MOUNT

(71) Applicant: Fourth Arrow, LLC, Comstock Park, MI (US)

(72) Inventors: Robert M. Wynalda, Jr., Comstock Park, MI (US); David Wynalda, Belmont, MI (US)

(73) Assignee: Fourth Arrow, LLC, Comstock Park, MI (US)

( * ) Notice: Subject to any disclaimer, the term of this patent is extended or adjusted under 35 U.S.C. 154(b) by 0 days.

(21) Appl. No.: 16/680,165

(22) Filed: Nov. 11, 2019

(65) Prior Publication Data

US 2020/0183258 A1 Jun. 11, 2020

Related U.S. Application Data

(63) Continuation of application No. 16/237,215, filed on Dec. 31, 2018, now Pat. No. 10,474,013, which is a continuation-in-part of application No. 15/359,437, filed on Nov. 22, 2016, now Pat. No. 10,398,139.

(60) Provisional application No. 62/280,068, filed on Jan. 18, 2016, provisional application No. 62/281,559, filed on Jan. 21, 2016, provisional application No. 62/286,102, filed on Jan. 22, 2016, provisional application No. 62/259,562, filed on Nov. 24, 2015, (Continued)

(51) Int. Cl.
*A01M 31/00* (2006.01)
*G03B 17/56* (2021.01)
*F16M 13/02* (2006.01)

(52) U.S. Cl.
CPC .......... *G03B 17/561* (2013.01); *A01M 31/00* (2013.01); *F16M 13/022* (2013.01); *F16M 2200/022* (2013.01); *F16M 2200/06* (2013.01)

(58) Field of Classification Search
None
See application file for complete search history.

(56) References Cited

U.S. PATENT DOCUMENTS 394,856 A * 12/1888 Hendrick ............. A47B 23/042
248/448
3,799,488 A * 3/1974 Sena ...................... A47B 97/08
248/452
(Continued)

*Primary Examiner* — Monica E Millner
(74) *Attorney, Agent, or Firm* — Zollinger & Burleson, Ltd.

(57) ABSTRACT

An adjustable mount for holding equipment or an equipment-holding arm at, for example, a hunting location such as a deer blind or a tree stand includes a base mounting bracket and an adjustable ball joint removably secured to the mounting bracket. The base mounting bracket is secured to something and can be left in place during the hunting season. The ball joint can be removed and taken with the user. In some configurations, the ball joint can be locked in a desired orientation which is maintained when the ball joint is removed from the base mounting bracket so that the desired orientation is reestablished when the user replaces the ball joint in the base mounting bracket. One version of the ball joint includes a piston cylinder used to release locking pressure to allow for adjustment. The piston cylinder can be pneumatic or hydraulic. A configuration of the base mounting bracket can be readily assembled from a collapsed flat configuration. An articulating equipment holding arm with first and second arms provides an adjustable mount for holding equipment.

15 Claims, 60 Drawing Sheets

Related U.S. Application Data provisional application No. 62/275,028, filed on Jan. 5, 2016.

(56) References Cited

U.S. PATENT DOCUMENTS

| | | | | |
|---|---|---|---|---|
| 3,944,279 A * | 3/1976 | Blackstock | A01M 31/02 | 182/187 |
| 5,351,923 A * | 10/1994 | Booth, Jr. | F16M 13/02 | 211/107 |
| 5,622,342 A * | 4/1997 | Mills | F16M 11/42 | 248/126 |
| 5,947,849 A * | 9/1999 | Ellenbaum | A63B 63/083 | 473/483 |
| 6,021,984 A * | 2/2000 | Mills | F16M 11/14 | 248/219.4 |
| 6,220,556 B1 * | 4/2001 | Sohrt | F16C 11/106 | 248/278.1 |
| 6,349,905 B1 * | 2/2002 | Mills | F16M 11/14 | 248/126 |
| 7,975,973 B1 * | 7/2011 | Weeden | F16M 11/14 | 248/216.1 |
| 8,683,909 B1 * | 4/2014 | Copus | F41A 23/16 | 182/127 |
| 9,743,774 B1 * | 8/2017 | Hauser | A47C 9/10 | |
| 9,759,411 B2 * | 9/2017 | Kim | F21V 21/14 | |
| 10,274,130 B2 * | 4/2019 | Balasubramanya | F16M 11/2078 | |
| 10,398,139 B2 * | 9/2019 | Wynalda, Jr. | F16C 11/0695 | |
| 10,473,151 B2 * | 11/2019 | Wynalda, Jr. | F16C 11/103 | |
| 10,474,013 B2 * | 11/2019 | Wynalda, Jr. | A01M 31/00 | |
| 2003/0038218 A1 * | 2/2003 | Eppard | A01M 31/025 | 248/219.4 |
| 2003/0196855 A1 * | 10/2003 | Kvam | E06C 7/14 | 182/129 |
| 2006/0197001 A1 * | 9/2006 | Parker | F16M 11/10 | 248/230.8 |
| 2009/0194367 A1 * | 8/2009 | Smith | F41A 23/16 | 182/129 |
| 2011/0308887 A1 * | 12/2011 | Johnson | A01M 31/02 | 182/187 |
| 2014/0311828 A1 * | 10/2014 | Bassett | A01M 31/02 | 182/124 |

* cited by examiner

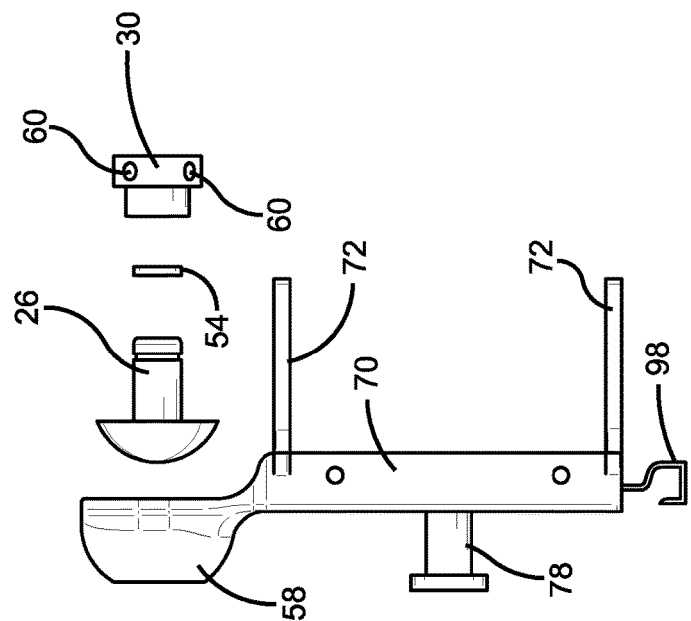
FIG. 1
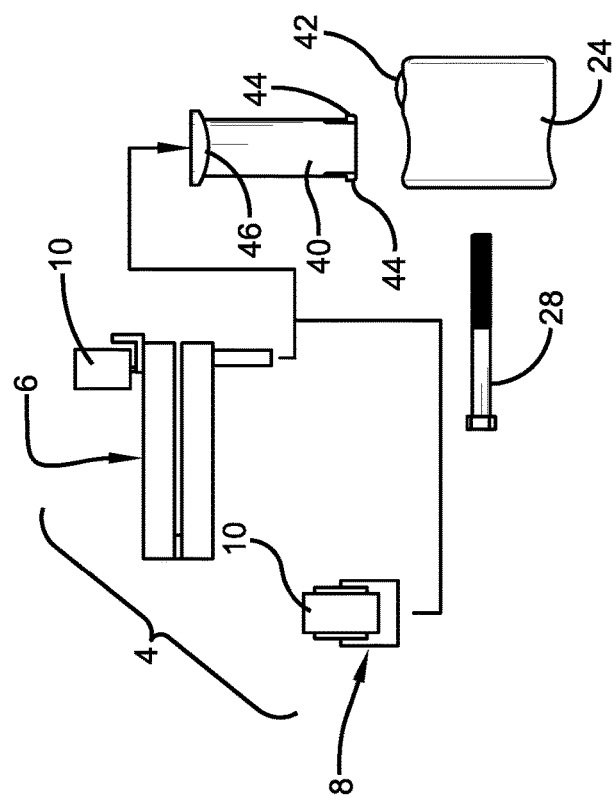
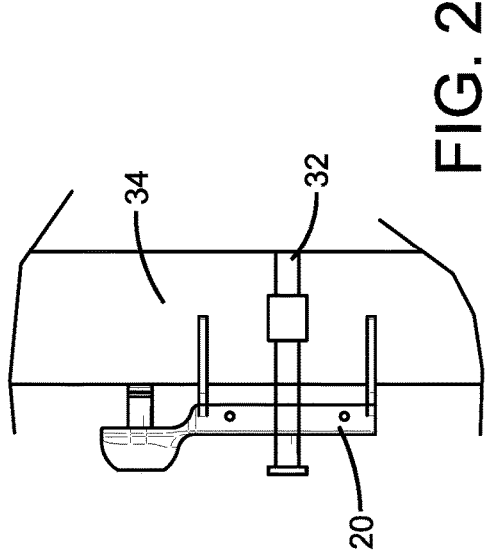
FIG. 2

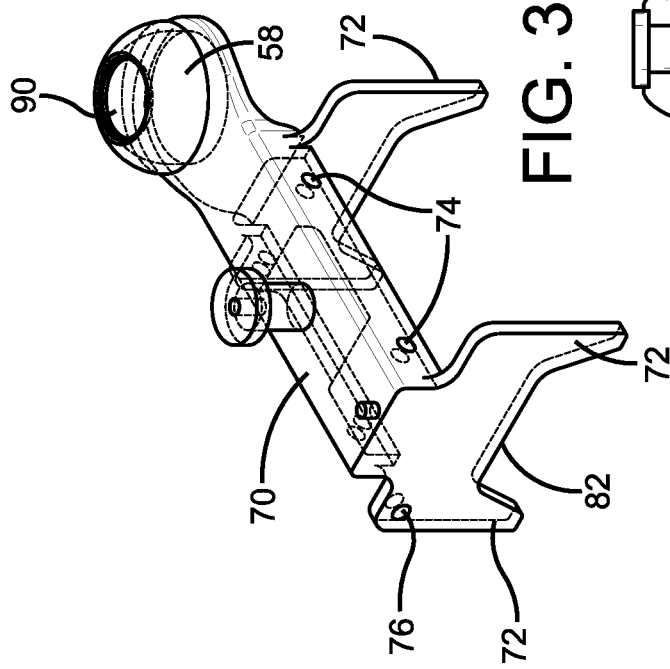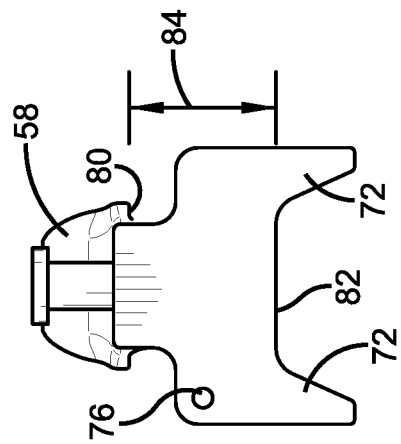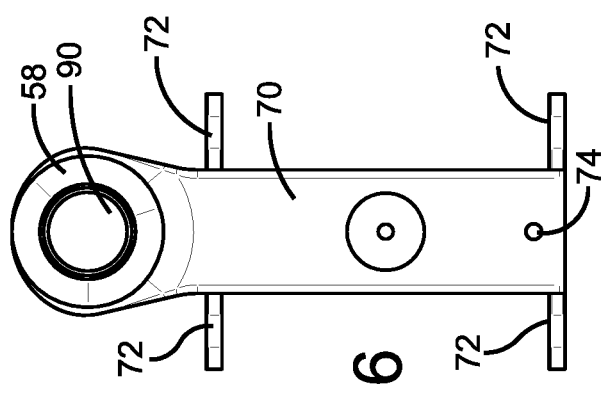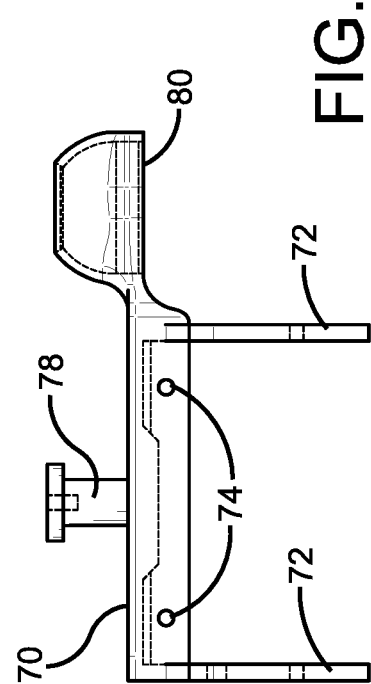

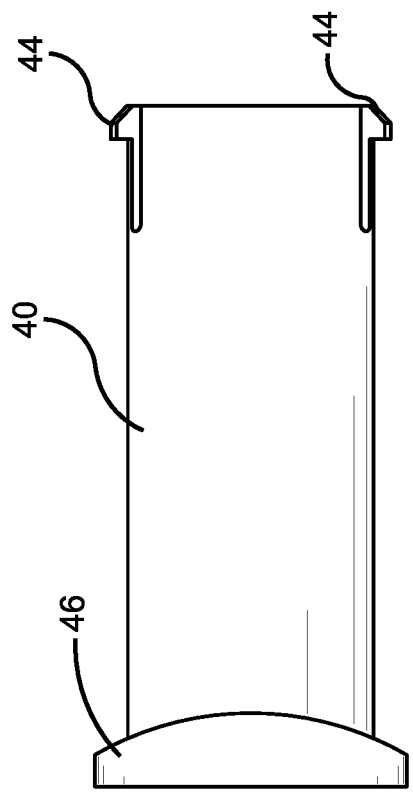
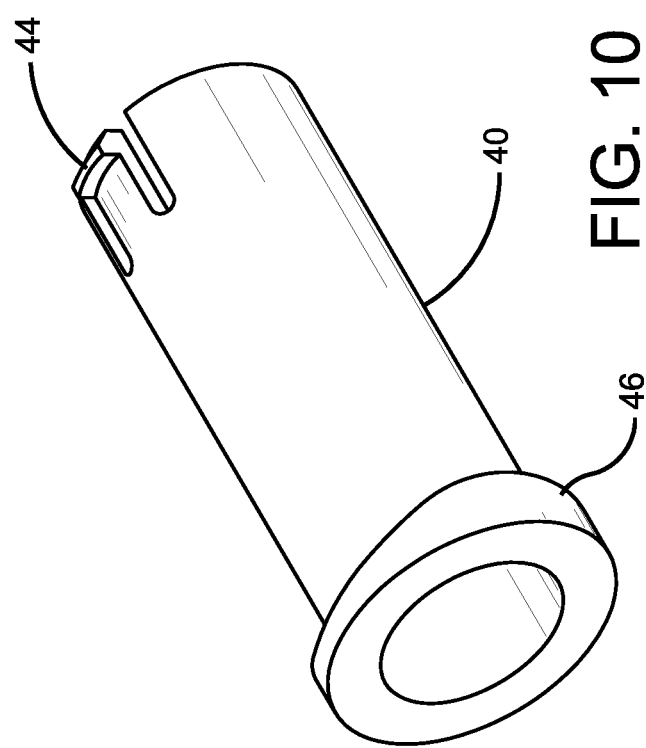
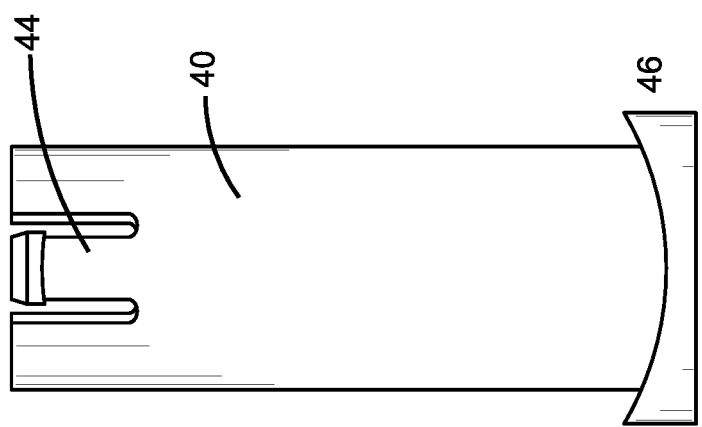

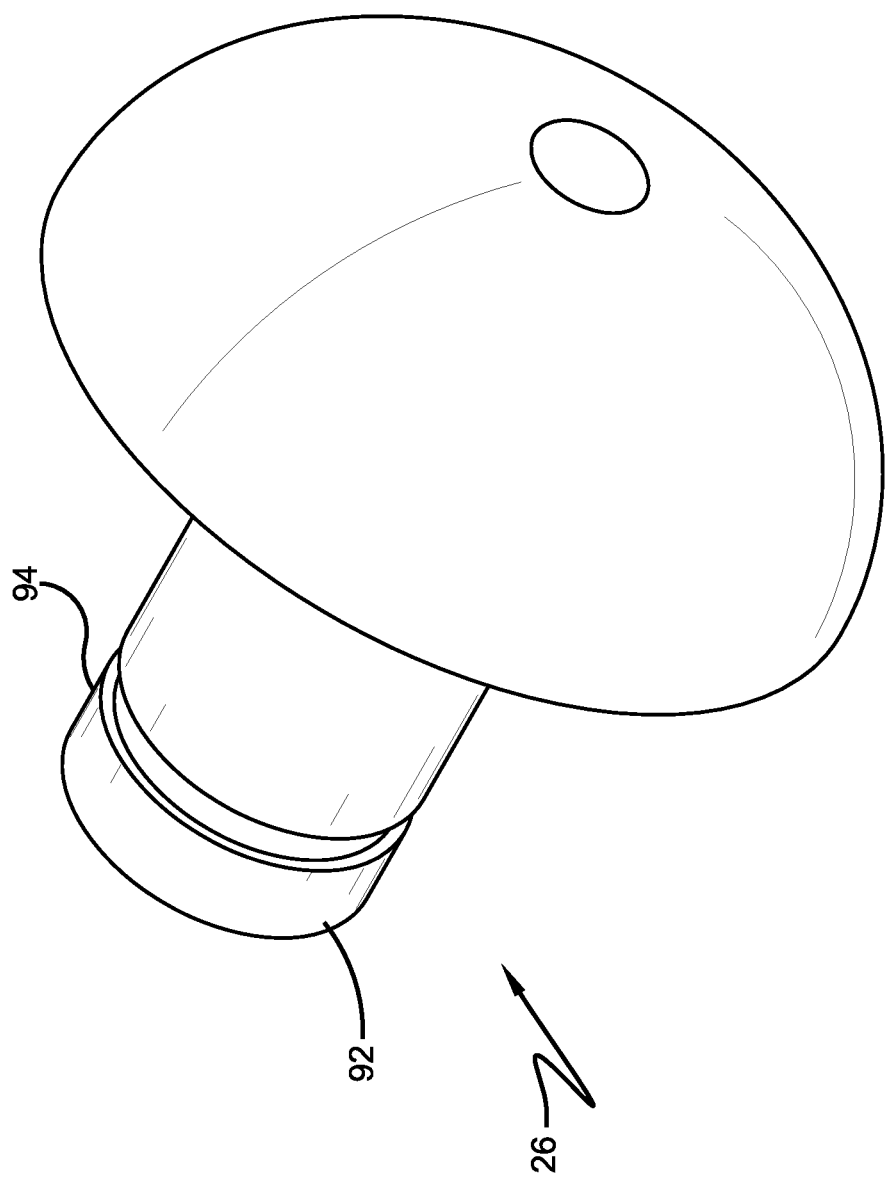

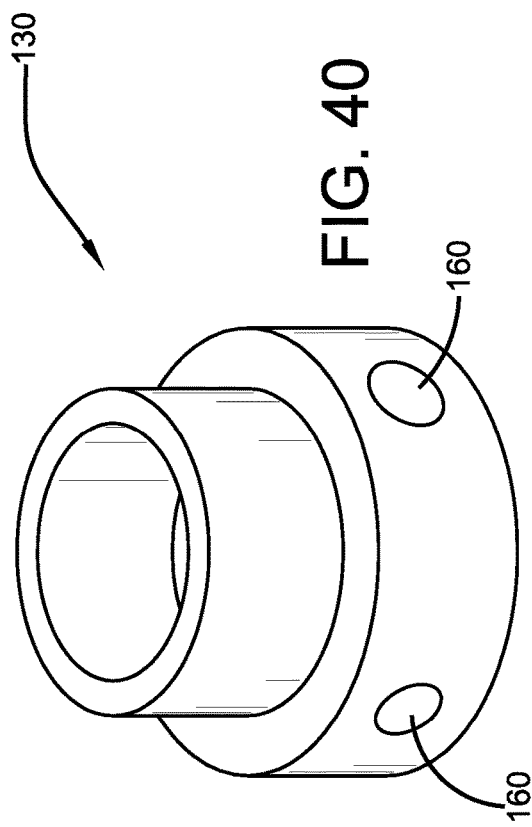
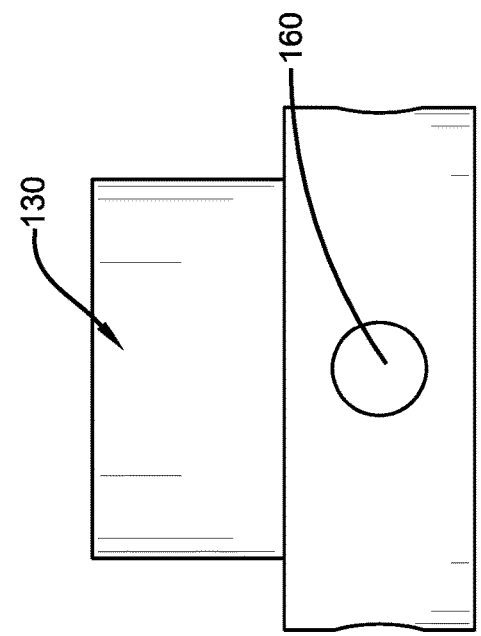
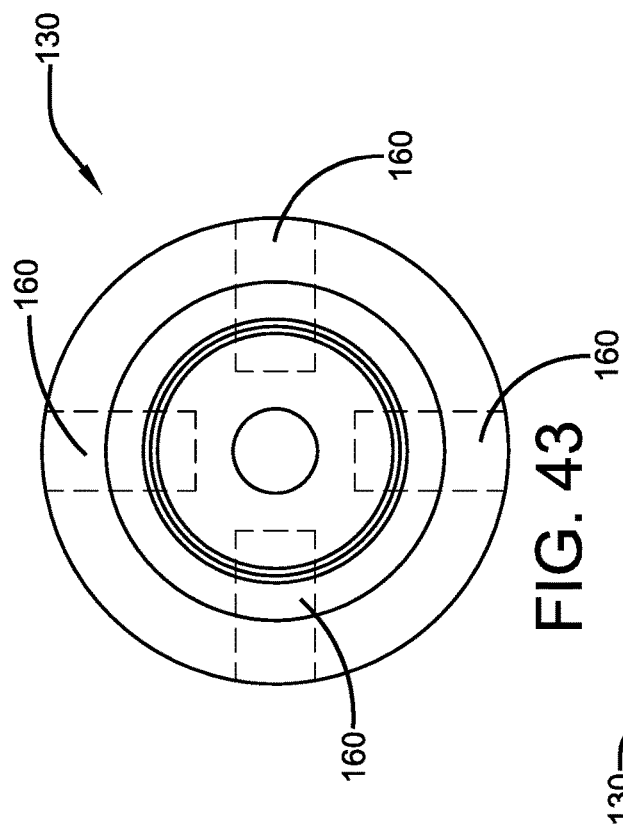
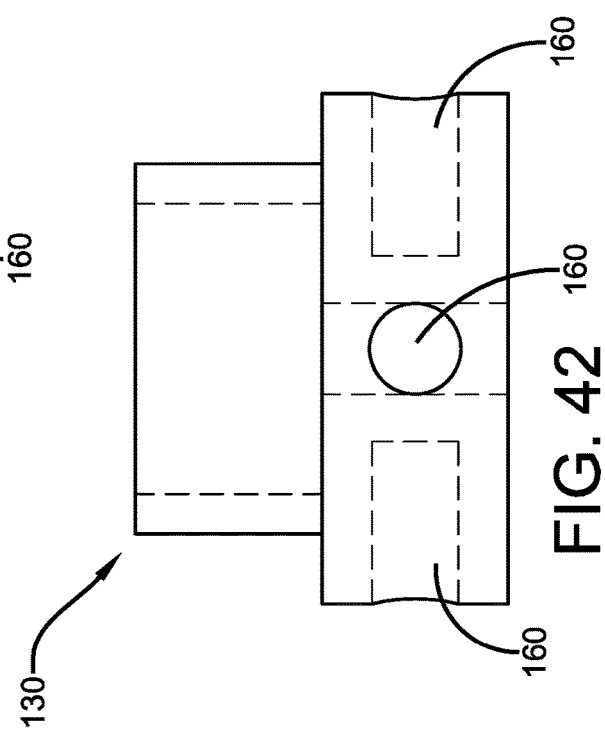
FIG. 40
FIG. 41
FIG. 43
FIG. 42

DEVICE MOUNT

CROSS REFERENCE TO RELATED APPLICATIONS

This application is a continuation application claiming priority to U.S. patent application Ser. No. 16/237,215 filed Dec. 31, 2018, U.S. Pat. No. 10,474,013 issued Nov. 12, 2019, which is a continuation-in-part application claiming priority to U.S. patent application Ser. No. 15/359,437 filed Nov. 22, 2016, U.S. Pat. No. 10,398,139 issued Sep. 3, 2019, which application claims the benefit of U.S. Provisional Patent Applications 62/259,562 filed Nov. 24, 2015, 62/275,028 filed Jan. 5, 2016, 62/280,068 filed Jan. 18, 2016, 62/281,559 filed Jan. 21, 2016, and 62/286,102 filed Jan. 22, 2016; the disclosures of each are incorporated herein by reference.

BACKGROUND OF THE DISCLOSURE

1. Technical Field

The present disclosure generally relates to an adjustable utility mount for mounting or supporting items and device mounts used with the utility mount. The adjustable utility mount includes a base mounting bracket that is separable from the adjustable components of the adjustable utility mount so the user can place a plurality of base mounting brackets at different hunting locations. The disclosure also relates to mounting devices, such as articulating arms, for small electronic devices such as cameras, motion sensors, and lights.

2. Background Information

Mounting a camera or other electronic device in a desirable orientation in an area to be hunted is not an easy task. Traditional tripods placed on the ground are subject to being knocked over by wild game and can spook some game. Cameras can be used to capture images of wild game during the hunt, capture images of what game is on a game trail at different times during the day, or capture images or video of the hunter in action. Motion sensors can provide warnings to a hunter that there is movement along a trail in an area that cannot be directly viewed by the hunter.

Many electronic devices and most cameras that are not built into mobile phones include a threaded opening for mounting the device with a tripod mount screw. When the devices include the threaded opening, a threaded support screw such as a tripod mount screw can be threaded into the opening to secure the device to a mount such as a tripod or a base mounting bracket. New devices built from mobile phones often do not include the threaded openings. These devices are typically held by clamping mounting devices that grasp opposite side of the device.

A hunter often arrives at a tree stand early in the morning before there is enough daylight to accomplish tasks and may have to use a headlamp or flashlight to set up mounts and other items. A hunter thus desires an easy way to mount a camera in a desired location without taking excessive time, without requiring much light, and without making noise. The hunter desires to settle himself in a tree stand with minimal effort and noise to minimize the risk that that game will be warned of his presence by scent, sound, or light. Although a camera mount can be set up and left in a desired location prior to a hunt, the mounts are expensive and subject to theft risk.

The hunter may also wish to use the mount for items other than cameras or in additional to cameras. The utility mount should thus be rugged and substantial enough to support a camouflage draping, to function as a gun rest or a bow rest, or to hold miscellaneous gear. An arm used with the utility mount allows the electronic device to be positioned at an extended position away from the utility mount. Such arms also should be light, quiet, and rugged and capable of supporting items in addition to the electronic device.

SUMMARY OF THE DISCLOSURE

The disclosure provides an adjustable utility mount that allows an electronic device such as a camera to be mounted to another member such as a tree. The adjustable utility mount allows the position of the device to be adjusted through a wide variety of positions to accommodate for mounting locations that are not perfectly level or vertical. In one configuration, a ball joint is provided that allows for 360 degree range of adjustment about one reference axis and significant swivel ranges of adjustment about the other two reference axes. All of the adjustments can be made by loosening a clamp member.

The disclosure also provides a device mount configuration that mounts an electronic device to the adjustable utility mount. The device mount is provided in the form of an extension arm and an articulating extension arm with multiple arm sections.

In one configuration, the disclosure provides an extension arm that uses hollow carbon fiber arm tubes with rigid joint members The disclosure provides an adjustable utility mount that is provided in separable components so that a user can secure an inexpensive tree or base mounting bracket in a desired location and leave the base mounting bracket at the location throughout the hunting season or for a time before it is going to be used during a hunt. The inexpensive base mounting bracket will not be a desirable theft target because it does not include the adjustable components of the mount. The mount is configured to allow the hunter to take the adjustable components with him when he leaves the site. The hunter can place a plurality of base mounting brackets at different locations which allows the hunter to readily move a camera from location to location while readily mounting the camera quickly and easily once the hunter arrives at the new location. This also allows the hunter to mount a camera without using a relatively loud ratchet strap upon arriving at the hunt location.

The components of the mount can be fabricated from a metal such as aluminum, steel, or stainless steel; carbon fiber; ceramic; and/or plastic.

In one configuration, the disclosure provides a mount for an electronic device. The mount has a base mounting bracket having a plurality of feet that allow the base mounting bracket to be seated against an uneven surface such as a tree trunk or a tree branch. The base mounting bracket includes a cleat that receives the two ends of a ratchet strap that is used to tightly strap the base mounting bracket to a tree trunk, a tree branch, a ground pole, or another stable structure that will support the utility mount. The base mounting bracket does not carry any of the active adjustment components of the utility mount. The active adjustment components include inner and outer portions of a ball joint that are selectively positioned and clamped in place with respect to the base mounting bracket. A portion of the ball joint is adapted to receive electronic device mount such as an arm, a clamp, or a stick on which the electronic device is carried. An insert can be used to allow the ball joint to be used with different device mounts.

The disclosure provides an adjustable utility mount in one configuration wherein the base mounting bracket defines a ball joint cup about which inner and outer portions of a ball joint can be adjusted and then clamped. The user can remove the inner and outer portions of the ball joint from the base mounting bracket without removing the base mounting bracket from its mounted location. This allows the user to take the ball joint portions with him to prevent theft and to allow the user to install these portions of the ball joint on another base mounting bracket at a different location.

The disclosure also provides an adjustable mount in another configuration wherein the base mounting bracket removably receives a ball joint cup about which inner and outer portions of a ball joint can be adjusted and then clamped. The user can remove the ball joint cup and the inner and outer portions of the ball joint from the base mounting bracket without removing the base mounting bracket from its mounted location. This allows the user to take the entire ball joint with him to prevent theft and to allow the user to install the ball joint on another base mounting bracket at a different location. This configuration also includes a simplified configuration for the base mounting bracket.

The disclosure also provides a base mounting bracket configuration that can be shipped in a disassembled configuration and assembled by the user. The base mounting bracket is formed from inexpensive items to encourage users to mount a plurality of base mounting brackets for use with the ball joint.

The disclosure provides an outer portion of a ball joint that holds the head of the clamping bolt so the clamping bolt does not rotate with respect to the outer portion of the ball joint when the handle is tightened.

The disclosure provides an inner portion of a ball joint that is secured to a handle so they can be removed as a unit.

The disclosure provides a base mounting bracket with a hook that allows gear to be hung from the base mounting bracket.

The disclosure provides a mounting arm configured to hold an electronic device such as a camera. In one configuration, a pair of arm sections are pivotably held together to define an articulating arm.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 1 is an exploded view of a first configuration of an adjustable utility mount with the device mount arm being depicted schematically.

FIG. 2 depicts the base mounting bracket secured to a tree trunk.

FIG. 3 is a perspective view of a first configuration of a base mounting bracket.

FIG. 4 is an end view of FIG. 3.

FIG. 5 is a side view of FIG. 3.

FIG. 6 is a front view of FIG. 3.

FIG. 10 is a perspective view of a first configuration of an insert that receives the device mount.

FIG. 11 is a front view of FIG. 10.

FIG. 12 is a side view of FIG. 10.

FIG. 13 is a perspective view of the first configuration of the inner portion of the ball joint.

FIG. 40 is a perspective view of a second configuration of the handle used to tighten the locking bolt shown in FIG. 24.

FIG. 41 is a side view of FIG. 40.

FIG. 42 is another side view of FIG. 40.

FIG. 43 is a top plan of FIG. 40.

Similar numbers refer to similar parts throughout the specification.

DETAILED DESCRIPTION OF THE DISCLOSURE

Figure 7:
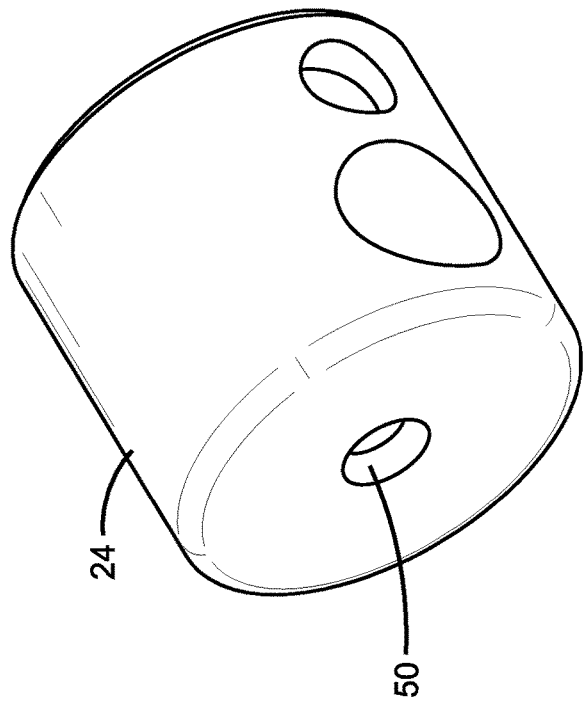
FIG. 7 is a perspective view of a first configuration of an outer portion of the ball joint.
Figure 8:
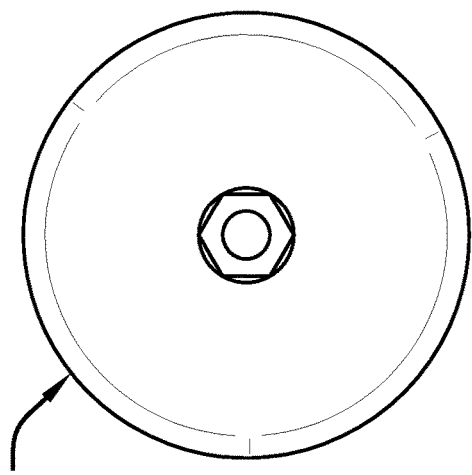
FIG. 8 is an end view of FIG. 7.
Figure 9:
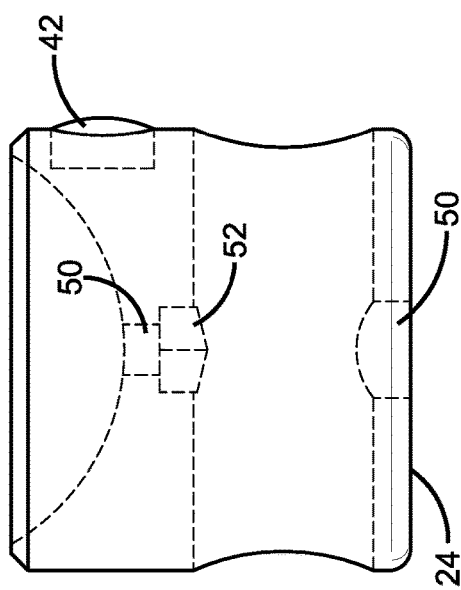
FIG. 9 is a side view of FIG. 7.
Figure 14:
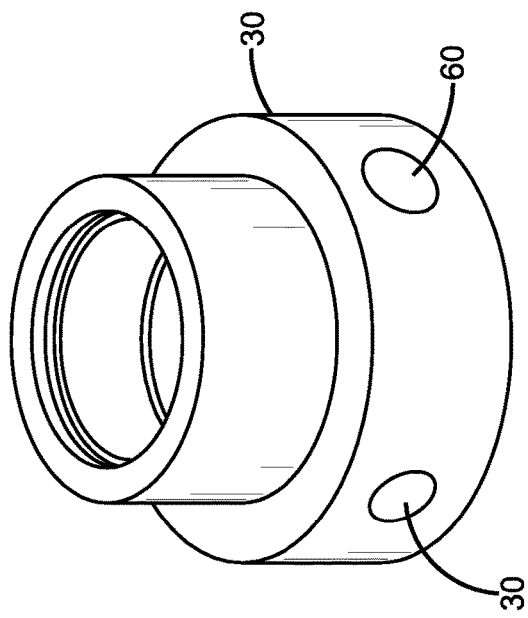
FIG. 14 is a perspective view of a first configuration of a handle used to tighten the locking bolt shown in FIG. 1.
Figure 15:
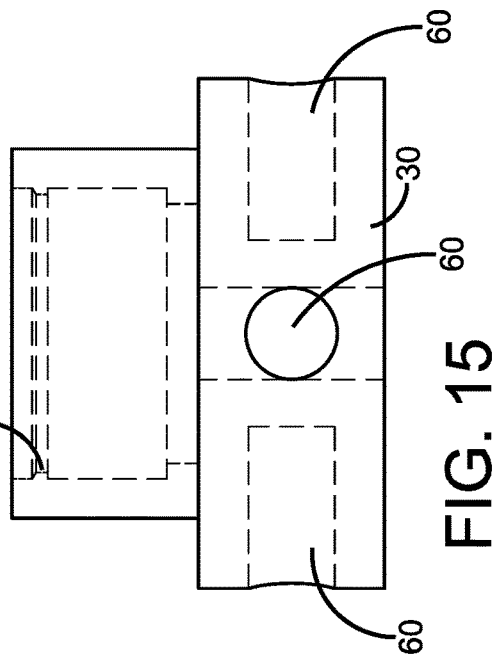
FIG. 15 is a side view of FIG. 14.
Figure 16:
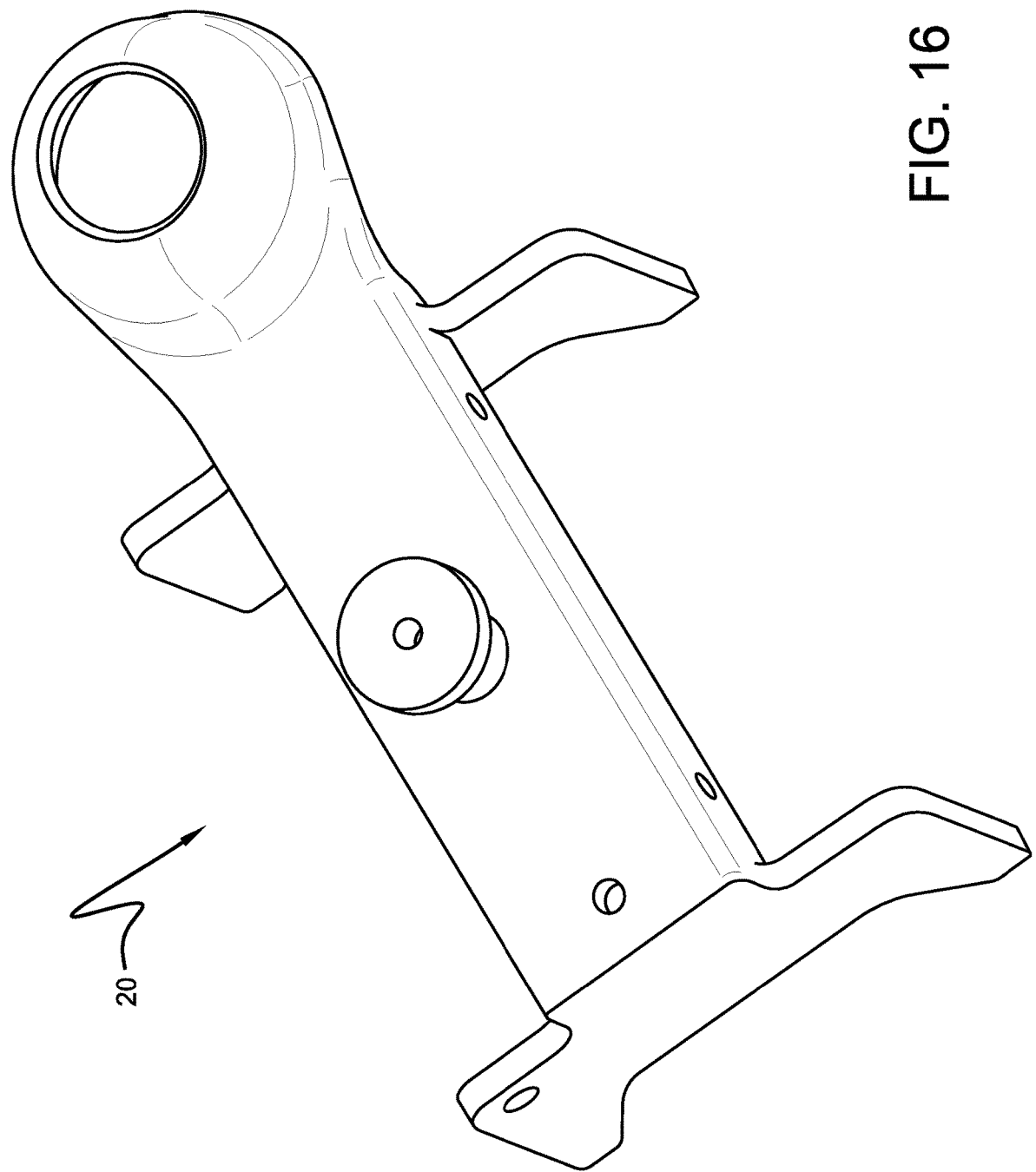
FIG. 16 is a perspective view of the first configuration of the base mounting bracket.
Figure 17:
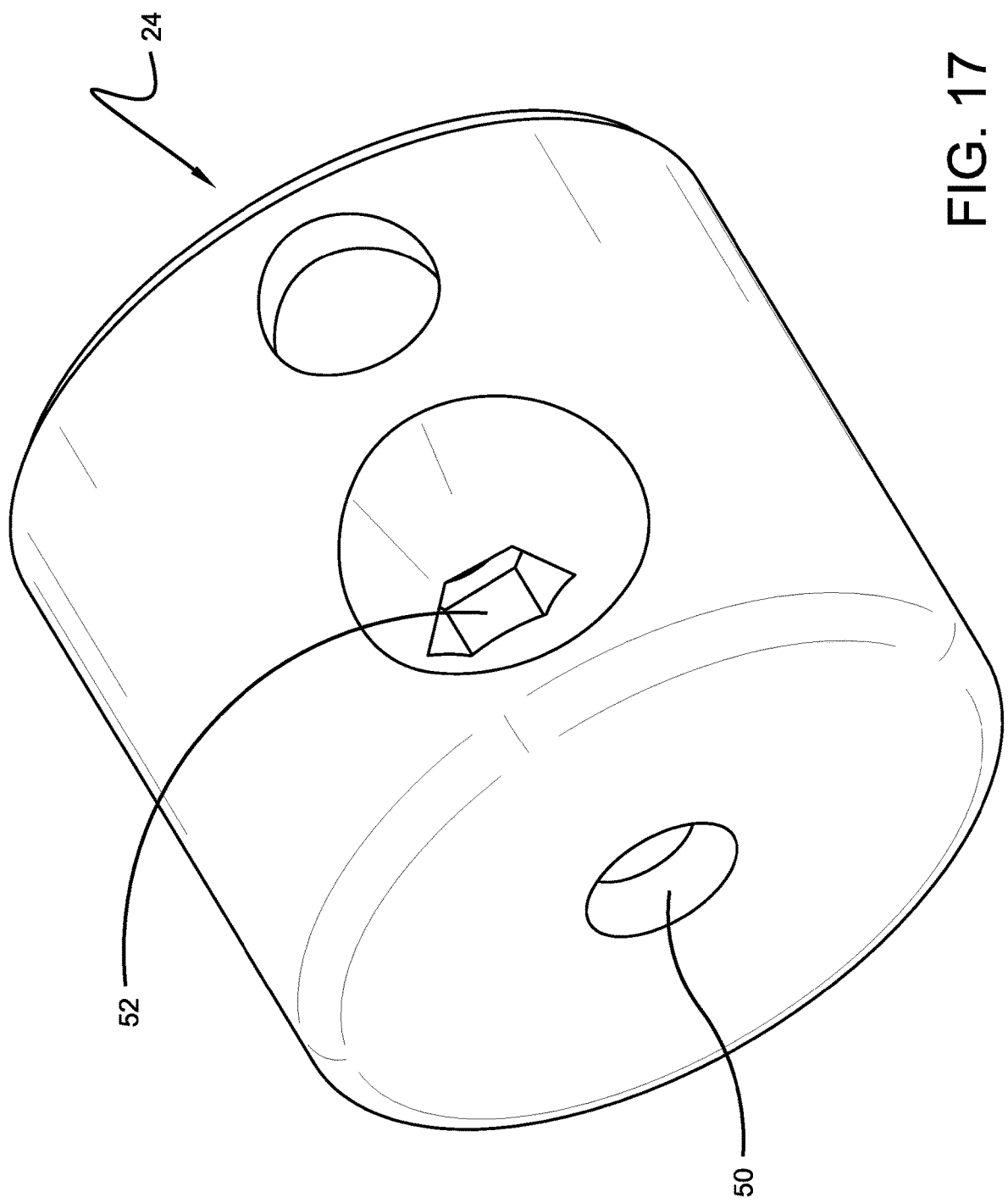
FIG. 17 is a first perspective view of the first configuration of the outer portion of the ball joint.
Figure 18:
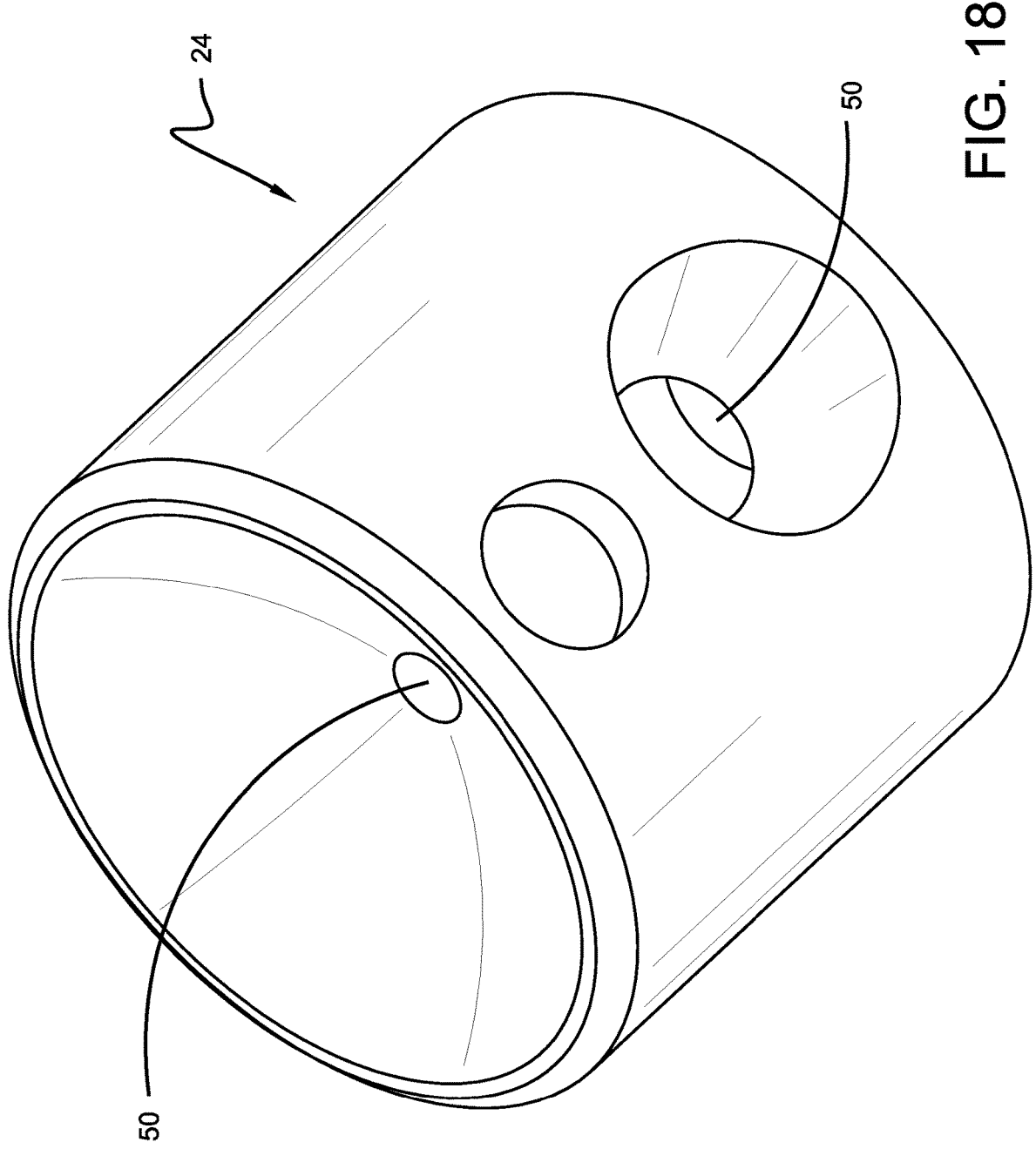
FIG. 18 is second perspective view of the first configuration of the outer portion of the ball joint.
Figure 19:
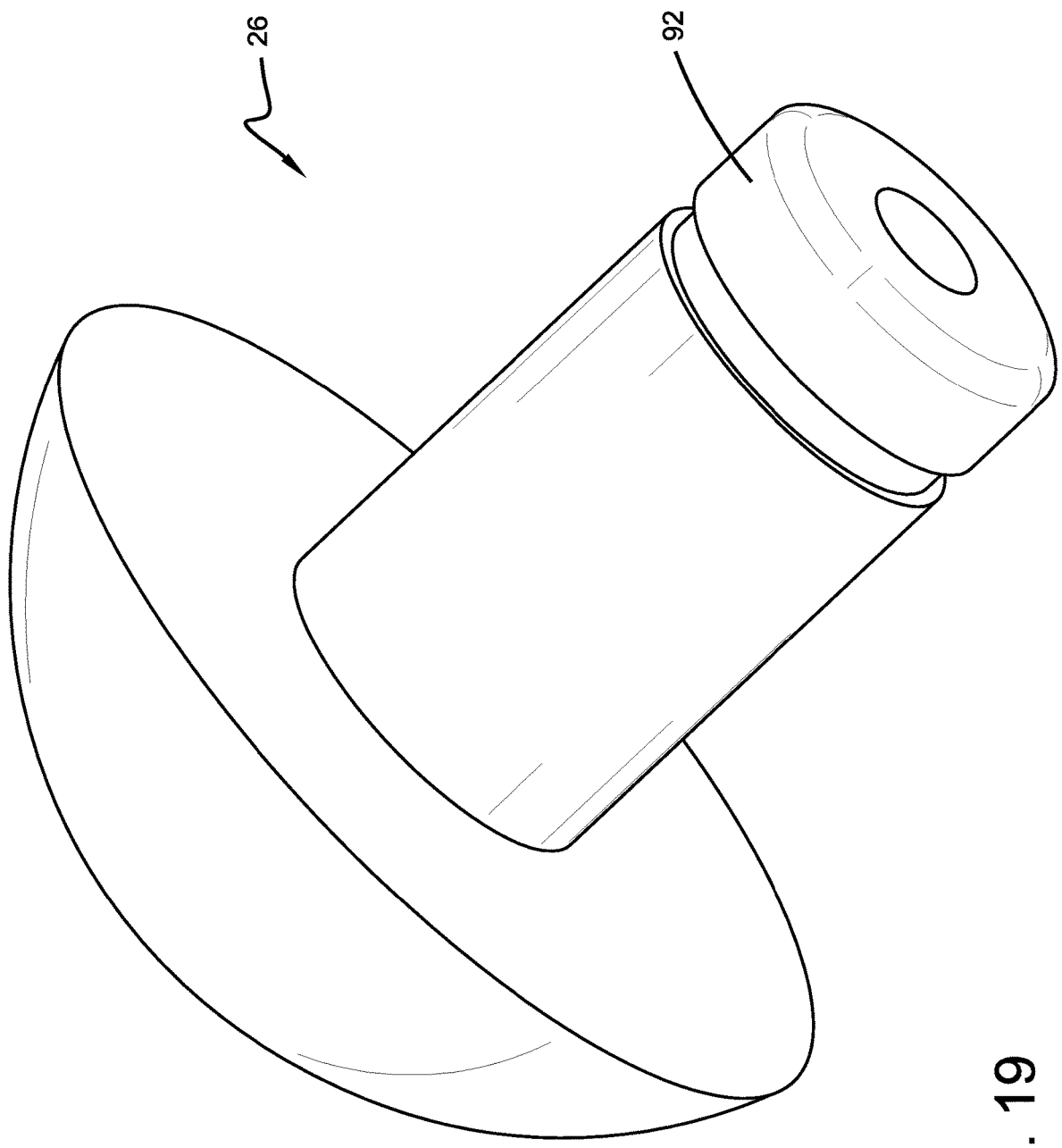
FIG. 19 is a perspective view of the first configuration of the inner portion of the ball joint.
Figure 20:
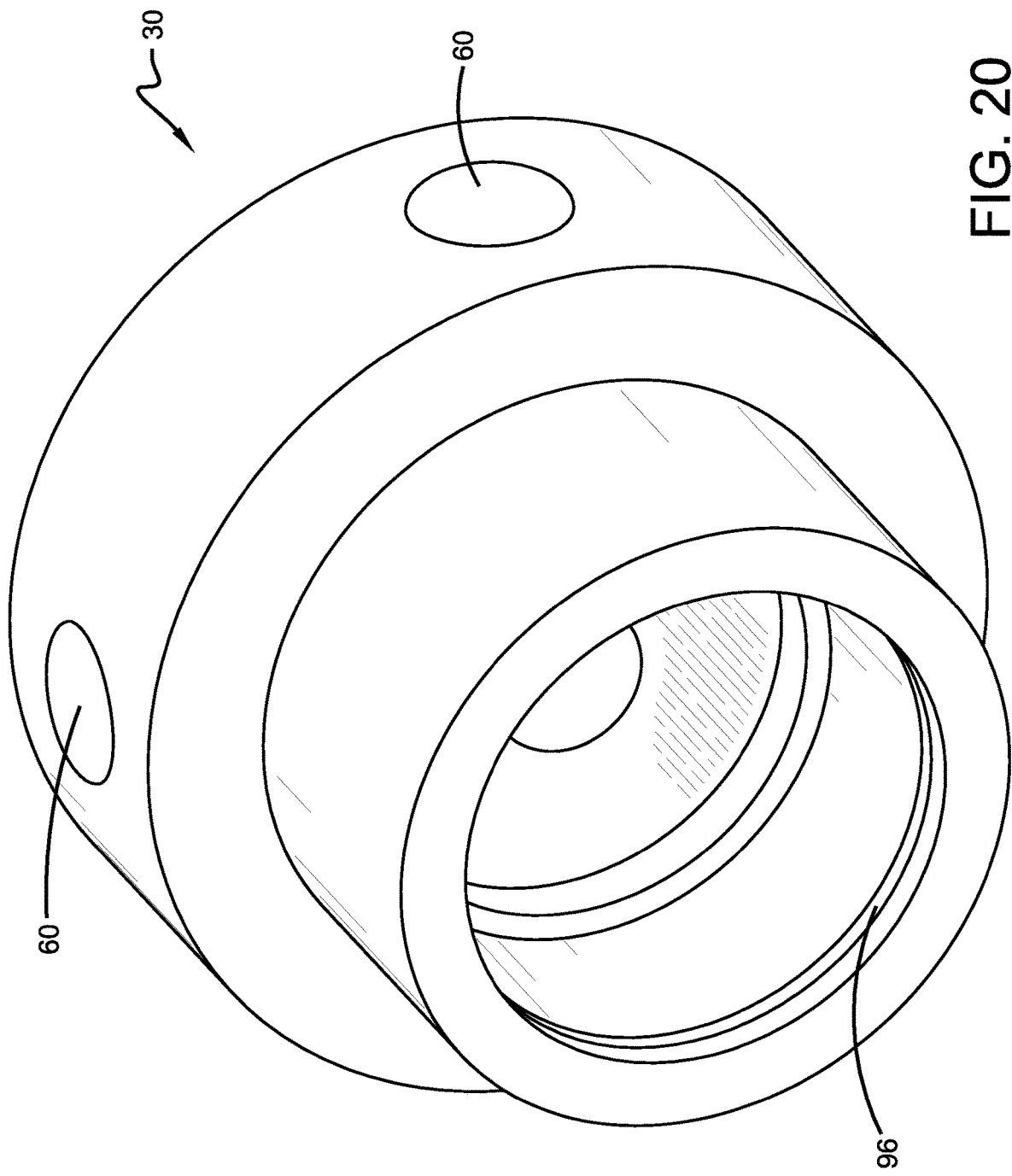
FIG. 20 is a perspective view of the first configuration of the handle.
Figure 21:
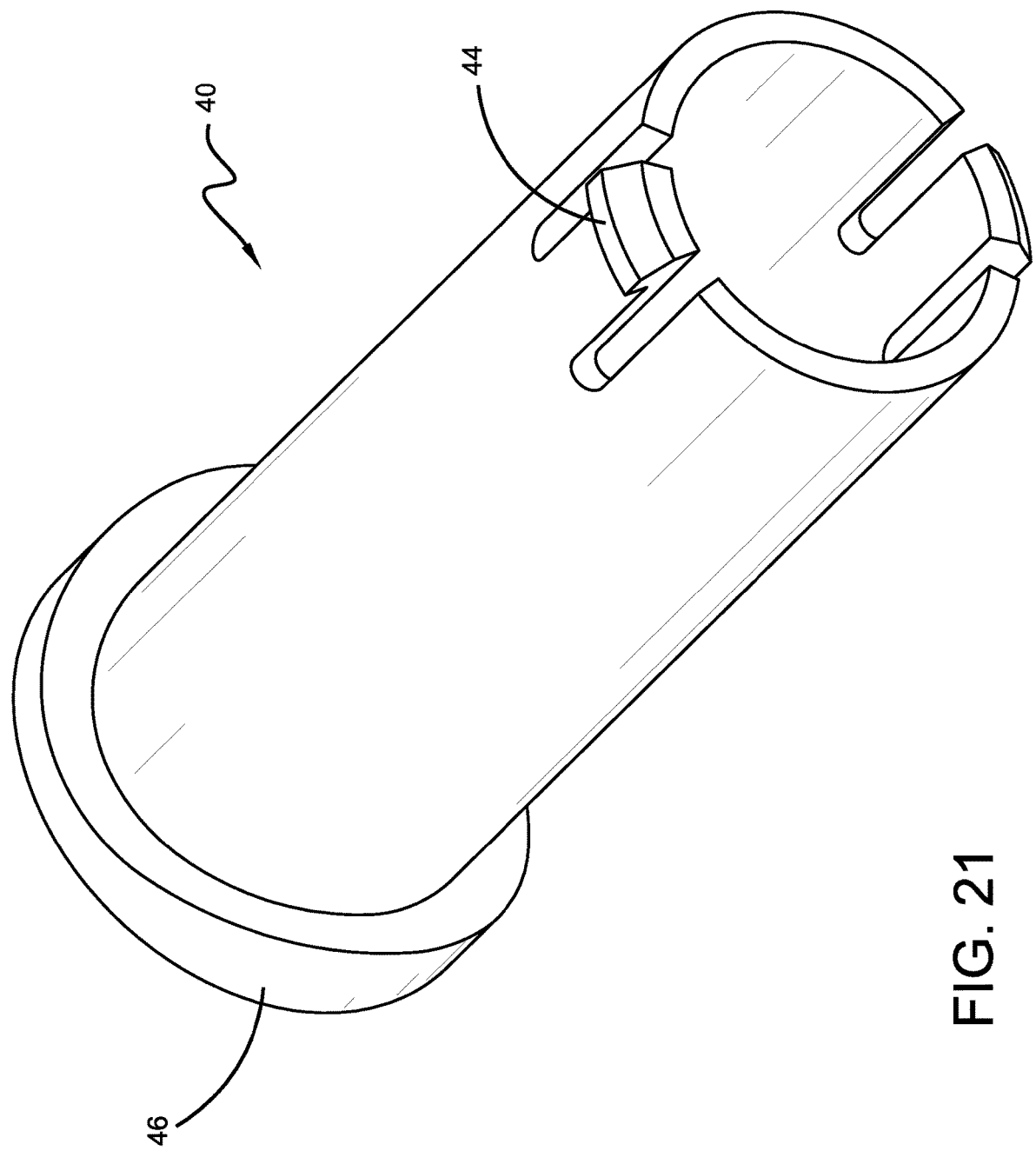
FIG. 21 is a perspective view of the first configuration of the insert.
Figure 22:
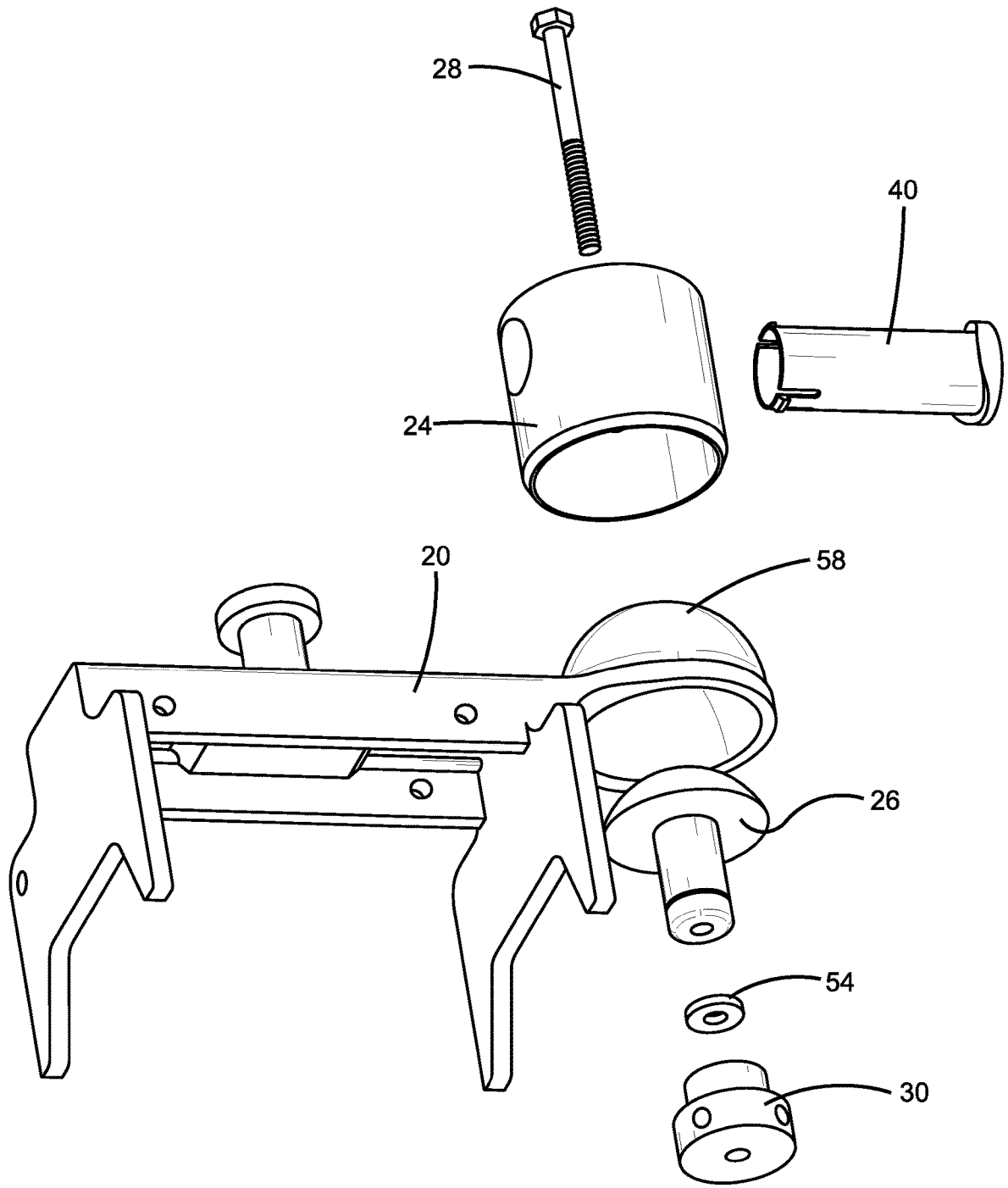
FIG. 22 is an exploded perspective view of the first configuration of the utility mount.

FIG. 1 depicts a first exemplary configuration for the adjustable utility mount which is indicated generally by the reference numeral 2. Adjustable mount 2 is used with a device mount 4 such as an articulating arm 6, a clamping holder 8 (or combination of both), a stick, or an arm that carries a device 10 such as a camera, a motion detector, or a light that is being mounted with adjustable utility mount 2. Adjustable utility mount 2 can also be used to support camouflage, used as a gun rest, used as a bow rest, or to support other gear. Adjustable utility mount 2 generally includes a base mounting bracket 20, a ball joint having an outer portion 24 and an inner portion 26. A clamp member 28 extends through outer portion 24 of the ball joint, base mounting bracket 20, and inner portion 26 of the ball joint. In the exemplary configuration, clamp member 28 is a threaded member or bolt that threadedly engages a handle 30 that is used to tighten the ball joint against base mounting bracket 20. Rotating clamp member 28 until the ball joint is secured in place is when the clamp member 28 is in a clamped condition. Rotating clamp member 28 until ball joint is loose and can be adjusted is when the clamp member is in the unclamped condition. An option includes an inner ball joint portion that integrally includes the handle. As an option, base mounting bracket 20 can include a ratchet strap 32 that is used to secure base mounting bracket 20 to a tree trunk 34, a tree branch, a ground mount, or another stable structure to which utility mount 2 is to be secured. Strap 32 also can be provided by the user as an independent item. The adjustability of the ball joint allows base mounting bracket 20 to be mounted a tree trunk or tree branch or other member that is disposed at essentially any angle and orientation to level because the combination of the ball joint and the manner in mounting base mounting bracket 20 provides a large degree of adjustability for the electronic device 10 that is being carried by mount 2.

In this exemplary configuration of mount 2, an insert 40 is carried by outer portion 24 of the ball joint in a releasable snap fit. Insert 40 is designed to receive the anchor of device mount 4. Insert 40 can be made from a hard plastic material such as polyoxymethylene. Insert 40 also can be used to prevent clamping bolt 28 from falling out of outer portion 24 of the ball joint when the user is disassembling ball joint. A bubble level 42 is carried by outer portion 24 of the ball joint to allow the user to position insert in a vertical arrangement.

Insert 40 includes flexible locking feet 44 that snap fit over the bottom edge of outer portion 24 of the ball joint when insert is fully inserted. The top of insert 40 is a flange 46 having a curved bottom surface that matches the curved surface of outer portion 24 of the ball joint to lock the position of insert 40 with respect to outer portion 24 of the ball joint when insert 40 is fully inserted. Insert 40 defines a through hole that receives the anchor of device mount 4 in a 360 degree rotation arrangement and a thumb screw or friction may be used to hold the position of the anchor with respect to insert 40. Alternatively, the inner surfaces of locking feet 44 may be configured to grip the anchor to limit such rotation.

Outer portion 24 of the ball joint defines a bolt hole 50 that receives clamping bolt 28. Outer portion 24 defines a pocket 52 that receives the head of clamping bolt 28 to prevent clamping bolt 28 from rotating when the head of clamping bolt 28 is received in pocket 52.

Clamping bolt 28 extending through inner portion 26 of the ball joint, through a washer 54, and threadedly engages handle 30 which is used to clamp inner 26 and outer 24 portions of the ball joint against a ball joint cup 58 defined by base mounting bracket 20. Handle 30 defines openings 60 that allow the user to insert a wrench to apply torque to handle 30 as needed to tighten the ball joint. The wrench can be a standard Allen key or a lever arm that, once inserted into an opening 60, allows considerable torque to be applied to handle 30. Optionally, handle 30 defines a threaded opening for a set screw that locks clamping bolt 28 in place.

An advantage of the mounts described herein are that the main adjustable components of the ball joint are readily removable from the base mounting bracket. This allows the user to take ball joint with him when he leaves the hunting stand and makes the base mounting bracket which can be left behind for use on another day less of a theft target. This configuration and the other configurations described below also allow the hunter to quickly and quietly set up equipment upon reaching a hunt location. Mounting a camera with these systems can be accomplished with a single connection that can be locked quietly. The hunter does not need to use a loud ratcheting belt to mount the assembly to a tree because this step of the process has been performed earlier. These configurations also allows the user to purchase multiple relatively inexpensive base mounting brackets and place them at different locations where camera mounts are desired. Base mounting brackets can be sold relatively inexpensively because it does not carry the adjustment components of the mount. An advantage of the mount configurations described below wherein the entire ball joint is removed for the base mounting bracket is also that the hunter can lock in the position of the ball joint to a desired location and then take the ball joint with him in the locked position. When the hunter returns to the hunt site for the hunt, the ball joint is put into the base mounting bracket and it is already in the desired configuration.

Base mounting bracket 20 includes a base 70 with four legs 72. Each leg 72 has triangular portions define a tapered pocket to receive a rounded portion of a tree trunk or tree branch. Legs 72 are the same length so that base mounting bracket 20 can be mounted to a flat surface as well. Body 70 defines a plurality of threaded openings 74 that allow accessories to be mounted to body 70. Body 70 also defines a through hole 76 in a lower leg 72 that can hold the torque wrench used to tighten handle 30. Body 70 also includes a cleat 78 used to receive strap 32 that secured base mounting bracket 20 to the tree trunk or branch. Cleat 78 can include a flange to help prevent the strap from slipping off of base mounting bracket 20.

As described above, base mounting bracket 20 includes ball joint cup 58. The rear surface 80 of the ball joint cup 58 is spaced from the inner surfaces 82 of feet 72 a distance 84 sufficient to allow handle 30 and inner portion 26 of the ball joint to be operated and removed from base mounting bracket 20 without removing base mounting bracket 20 from its mounted condition. Distance 84 is thus longer than the combined length of handle 30 and inner portion 26 when assembled. Ball joint cup 58 has an inner surface that matches the rounded front surface of inner portion 26 of the ball joint. Ball joint cup 58 has an outer surface that matches the inner curved surface of outer portion 24 of the ball joint. Ball joint cup 58 defines a large opening 90 that allows clamping bolt 28 and ball joint portions 24 and 26 to swivel with respect to ball joint cup 58. Outer portion also can rotate 360 degrees about the axis of bolt 28 (the longitudinal axis of the ball joint) when it is in any of its possible swivel positions. The swivel movement can be combined with the rotation to allow the position of outer portion 24 to be fully adjustable.

Inner portion 26 of the ball joint includes a stem 92 that receives handle 30. Handle 30 defines a threaded bore that threadedly engages the threaded end of clamping bolt 28. Rotation of handle 30 along clamping bolt 28 pulls outer portion 24 against ball joint cup 58 and pushes inner portion 26 into ball joint cup 58 to frictionally lock the ball joint. The end of stem 92 abuts washer 54 within handle 30. Stem 92 defines a recess 94 that receives a ridge 96 on handle 30 so that handle 30 can fully rotate about stem 92. Handle 30 can also be used to pull inner portion 26 away from clamping bolt 28 after handle 30 is rotated off of the threads of clamping bolt 28.

Base mounting bracket 20 can be provided in shapes other than the exemplary configuration depicted in the drawings. In one alternative configuration, base mounting bracket 20 is in the form a rectangular box 120 (FIG. 23) with cleat 178 formed from a portion of the front wall of the box. In other configurations, a hook 98 (FIG. 1) can be provided at the bottom of base mounting bracket 20 to allow the user to hang various items from base mounting bracket 20 as needed. Hook 98 can be formed from a portion of base mounting bracket 20, can be connected with fasteners or a weld, or can be a removable hook 98. Multiple hooks 98 can be provided at the bottom of base mounting bracket 20 in the same or different sizes.

Figure 23:
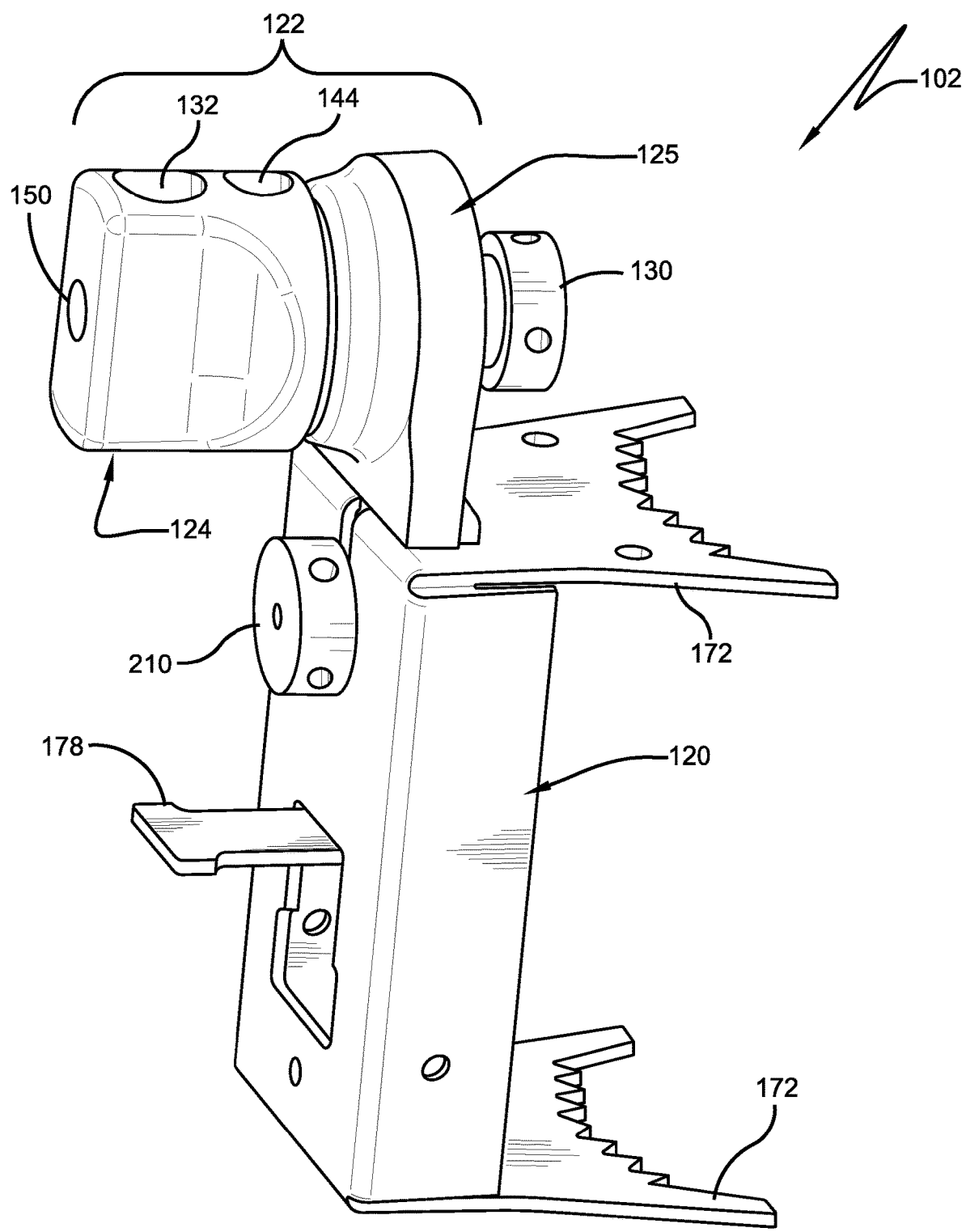
FIG. 23 is a perspective view of a second configuration of an adjustable utility mount.
Figure 24:
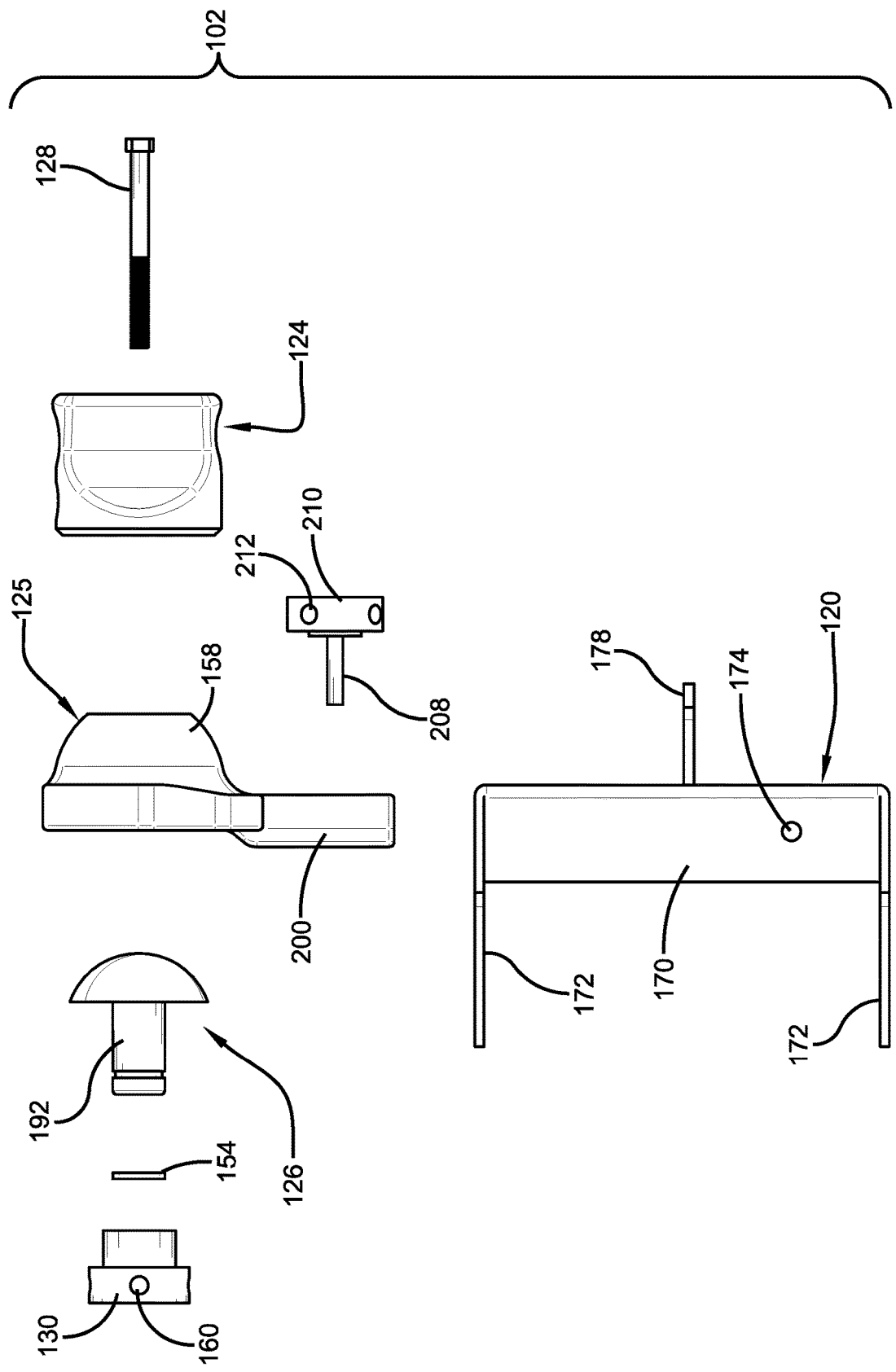
FIG. 24 is an exploded view of the second configuration of the adjustable utility mount.

FIG. 23 depicts a second exemplary configuration for the adjustable utility mount which is indicated generally by the reference numeral 102. Adjustable mount 102 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 102. Adjustable utility mount 102 can also be used to support camouflage, used as a gun rest, used as a bow rest, or to support other gear. Adjustable utility mount 102 generally includes a base mounting bracket 120, a ball joint 122 having an outer portion 124, a center portion or ball joint cup 125, and an inner portion 126. A clamp member 128 extends through outer portion 124, center portion 125, and inner portion 126. Clamp member 128 is a threaded member of bolt that threadedly engages a handle 130 that is used to tighten ball joint 122 to a clamped configuration. In this exemplary configuration, clamp member 128 is a threaded member or bolt that threadedly engages a handle 130 that is used to tighten ball joint 122. Rotating clamp member 128 until the ball joint is secured in place is when the clamp member 128 is in a clamped condition. Rotating clamp member 128 until ball joint is loose and can be adjusted is when the clamp member is in the unclamped condition. An option includes an inner ball joint portion that integrally includes the handle. Also as an option, base mounting bracket 120 can include a ratchet strap 32 (see FIG. 1) that is used to secure base mounting bracket 120 to a tree trunk 34, a tree branch, a ground mount, or another stable structure to which utility mount 2 is to be secured. This strap also can be provided by the user as an independent item. The adjustability of the ball joint 122 allows base mounting bracket 120 to be mounted to a tree trunk or tree branch or other member that is disposed at essentially any angle and orientation to level because the combination of the ball joint 122 and the manner in mounting base mounting bracket 120 provides a large degree of adjustability for the electronic device 10 that is being carried by mount 102.

In this second exemplary configuration of utility mount 102, outer portion 124 of the ball joint 122 defines an opening 132 configured to directly receive the anchor rod 134 of device mount 104 in a sliding and rotating configuration. Alternatively, outer portion 124 can be configured to receive insert 40 described above. A bubble level 142 can be carried in a recess 144 defined by outer portion 124 to allow the user to determine the position of outer portion 124 with respect to level.

Outer portion 124 of the ball joint 122 defines a bolt hole 150 that receives clamping bolt 128. Outer portion 124 defines a pocket 152 that receives the head of clamping bolt 128 to prevent clamping bolt 128 from rotating when the head of clamping bolt 128 is received in pocket 152.

Clamping bolt 128 extends through center portion 125, through inner portion 126 of the ball joint 122, through a washer 154, and threadedly engages handle 130 which is used to clamp inner 126 and outer 124 portions of the ball joint 122 against center portion 125 which defines a ball joint cup. Handle 130 defines openings 160 that allow the user to insert a wrench to apply torque to handle 130 as needed to tighten ball joint 122. The wrench can be a standard Allen key or a lever arm that, once inserted into an opening 160, allows considerable torque to be applied to handle 130. Optionally, handle 130 defines a threaded opening for a set screw that locks clamping bolt 128 in place.

An advantage of mount 102 is that the main adjustable components making up ball joint 122 are readily removable from base mounting bracket 120. This allows the user to take ball joint 122 with him when he leaves the hunting stand and makes base mounting bracket 120 less of a theft target. This configuration also allows the user to purchase multiple relatively inexpensive base mounting brackets 120 and place them at different locations where camera mounts are desired. Base mounting bracket 120 can be sold relatively inexpensively because it does not carry the adjustment components of mount 102.

Base mounting bracket 120 includes a base 170 with four legs 172. Each leg 172 has triangular portions define a tapered pocket to receive a rounded portion of a tree trunk or tree branch. Teeth can extend from legs 172 into this tapered pocket to provide grip for base mounting bracket 120. Legs 172 are the same length so that base mounting bracket 120 can be mounted to a flat surface as well. Body 170 defines a plurality of threaded openings 174 that allow accessories to be mounted to body 170. Body 170 also defines through holes 176 in a leg 172 that can hold the torque wrench used to tighten handle 130. Body 170 also includes a cleat 178 used to receive strap 32 that secured base mounting bracket 120 to the tree trunk or branch. Cleat 178 can include a flange to help prevent the strap from slipping off of base mounting bracket 120.

Figure 26:
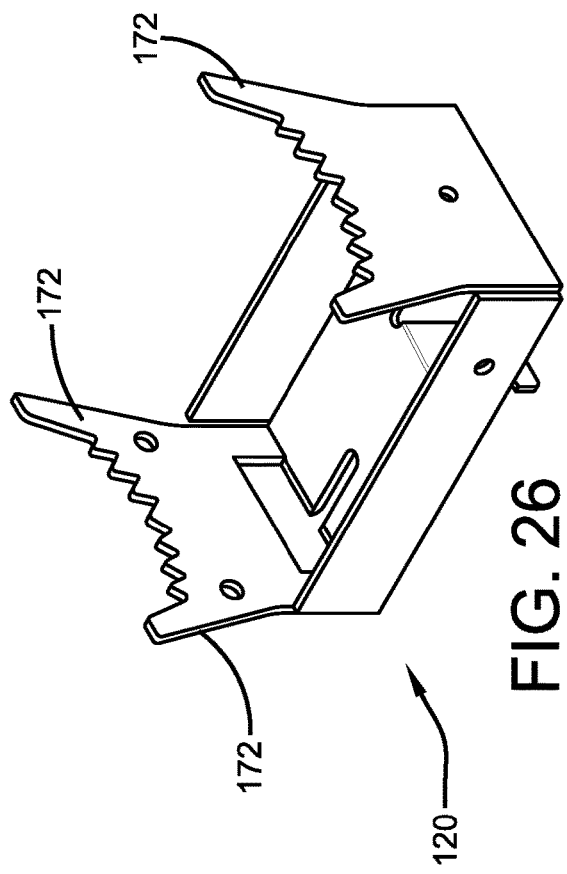
FIG. 26 is a rear perspective view of a second configuration of the base mounting bracket.
Figure 27:
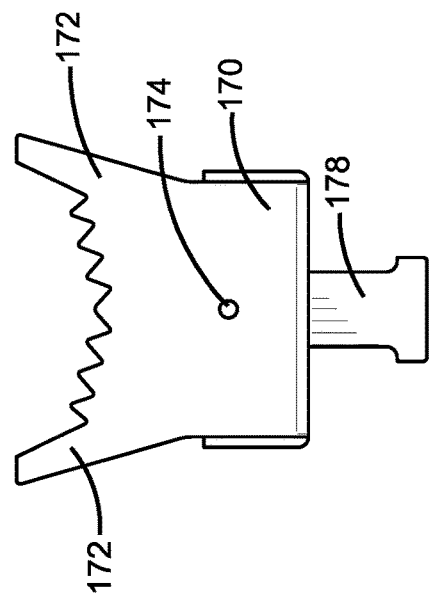
FIG. 27 is an end view of FIG. 26.
Figure 29:
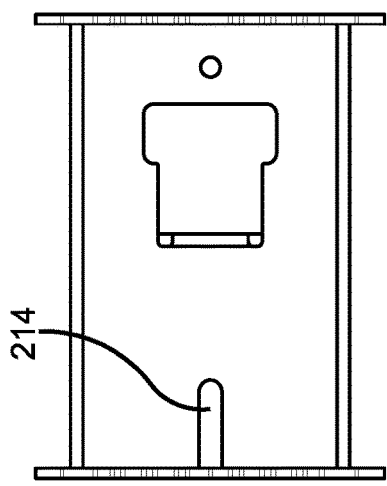
FIG. 29 is a rear view of FIG. 26.
Figure 28:
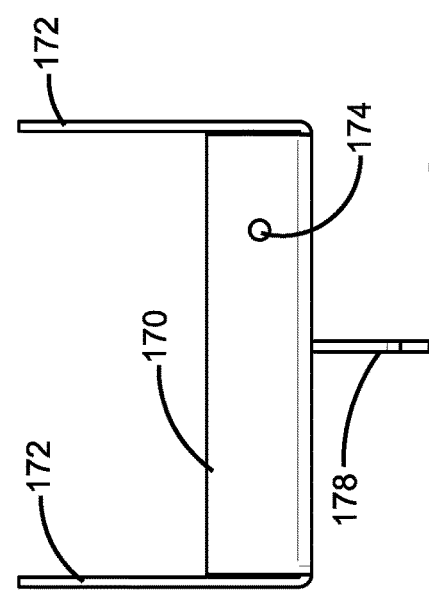
FIG. 28 is a side view of FIG. 26.
Figure 30:
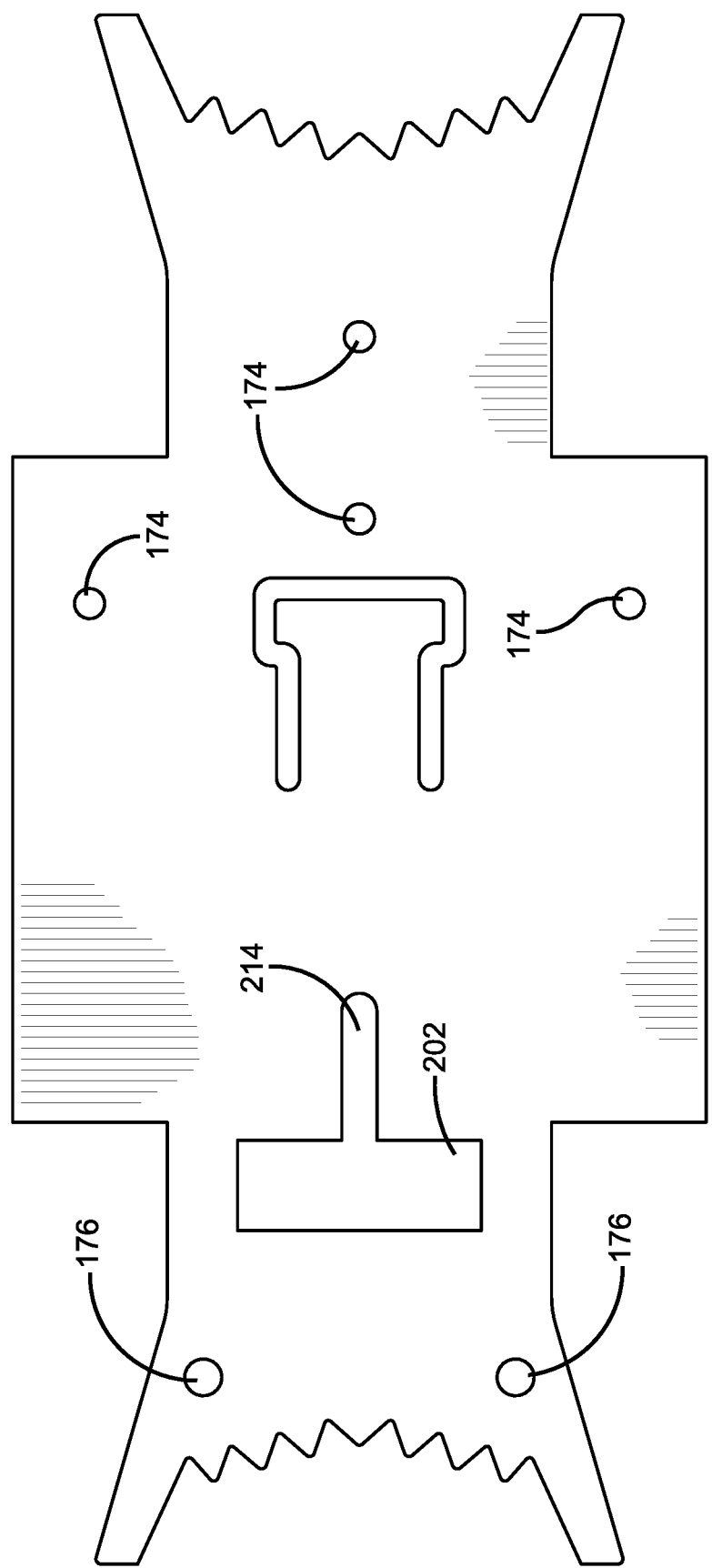
FIG. 30 is a top plan view of the second configuration of the cut blank used to form the second configuration of the base mounting bracket.

In the second configuration of utility mount 102, base mounting bracket 120 can be formed from a flat piece of material as shown in FIG. 30. The blank is cut from a flat piece of material such as steel and then bent into the configuration of FIG. 26. The corners can be welded if desired and the bracket 120 can be powder coated or otherwise finished to resist the elements. This configuration allows legs 172 and cleat 178 to be formed by folding material from the box-shaped body 170.

As described above, ball joint 122 includes a center portion 125 that defines a ball joint cup 158. Ball joint cup 158 has an inner surface that matches the rounded front surface of inner portion 126 of the ball joint. Ball joint cup 158 has an outer surface that matches the inner curved surface of outer portion 124 of the ball joint 122. Ball joint cup 158 defines a large opening 190 that allows clamping bolt 128 and ball joint portions 124 and 126 to swivel with respect to ball joint cup 158. Outer portion also can rotate 360 degrees about the axis of bolt 128 (the longitudinal axis of the ball joint) when it is in any of its possible swivel positions. The swivel movement can be combined with the rotation to allow the position of outer portion 124 to be fully adjustable.

Inner portion 126 of the ball joint 122 includes a stem 192 that receives handle 130. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the ball joint. The end of stem 192 abuts washer 154 within handle 130. Stem 192 defines a recess 194 that can receive a ridge 96 (as with the first configuration) on handle 130 so that handle 130 can fully rotate about stem 192.

Figure 31:
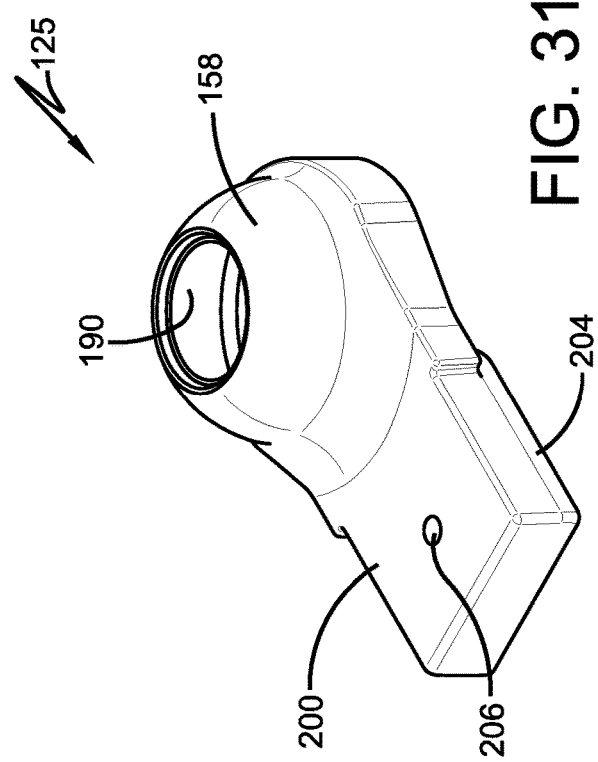
FIG. 31 is a perspective view of a second configuration of the ball joint cup that is removable from the base mounting bracket.
Figure 32:
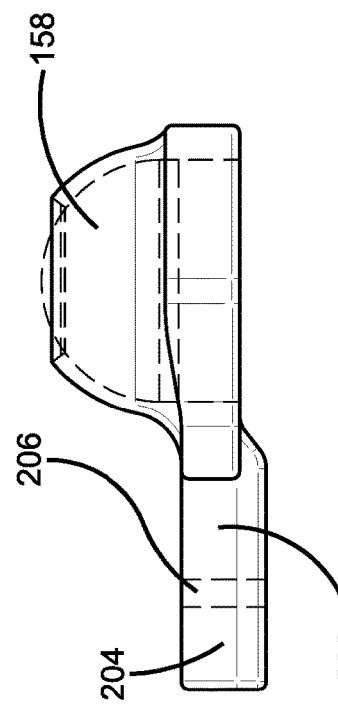
FIG. 32 is a side view of FIG. 31.
Figure 34:
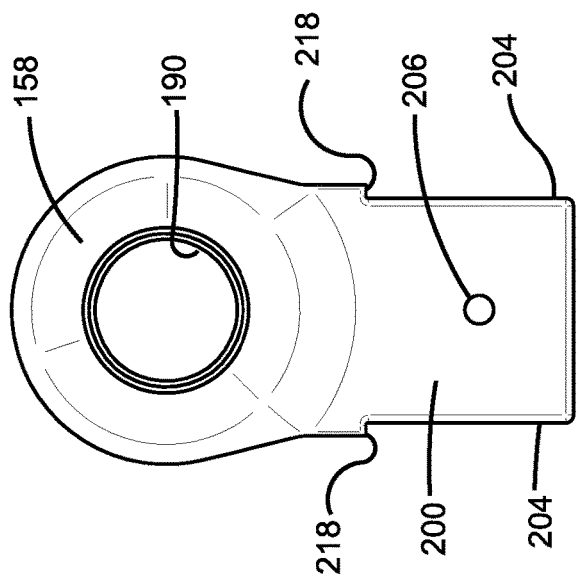
FIG. 34 is a front view of FIG. 31.
Figure 33:
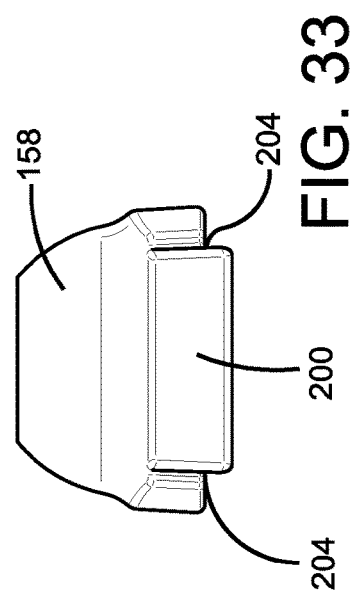
FIG. 33 is an end view of FIG. 31.
Figure 35:
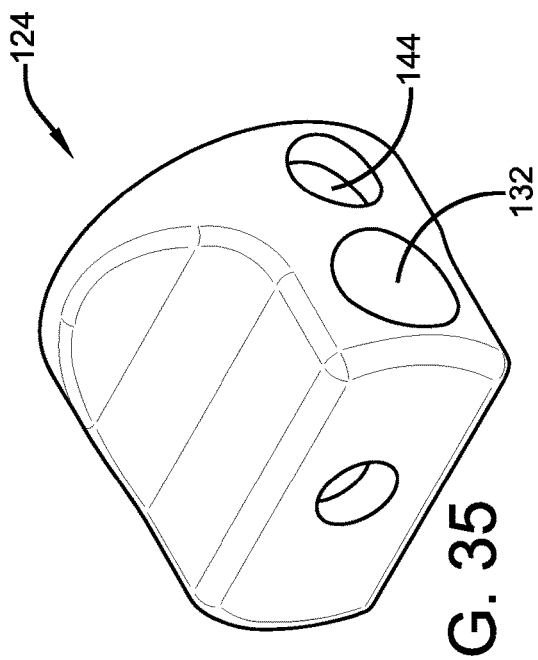
FIG. 35 is a perspective view of a second configuration of the outer portion of the ball joint.
Figure 36:
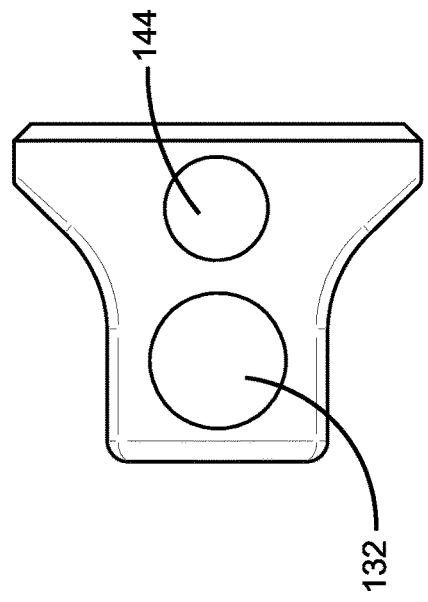
FIG. 36 is a top plan view of FIG. 35.
Figure 37:
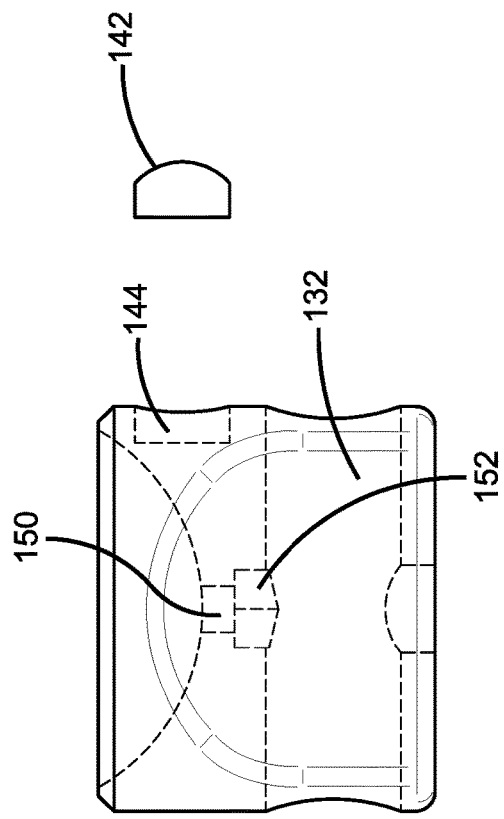
FIG. 37 is a side view of FIG. 35.
Figure 38:
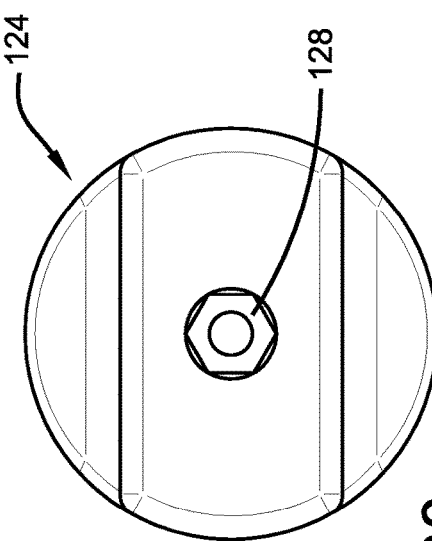
FIG. 38 is a front view of FIG. 35.
Figure 39:
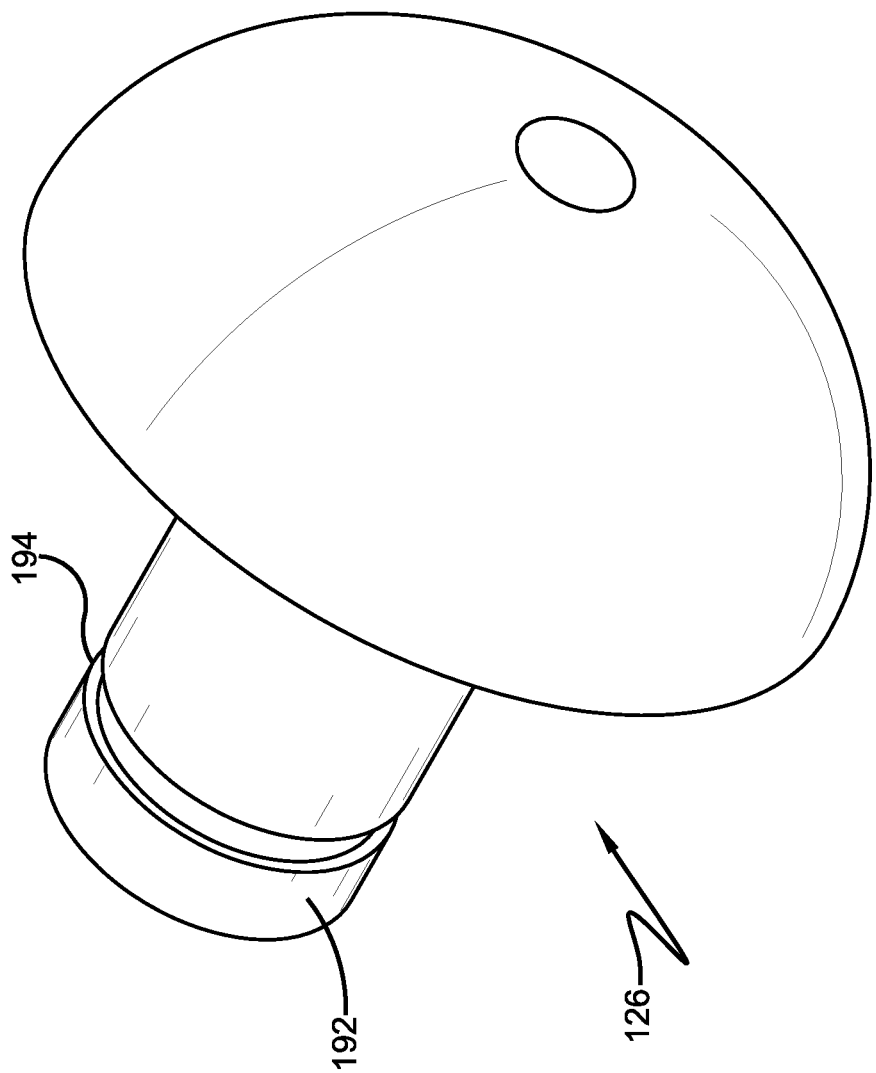
FIG. 39 is a perspective view of the second configuration of the inner portion of the ball joint.

Center portion 125 includes a neck 200 that extends down away from ball joint cup 158 to allow center portion to be removably and replaceably (selectively) mounted to base mounting bracket 120. To mount center portion 125, neck 200 is slid down through a corresponding opening 202 defined by the top portion of base mounting bracket 120. In this configuration, opening 202 is rectangular in shape to receive neck 200 which, as shown in FIG. 31, can include ribs 204 to frictionally engage base mounting bracket 120 as neck 200 is slid into opening 202. Neck 200 also defines a threaded opening 206 that receives the threaded rod 208 of a clamp 210. Opening 206 extends through neck 200. Clamp 210 defines a plurality of openings 212 similar to openings 160 on handle so the same wrench can be used to tighten and loosen clamp 210. After neck 200 is seated within base mounting bracket 120, the use rotates clamp 210 until clamp 210 and neck 200 are clamped against the front wall of base mounting bracket 120. The front wall of base mounting bracket 120 defines a slot 214 that allows clamp 210 and neck to be slid out of bracket 120 after clamp 210 is loosened so that clamp 210 can be moved to the next location with ball joint 122. In another configuration, opening 206 is not threaded and a threaded nut is used on the rear side of neck to receive threaded rod 208. In a further configuration, neck 200 can be held to base mounting bracket 120 with a snap fit tab that pivots between locked and unlocked configurations. The snap fit tab can be carried by neck 200.

Another configuration of base mounting bracket 120 is depicted in FIGS. 55-61 wherein base mounting bracket 120 is assembled by the user from components that can be shipped in a small flat container. In this configuration, base mounting bracket 120 includes upper 400 and lower 402 mounts that include legs 172. Mounts can be provided in a variety of shapes and configurations. In the exemplary configuration, mounts 400 and 402 are in the form of flat plates which allows base mounting bracket to be stored in a flat configuration and transported in a compact configuration. Base mounting bracket 120 also includes an intermediate plate 404 that is positioned between upper 400 and lower 402 end plates. Upper end plate 400 and intermediate plate 404 define aligned openings 202 that receive the neck 200 of the ball joint center portion 125.

Plates 400, 402, and 404 are assembled to form base mounting bracket 120 with a plurality of connectors 406 and tubes 408 and 410. Tubes 408 and 410 function as spacers for plates 400, 402, and 404 while connectors 406 are disposed through tubes 408 and 410 to clamp the plates against the tubes. Connectors 406 can be carriage bolt and nut combinations. In the exemplary configuration, four tubes are used to define base mounting bracket 120 with tubes 410 being shorter than tubes 408. For example, tubes 408 can each be half inch to nine long and tubes 410 can each be zero (not used) to six inches long. For example, each carriage bolt 406 can be four inches to ten inches long. Bolt 406 can be a half inch with 13 thread. Clamp 210 can engage tubes 410 or the outer ends of plates 400 and 404 directly or with a bridge member 412. This allows clamp 210 to hold neck 200 in place. Each tube 408 and 410 defines a through hole that receives the shank of the carriage bolt. Each plate 400, 402, and 404 defines holes 414 large enough for the carriage bolt shank and smaller than the outer diameter of the tubes 408 and 410 so that each tube 408 and 410 abuts the plates. Tightening connectors 406 to clamp the plates onto the tubes creates base mounting bracket 120.

End plates define toothed inset portions so that they can grip a tree trunk or branch. Lower plate 402 defines cleat 178 or one or a plurality of T-shaped hooks on which gear can be hung in a manner similar to hook 98.

This configuration allows the base mounting bracket 120 to be packaged and shipped in a flat configuration and allows it to be inexpensive so that the user can position multiple base mounting brackets 120 for use with ball joint center portion 122.

Figure 25:
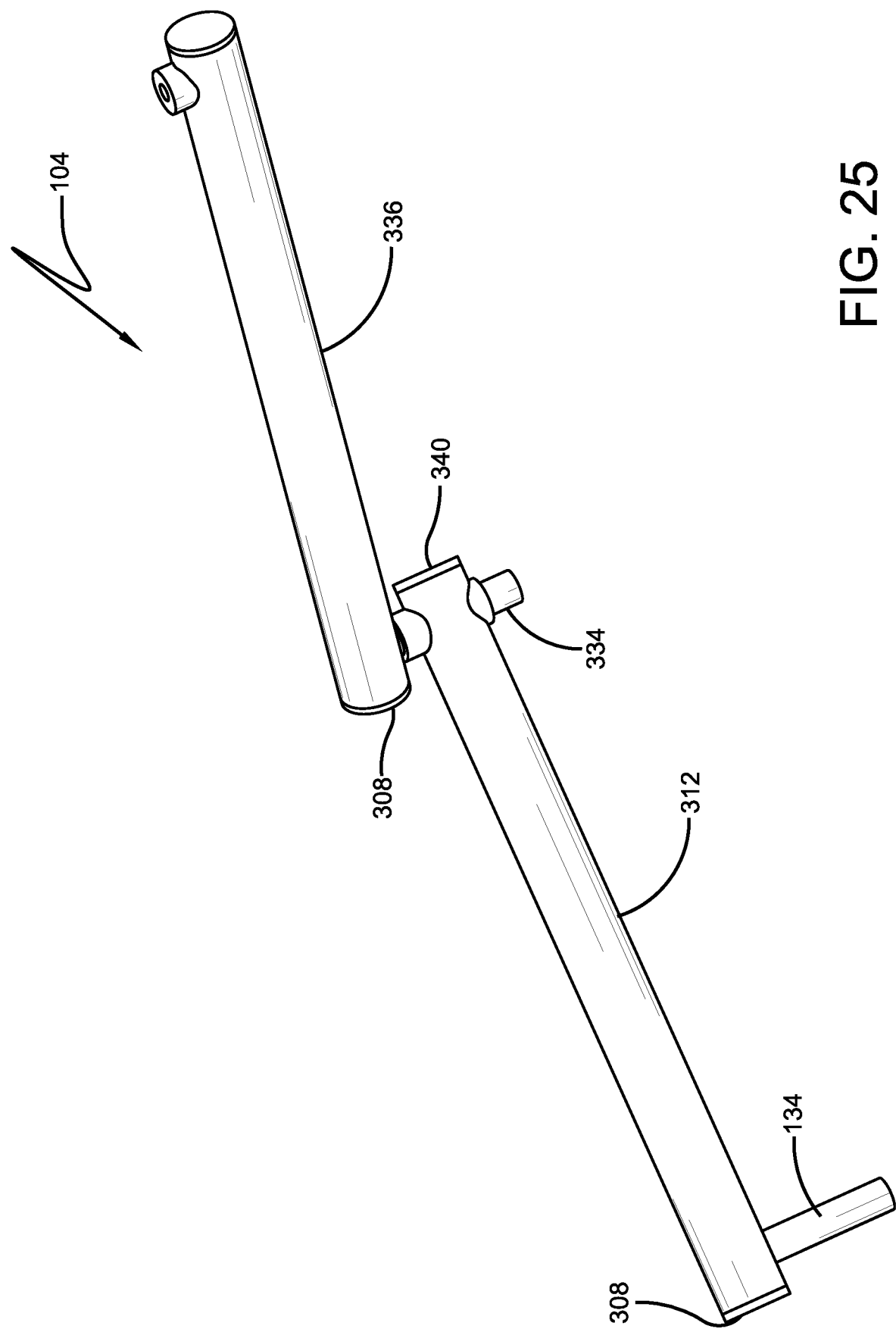
FIG. 25 is a perspective view of one configuration of a device mount in the form of an articulating arm.
Figure 44:
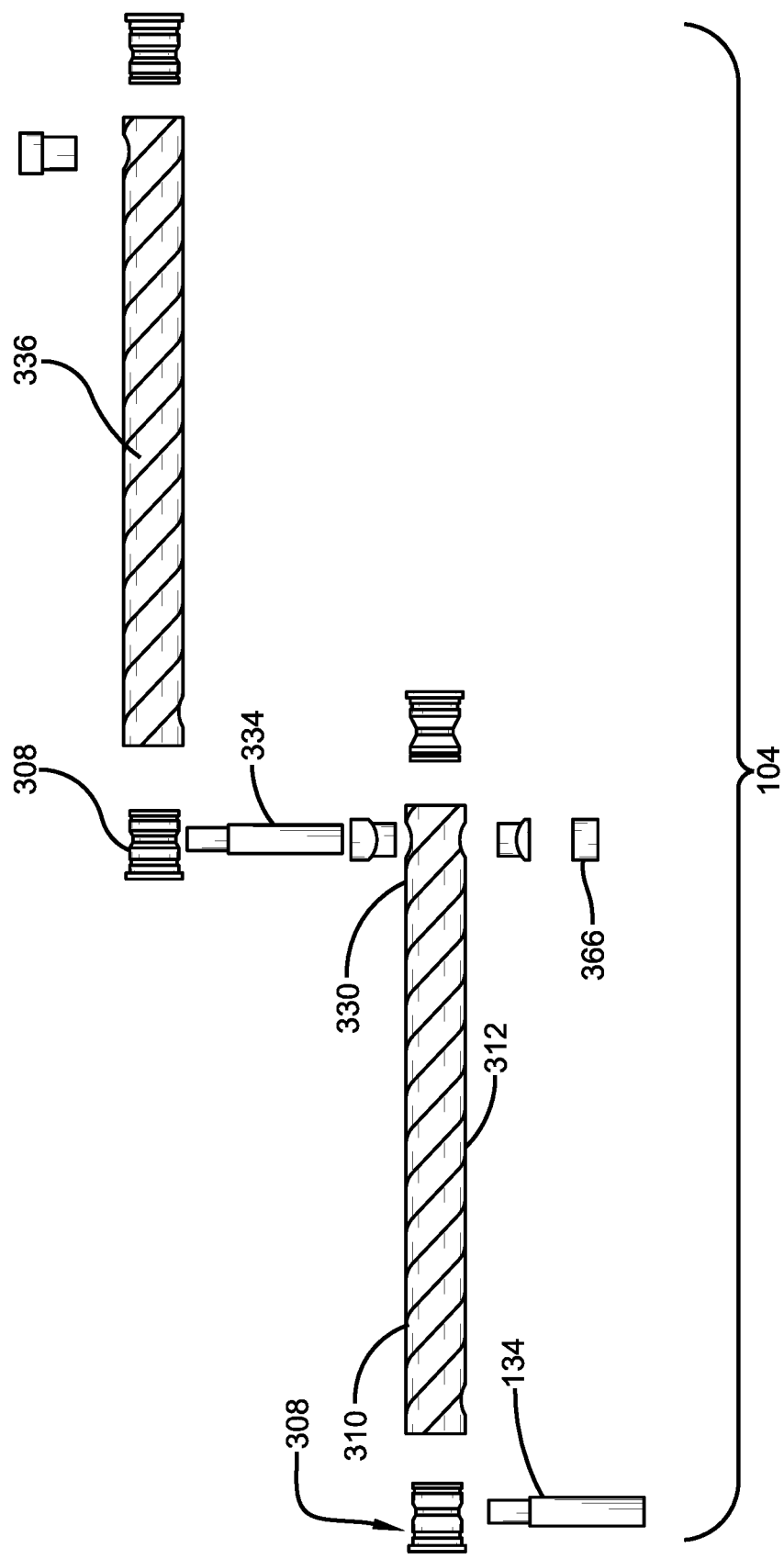
FIG. 44 is an exploded view of the device mount of FIG. 25.
Figure 45:
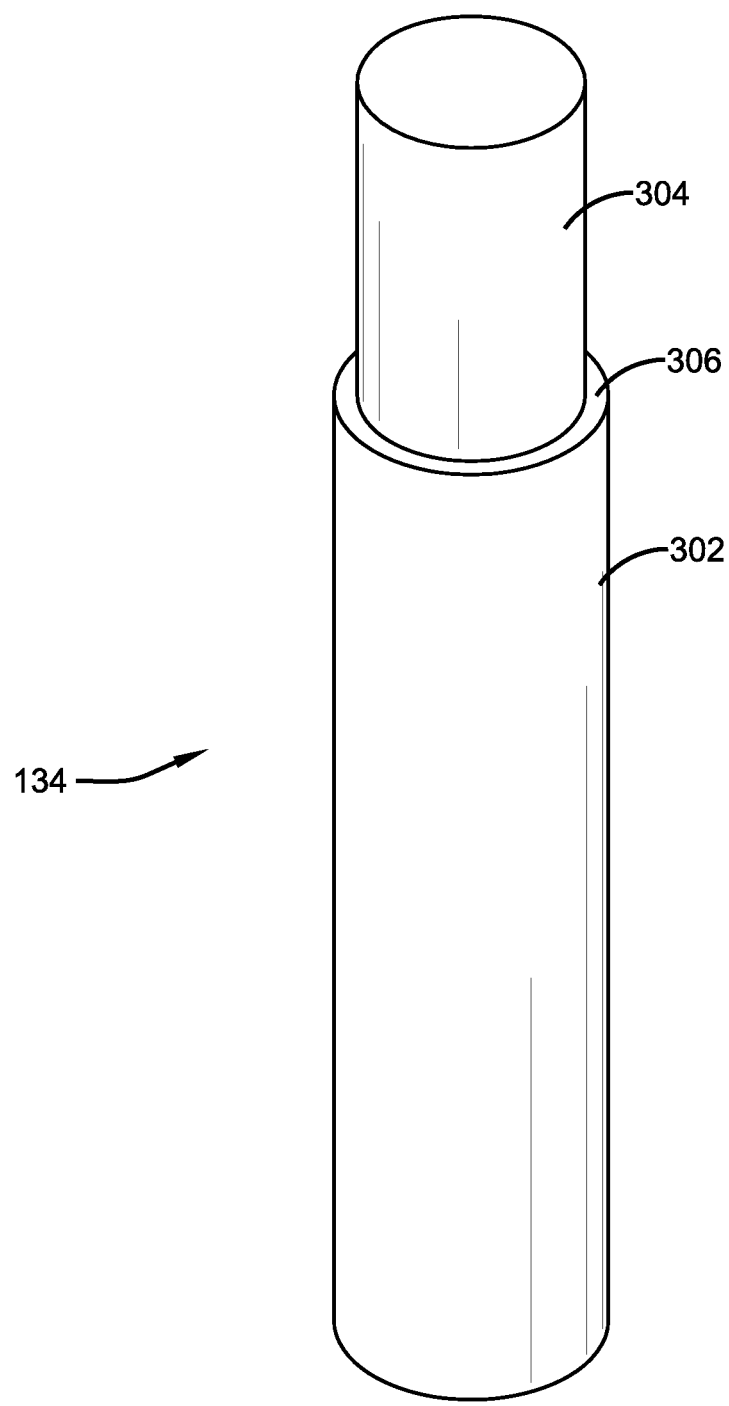
FIG. 45 is a plurality of views of the anchor rod for the device mount arm of FIGS. 23 and 44.

FIGS. 25 and 44 depict an exemplary device mount 104 in the form of a two section articulating arm. This exemplary configuration uses hollow tubes as the arm sections with rigid joint inserts carried at the ends of the hollow tubes to define the pivoting joints used to allow the arm sections to pivot with respect to each other. In one embodiment, the hollow arm tubes are made from a carbon fiber material and the inserts that fit into the ends of the tubes are made from aluminum. This configuration provides for assembly without welding which is an advantage because of the elimination of the preparation and finishing time and allows device mount 104 to be assembled in a room with regular ventilation and work tables. In the one exemplary configuration, the lack of welds is a feature of the device mount. In the exemplary configuration described below, the Applicant has included exemplary dimensions to help describe the relationships between elements. These dimensions are exemplary and can be changed to provide device mounts 104 designed for smaller or larger loads. The disclosure is not to be limited to the dimensions provided. As described above, the anchor rod 134 is the element of device mount 104 that is removably received by the ball joints described above. Anchor rod 134 can be made from aluminum, another metal, a hard polymer, another polymer, or another hard material that is dimensionally stable. The elements that form the joints described below can be made from aluminum, another metal, a polymer, or another hard material. The arm sections can be made from carbon fiber tubing or aluminum tubing. The cross sections of the tubing can be provided in various shapes including, for example, round, oval, square, rectangular. The arms sections also can be made from polymer.

Figure 46:
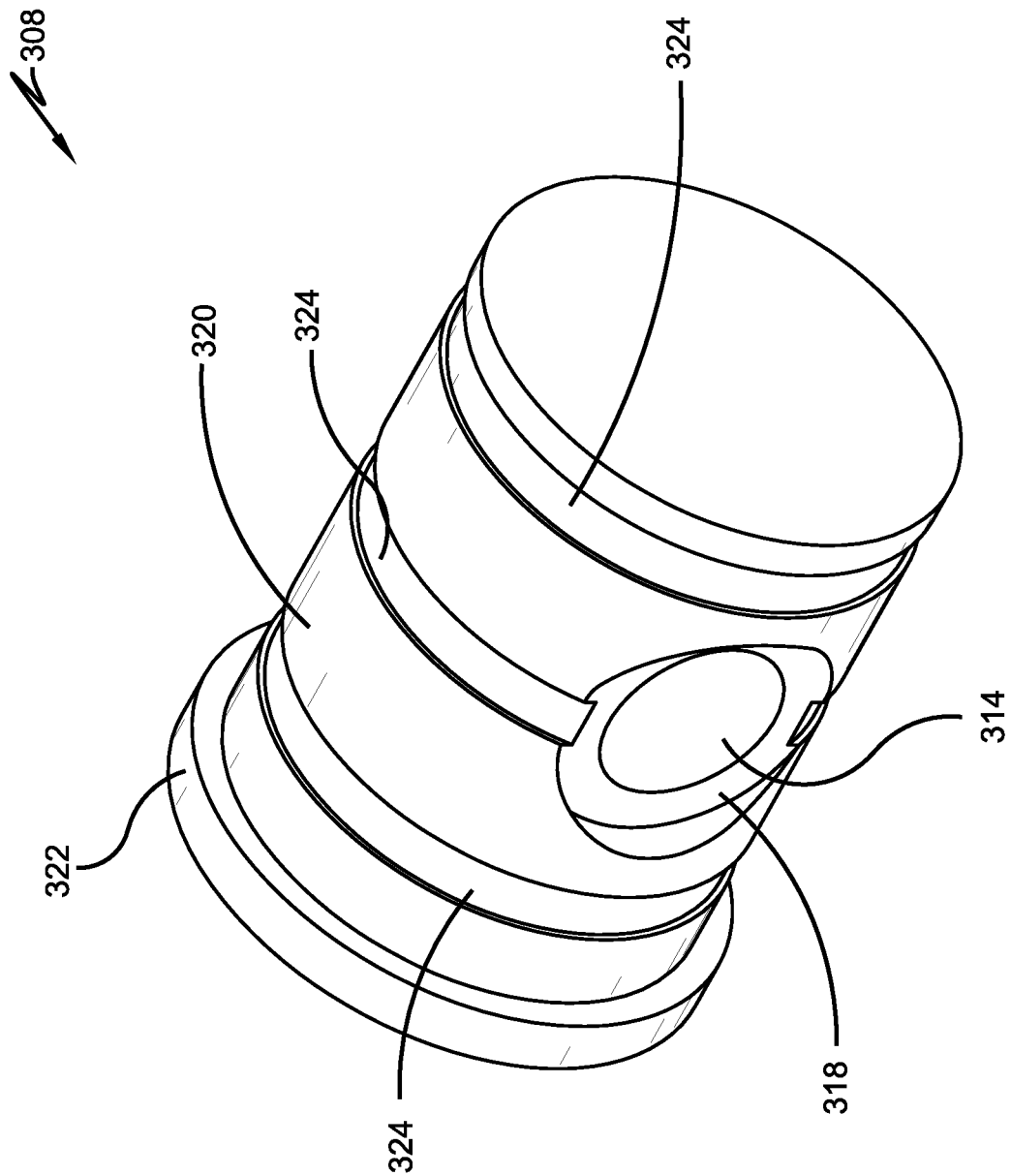
FIG. 46 is a plurality of views of an anchor insert for the end of one of the first arm section to receive the threaded end of the anchor.
Figure 47:
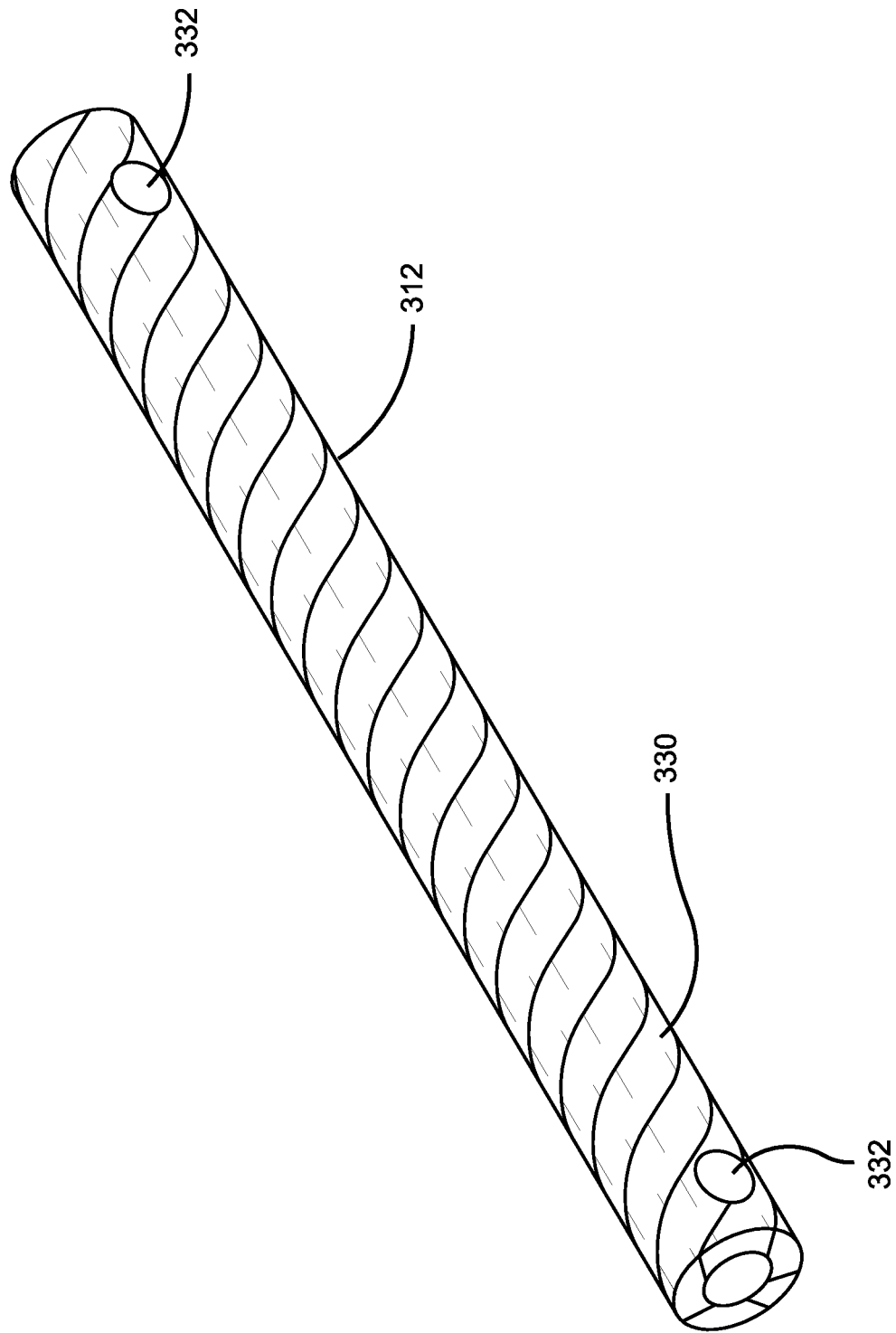
FIG. 47 is a plurality of views of a first arm section.
Figure 48:
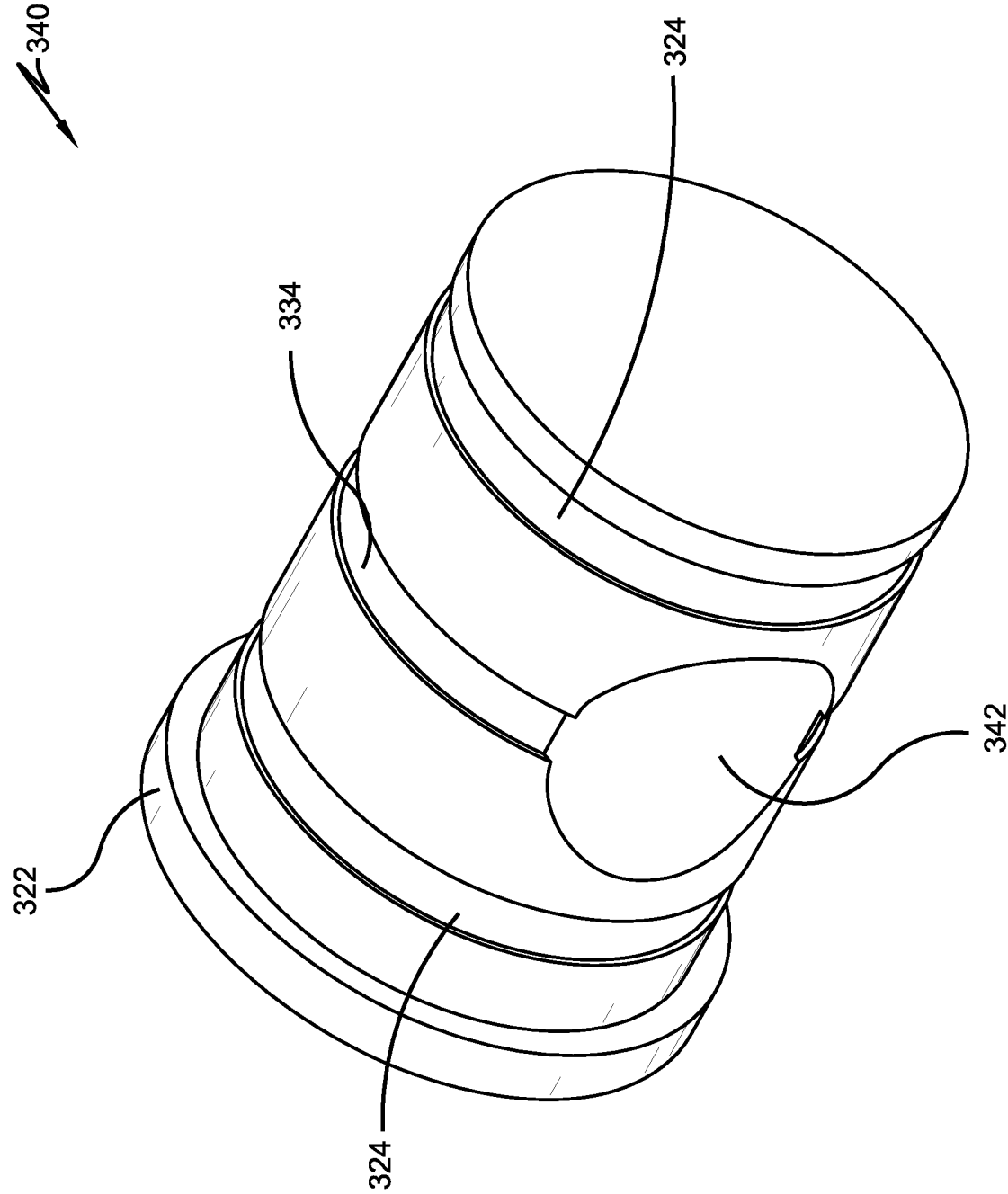
FIG. 48 is a plurality of views of a joint insert for the other end of the arm section.
Figure 49:
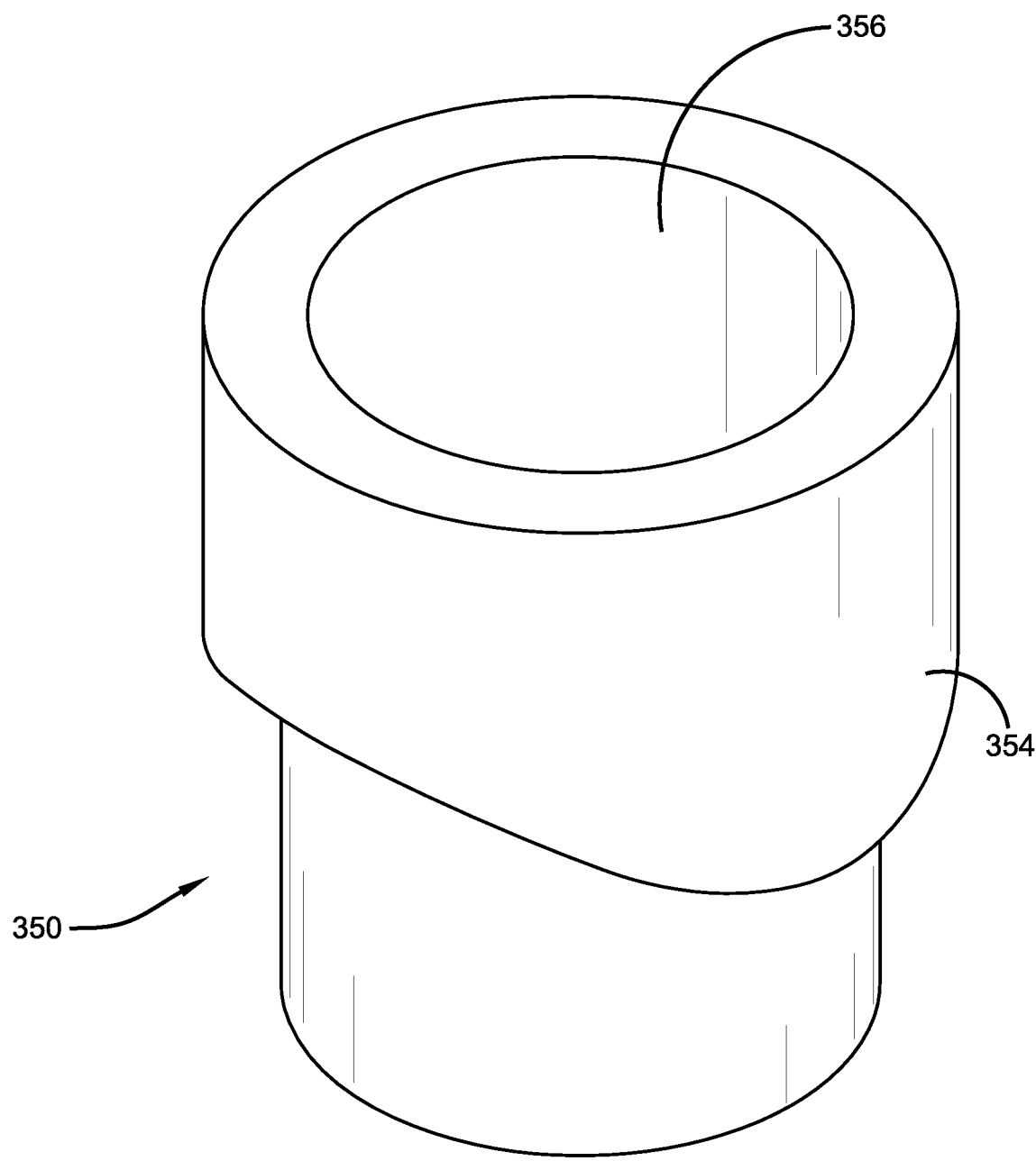
FIGS. 49 and 50 are views of the bushing inserts that are fit into the top and bottom of the joint insert.
Figure 50:
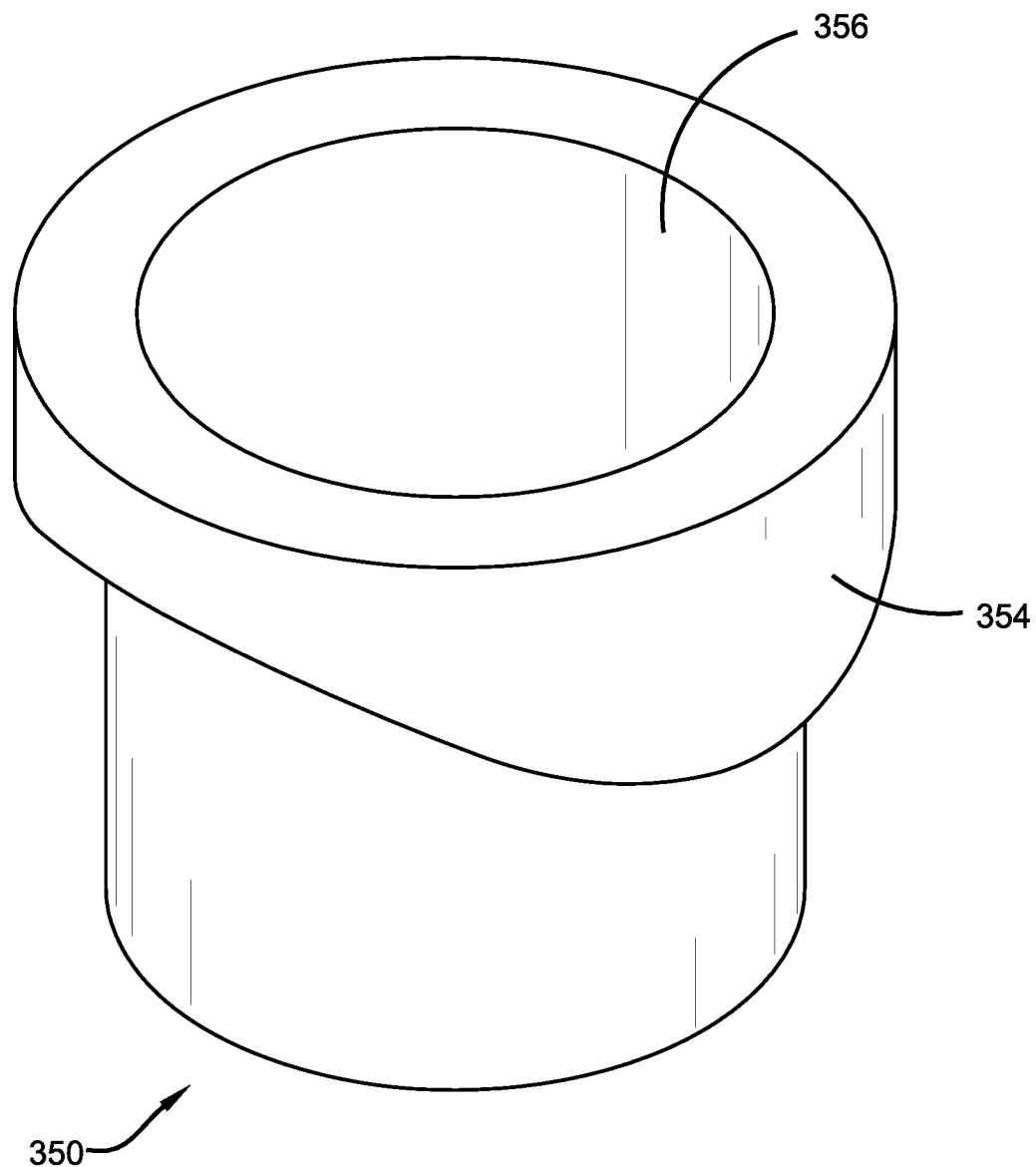
Figure 51:
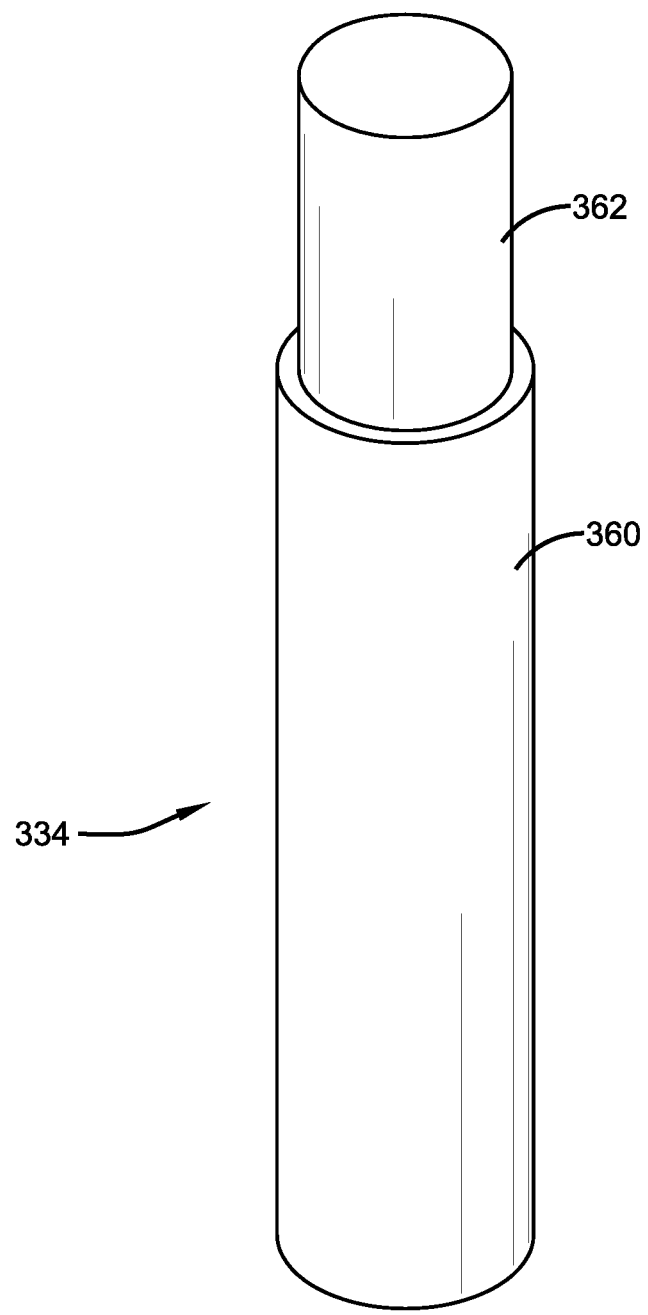
FIG. 51 is a plurality of views of the joint pin.
Figure 52:
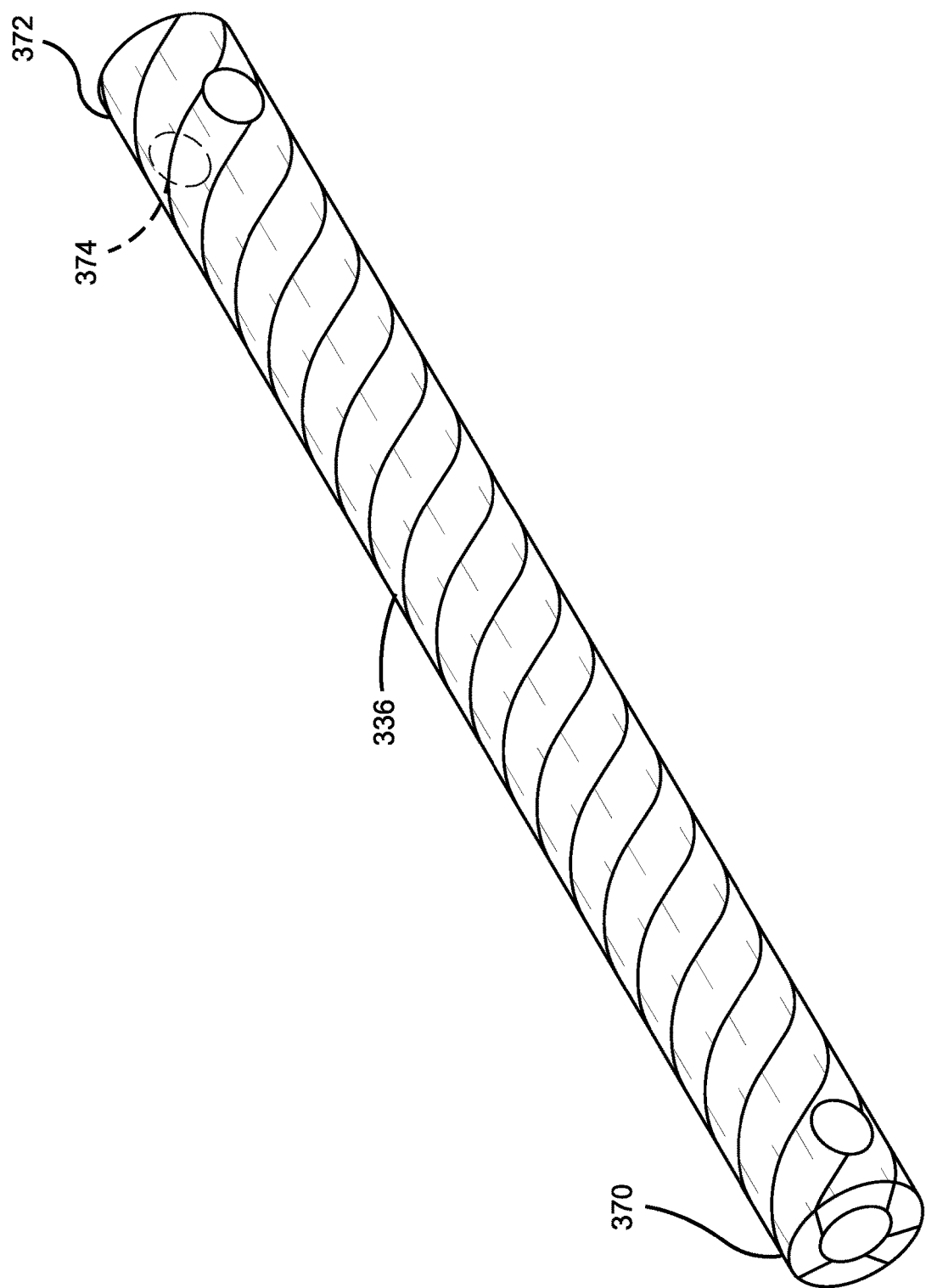
FIG. 52 is a plurality of views of a second arm section.
Figure 53:
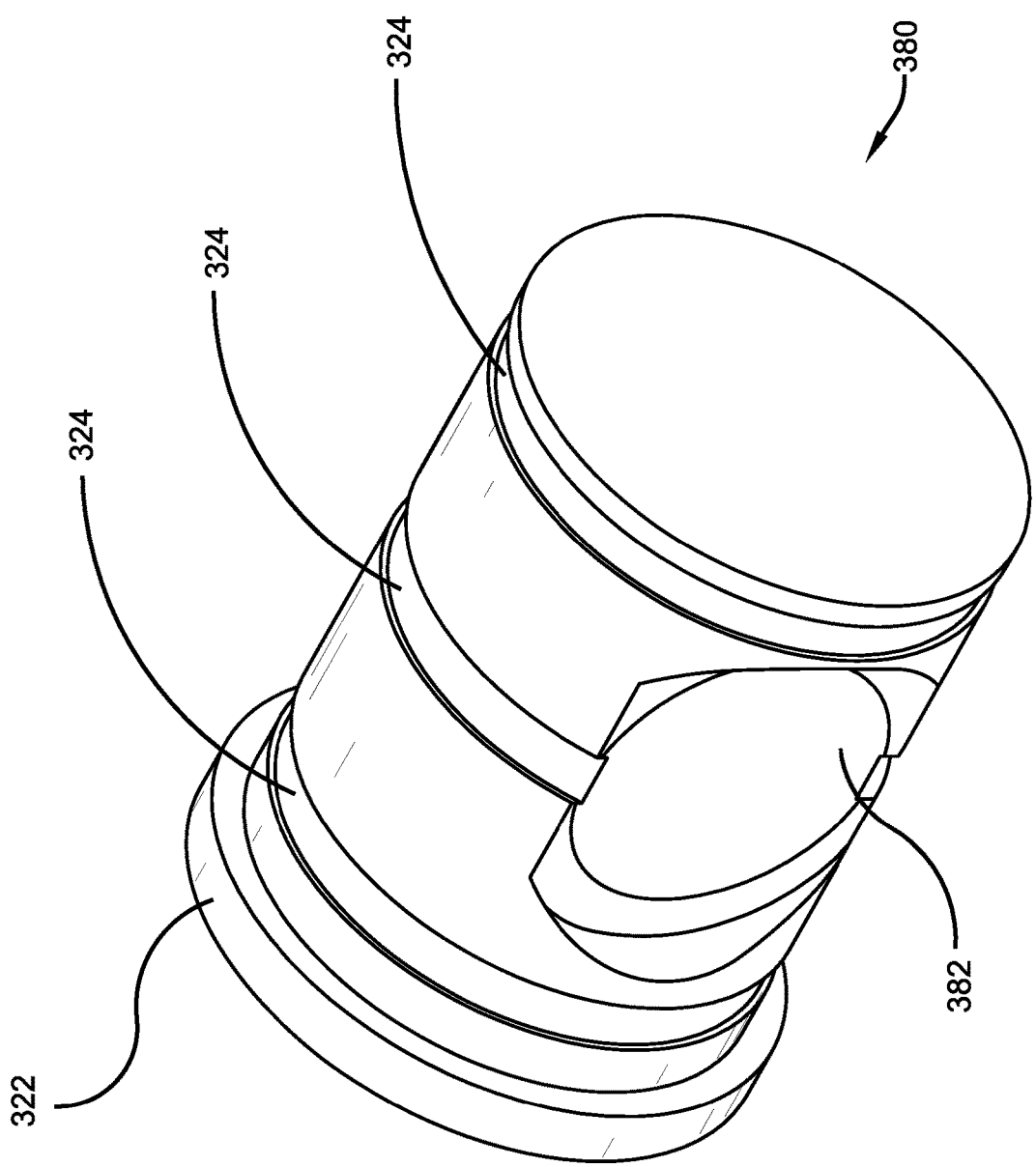
FIG. 53 is a plurality of views of a sleeve insert for the outer end of the second arm section.
Figure 54:
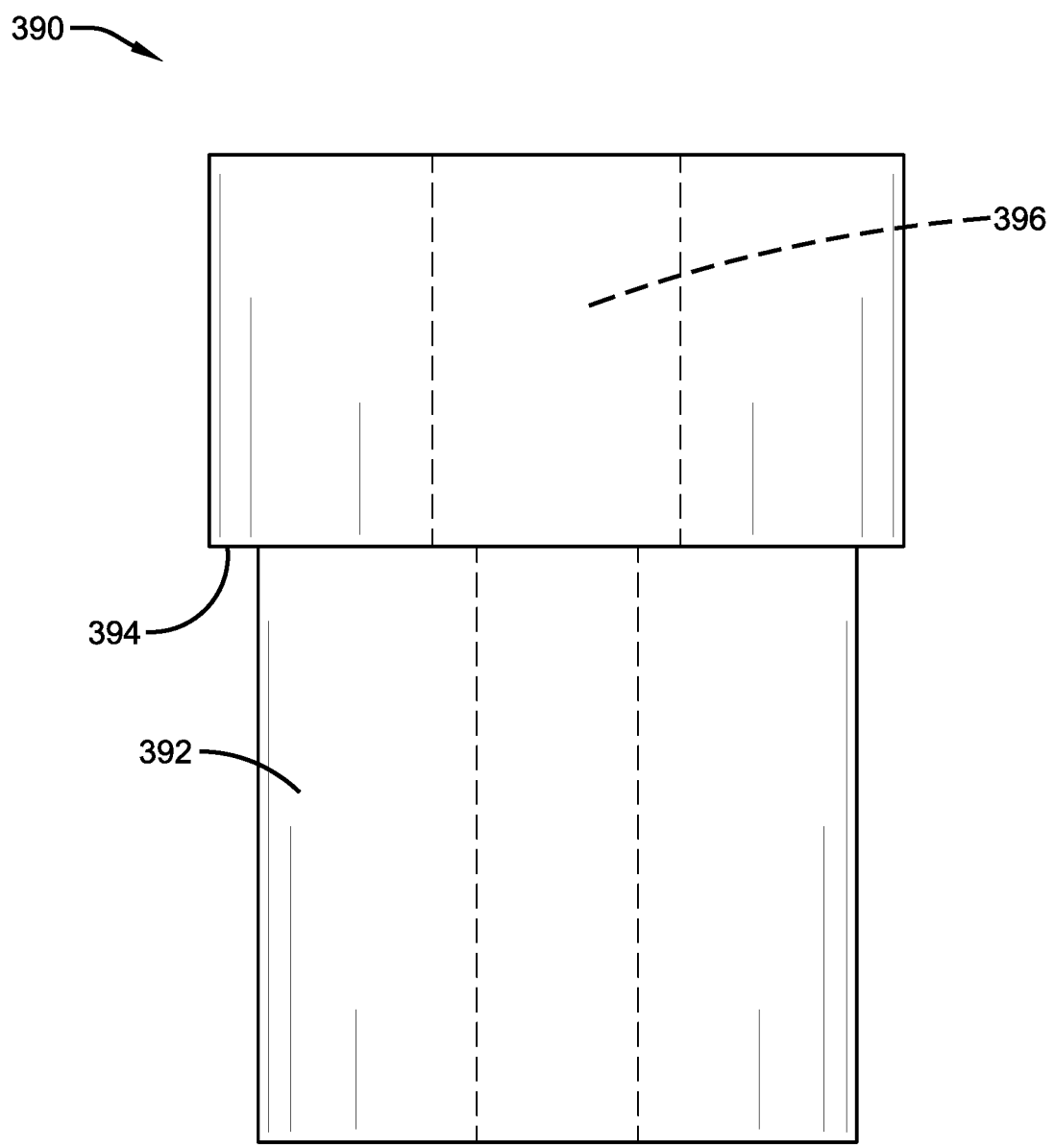
FIG. 54 is a plurality of views of the mount sleeve.
Figure 55:
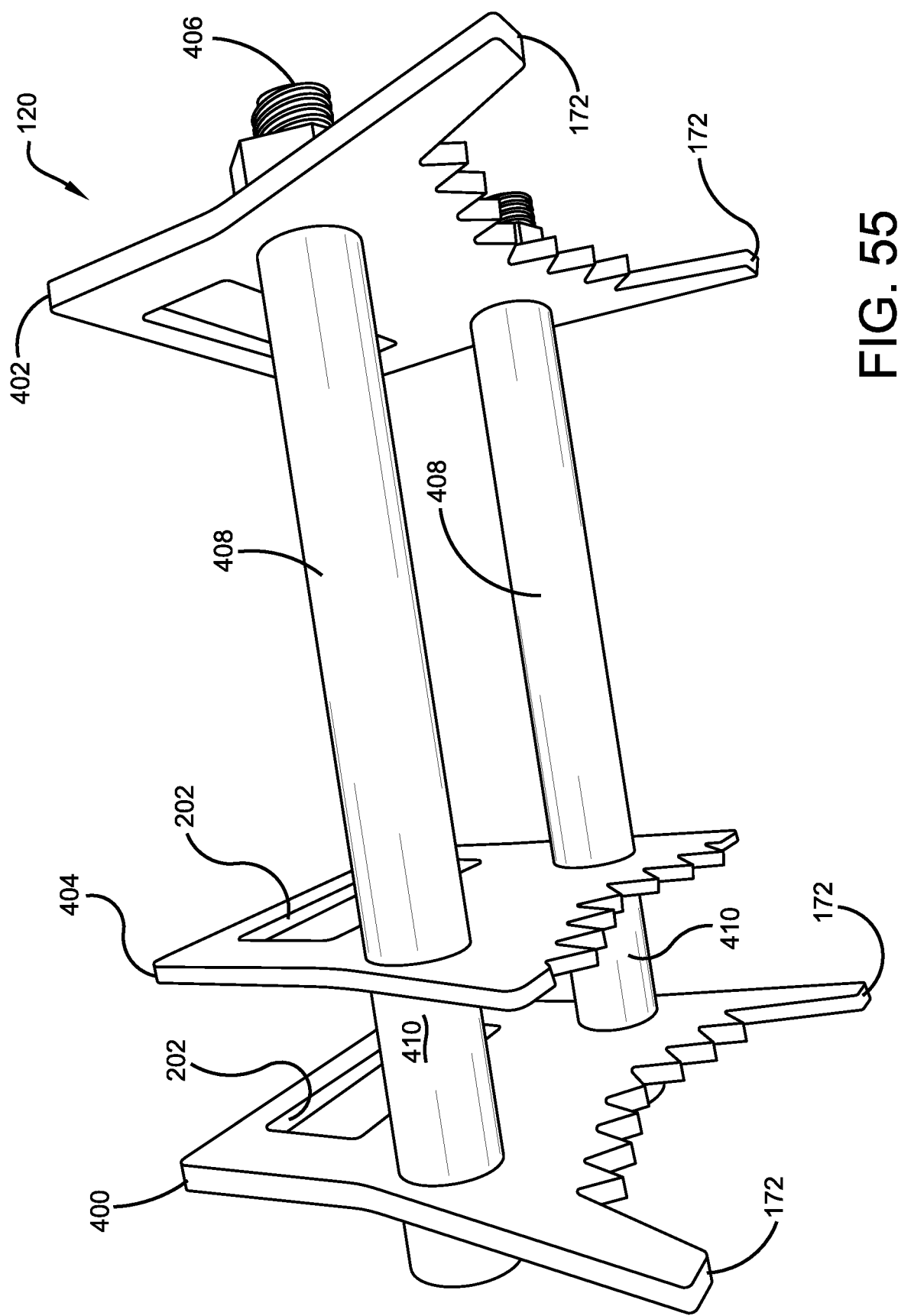
FIG. 55 is a perspective view of an alternative embodiment of the base mounting bracket.
Figure 56:
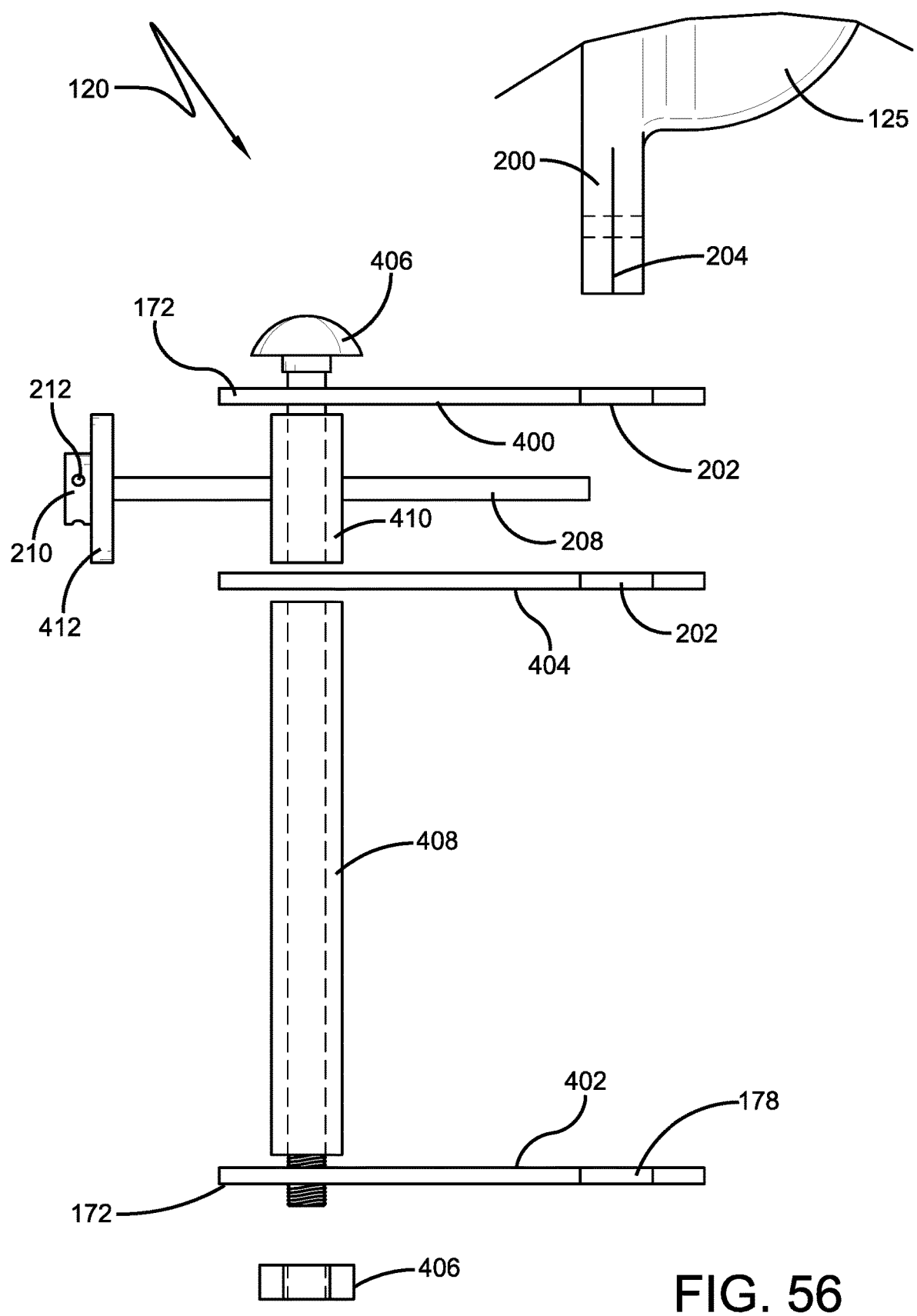
FIG. 56 is a side exploded view of the base mounting bracket of FIG. 55.
Figure 57:
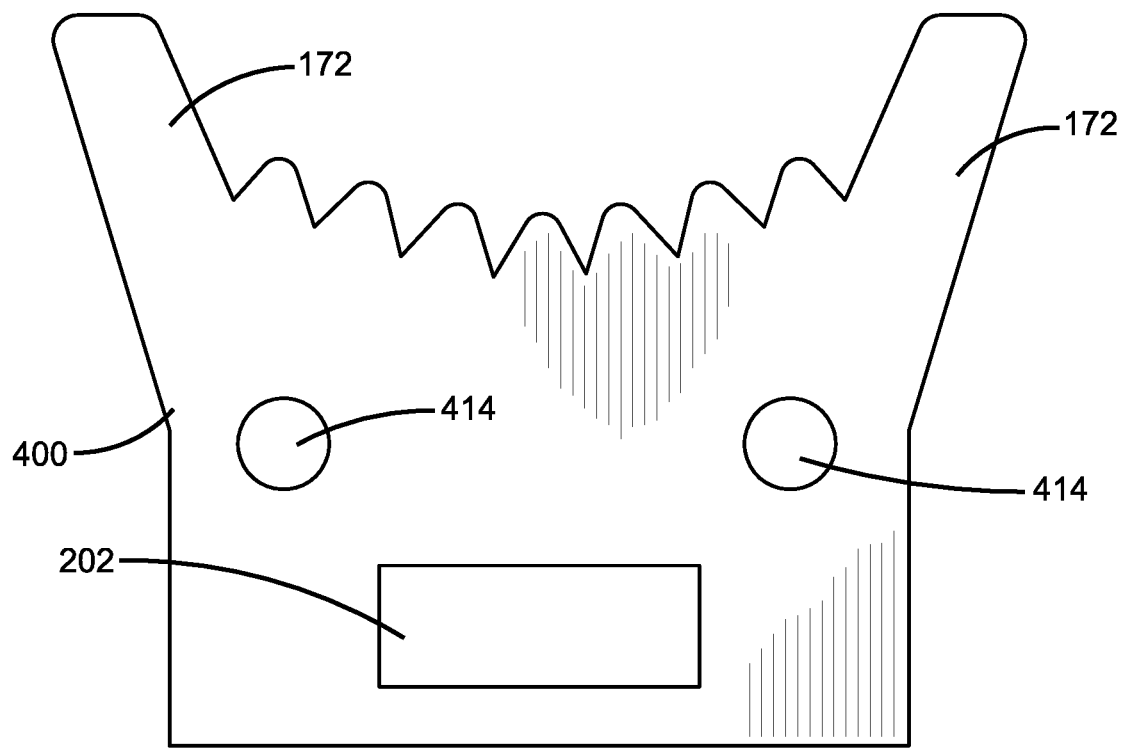
FIG. 57 is a plan view of the upper end plate of the base mounting bracket of FIG. 55.
Figure 58:
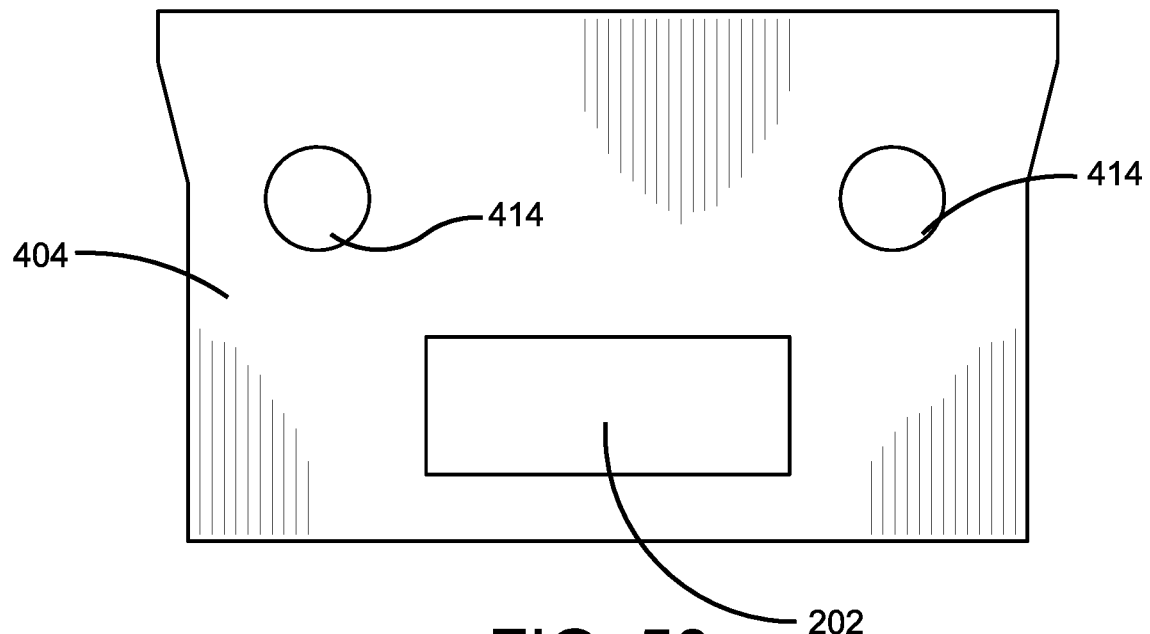
FIG. 58 is a plan view of the intermediate mounting plate of the base mounting bracket of FIG. 55.
Figure 59:
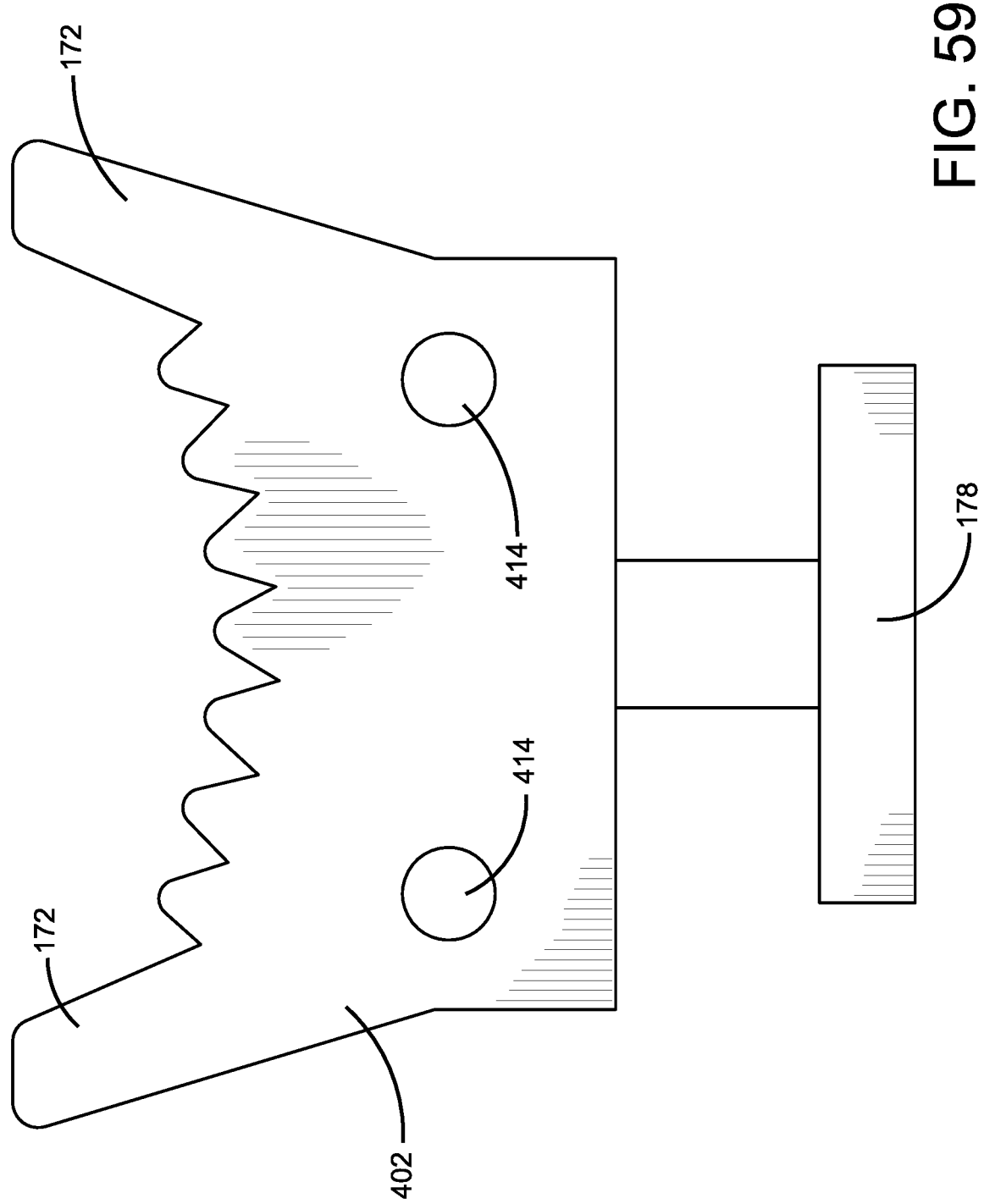
FIG. 59 is a plan view of the bottom plate of the base mounting bracket of FIG. 55.
Figure 60:
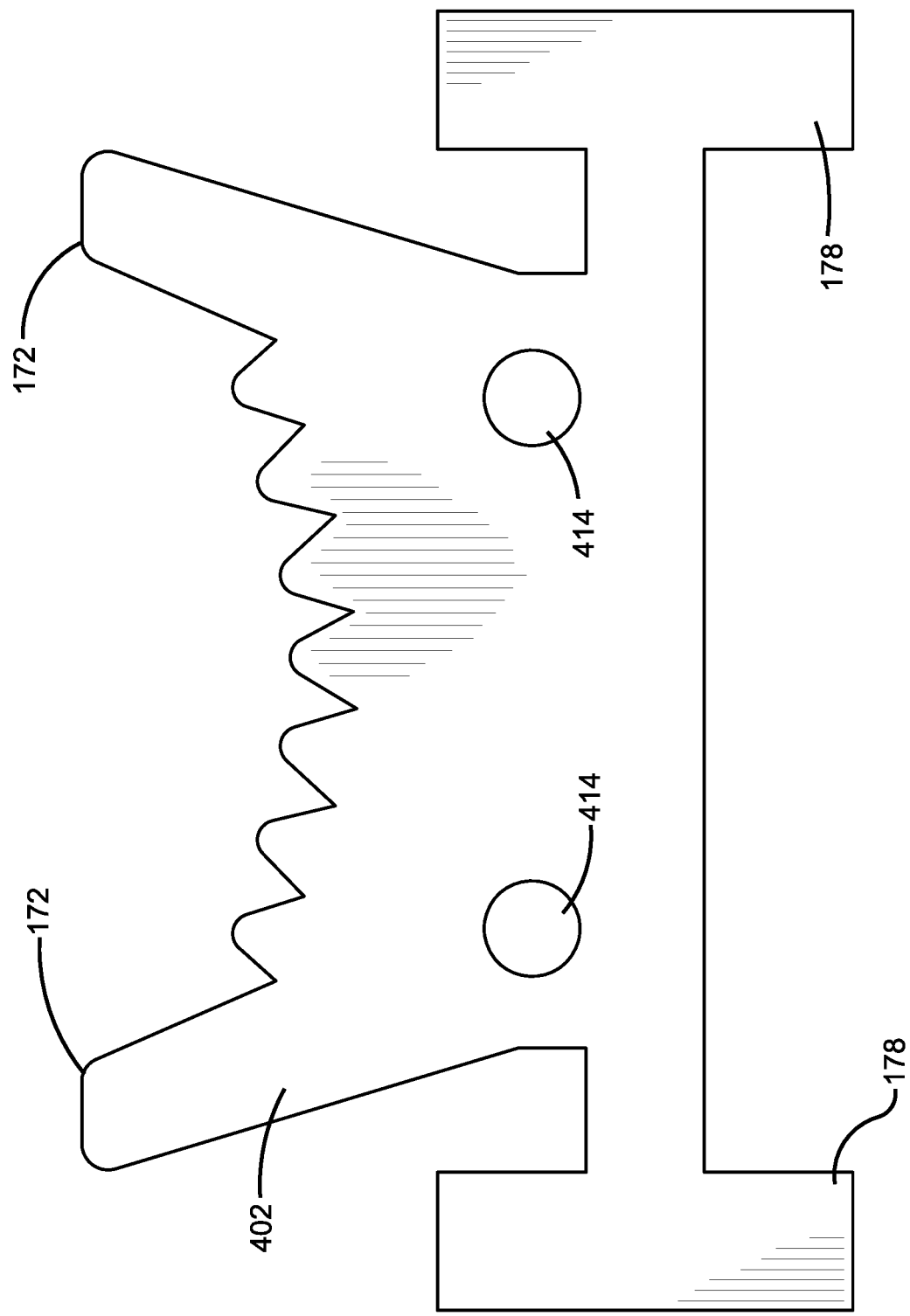
FIG. 60 is a plan view of an alternate bottom plate.
Figure 61:
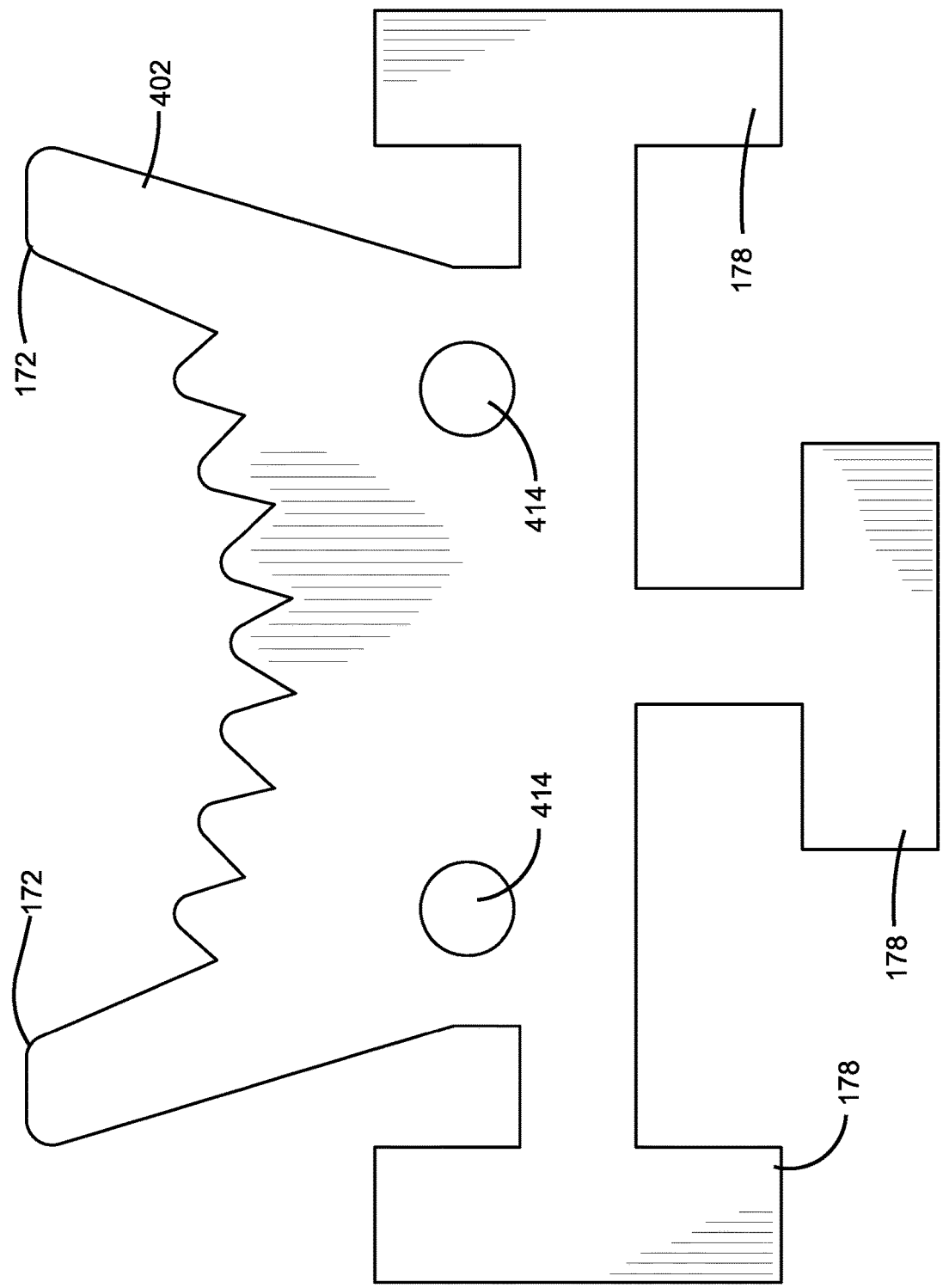
FIG. 61 is a plan view of another alternate bottom plate.

Anchor rod 134 slides down into an opening that complements the size of anchor rod 134 so that there is a sliding and rotating fit between anchor rod 134 and the portion of the ball joint that defines the opening that minimizes wobble. In the exemplary configuration, the wobble is minimized by making the opening slightly larger than the anchor rod. The diameter of opening 132 is 0.813 inches while the diameter of the lower unthreaded portion 302 of anchor rod 134 is 0.625 inches. These dimensions cooperate to allow anchor rod 134 to be mounted quickly and easily with minimal jamming while allowing anchor rod 134 to rotate with respect to the ball joint while also minimizing wobble. The upper threaded portion 304 of anchor rod 134 is stepped down to a 0.500 inch diameter to create a shoulder 306 that abuts the anchor insert 308 that is carried by the inner end 310 of first arm section 312. Upper threaded portion 304 is provided with a thread that matches a threaded opening 314 defined by anchor insert 308 which is aligned with an opening 316 defined by one side of inner end 310 of first arm section 312. As shown in FIG. 46, a flat flange 318 is defined around the mouth of threaded opening 314 so that the shoulder 306 abuts directly against flange 318 and be tightened against anchor insert 308. The flange has an outer diameter of 0.640 inches to receive shoulder 306 having an outer diameter of 0.625. Opening 316 defined by inner end 310 has an outer diameter of 0.641 inches. The threaded connection allows the two items to be disconnected for storage and transport or for when an electronic device is to be mounted directly to anchor rod 134. As an option, a locking device such as a polymer adhesive or a lock washer can be used at this location to secure anchor rod 134 to anchor insert 308.

Anchor insert 308 has a body 320 that defines threaded opening 314. Body 320 also defines an end flange 322 that abuts the end of arm section 312. The outer diameter of end flange 322 is 1.250 inches to match the outer diameter of first arm section 312. Body 320 also defines a plurality of parallel recessed rings 324 help retain anchor insert 308 within first end 310 of first arm section 312. Each of these recessed rings 324 can be filled with an adhesive such as an epoxy to secure anchor insert 308 to the inner surface of a hollow inner end 310 of first arm section 312. Another configuration provides deformable O-rings disposed in recessed rings 324 to define a frictional fit between anchor insert 308 and first arm section 312. In another embodiment, recessed rings 324 remain empty but provide sharp edge that frictionally engage the inner surface of inner end 310 to connect anchor insert 308 to first arm section 312.

In the exemplary configuration, first arm section 312 is hollow and made from carbon fiber. This configuration provides a strong, lightweight arm that can be used in cold weather. In this configuration, first arm section 312 has a length of fourteen to twenty inches and an outer diameter of 1.250 inches. The outer end 330 defines a through hole 332 having a diameter of 0.750 inches. Through hole 332 has an axis parallel to the axis of opening 316. Outer end 330 receives three elements 340, 350, and 352 to define a receptacle that receives the lower end of a joint pin 334 that supports the second arm section 336. When assembled, joint pin 334 is substantially parallel to anchor rod 134.

A joint insert 340 having a structure similar to anchor insert 308 is fit into the open second end 330 of first arm section 312. Joint insert 340 includes a body 320 defining flange 322 and recessed rings 324. Joint insert 340 defines an unthreaded through hole 342 that receives upper and lower bushing inserts 350 and 352 which are disposed through hole 332 defined by outer end 330. Upper and lower bushing inserts 350 and 352 are made from a polymer. Each bushing insert 350 and 352 defines a collar 354 that has a curved abutment surface that substantially matches and engages the outer surface of outer end 330. Each bushing insert 350 and 352 has a body that extends into outer end 330 with the body of each defining a through hole 356 that receives the lower portion of joint pin 334. When bushing inserts 350 and 352 are installed through outer end 330 and into joint insert 340, through holes 356 are aligned and can receive the lower portion of joint pin 334. Bushing inserts 350 and 352 can be made from plastic.

Joint pin 334 defines a lower portion 360 and an upper portion 362. Lower portion 362 has a threaded end portion 364 that can receive a nut 366 (see FIG. 44). Lower portion 362 has an outer diameter the same as or slightly smaller than the diameter of through holes 356 so there is a tight fit at this joint. Bushing inserts 350 and 352 are compliant enough to allow lower portion 360 to rotate when arm 104 is adjusted. A washer can be used between nut 366 and bushing 352.

Upper portion 362 is threaded so that it threadably engages the threaded opening 314 defined by another anchor insert 308 that is carried by the inner end 370 of second arm section 336. Upper portion 362 has the same diameter and thread configuration as the upper threaded portion 304 of anchor rod 134.

The outer end 372 of second arm section 336 defines an opening 374 disposed on the opposite side of second arm section 336 as the one that receives upper portion 362. A sleeve insert 380 is disposed in second end 372 with a threaded opening 382 of sleeve insert 380 being aligned with opening 374. Sleeve insert 380 includes flange 322 and recessed rings 324 as described above. Threaded opening 382 threadably receives a threaded sleeve 390 which includes a lower portion 392 having outer threads that engage the threads that define opening 382. Threaded sleeve defines a shoulder 394 and a stepped threaded bore 396. Sleeve 390 can receive a variety of mounts for electronic devices. When assembled in the configuration depicted in FIG. 25, arm 104 provides a light-weight, strong adjustable arm for a device mount 104. The joint configurations are easy to assemble without welding and can allow the device to be shipped in a disassembled state or partially disassembled with the end user completing the assembly.

Figure 62:
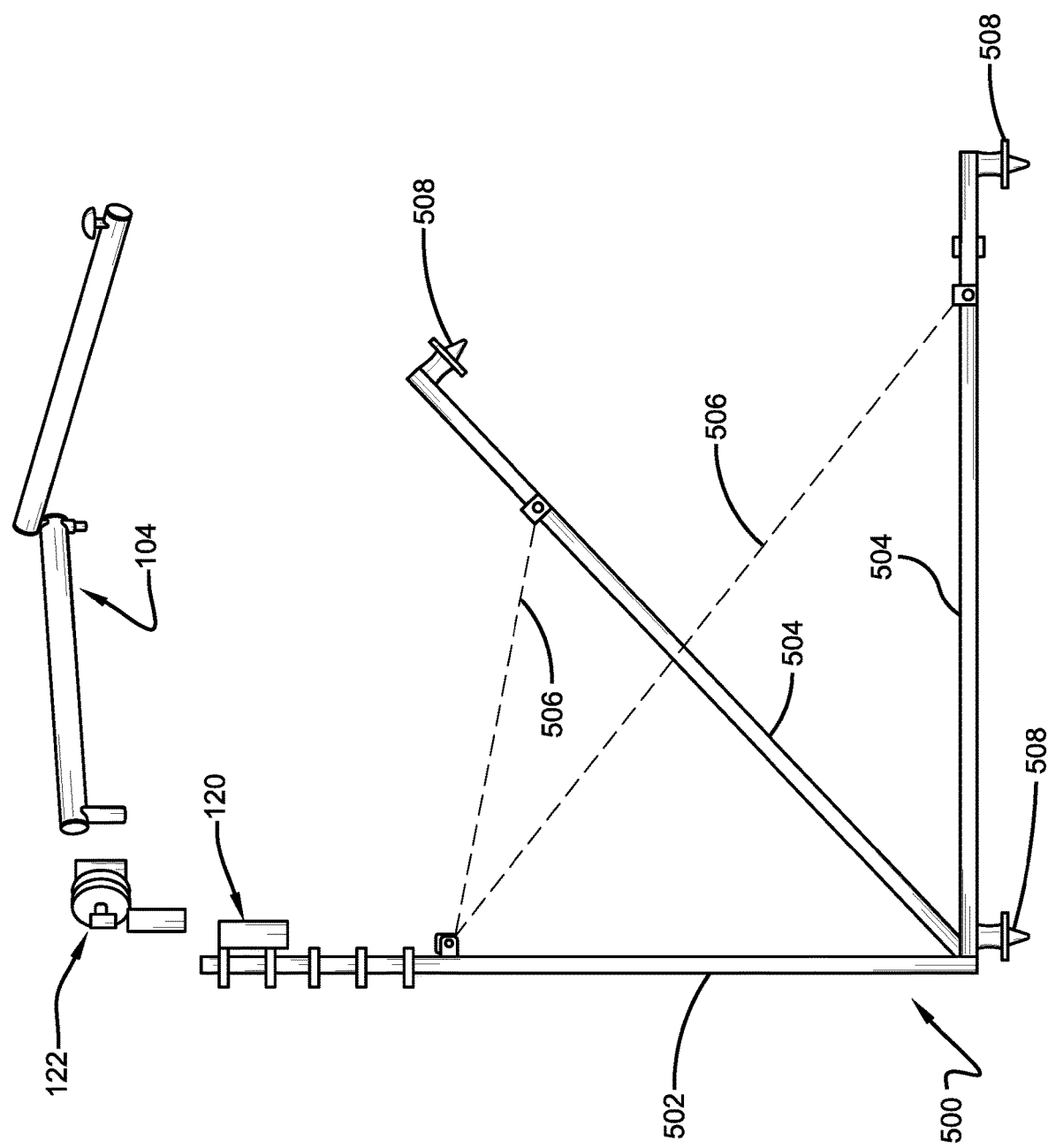
FIG. 62 is perspective view of a floor or ground mount.
Figure 63:
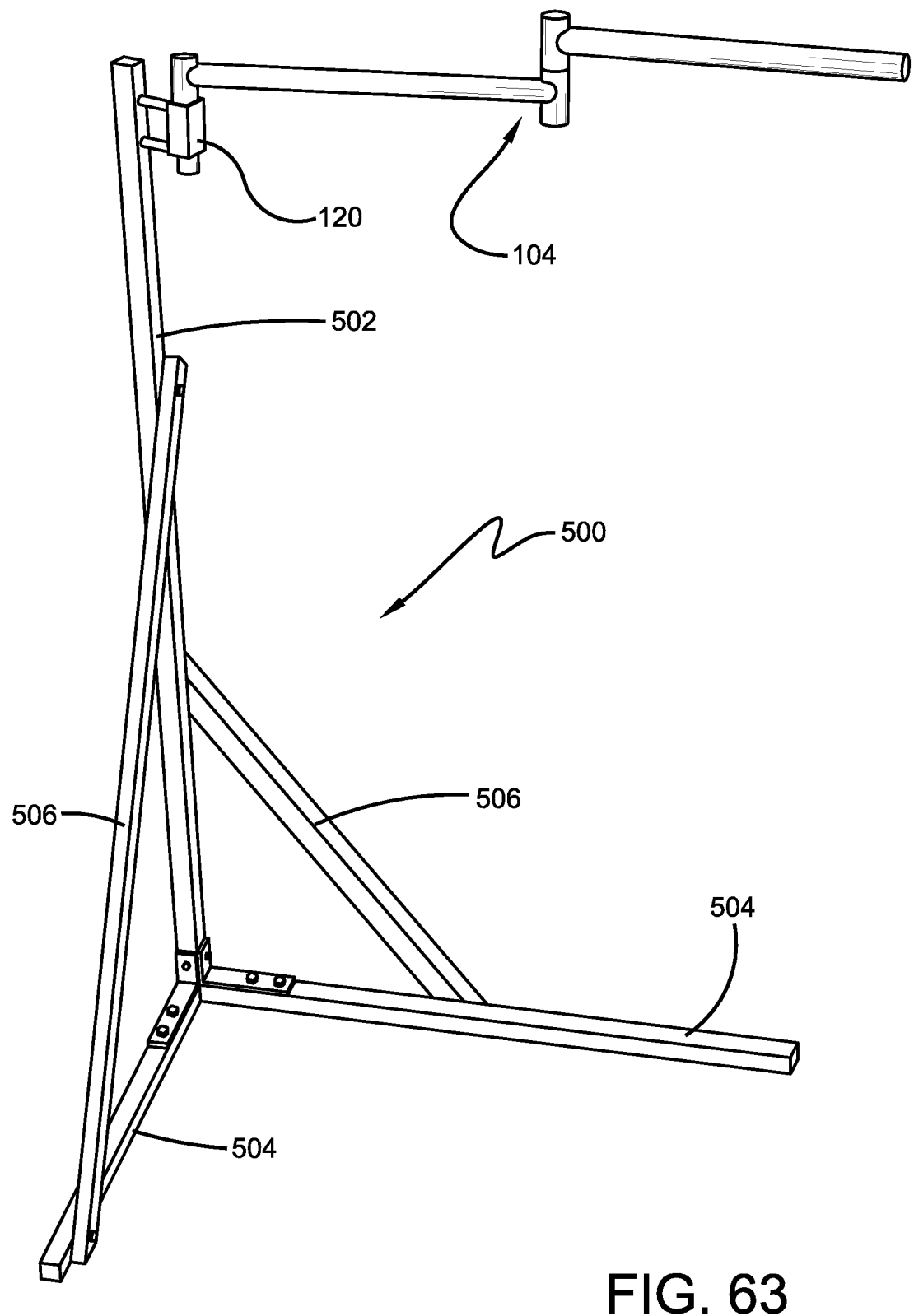
FIG. 63 is a photo of an exemplary floor or ground mount.
Figure 64:
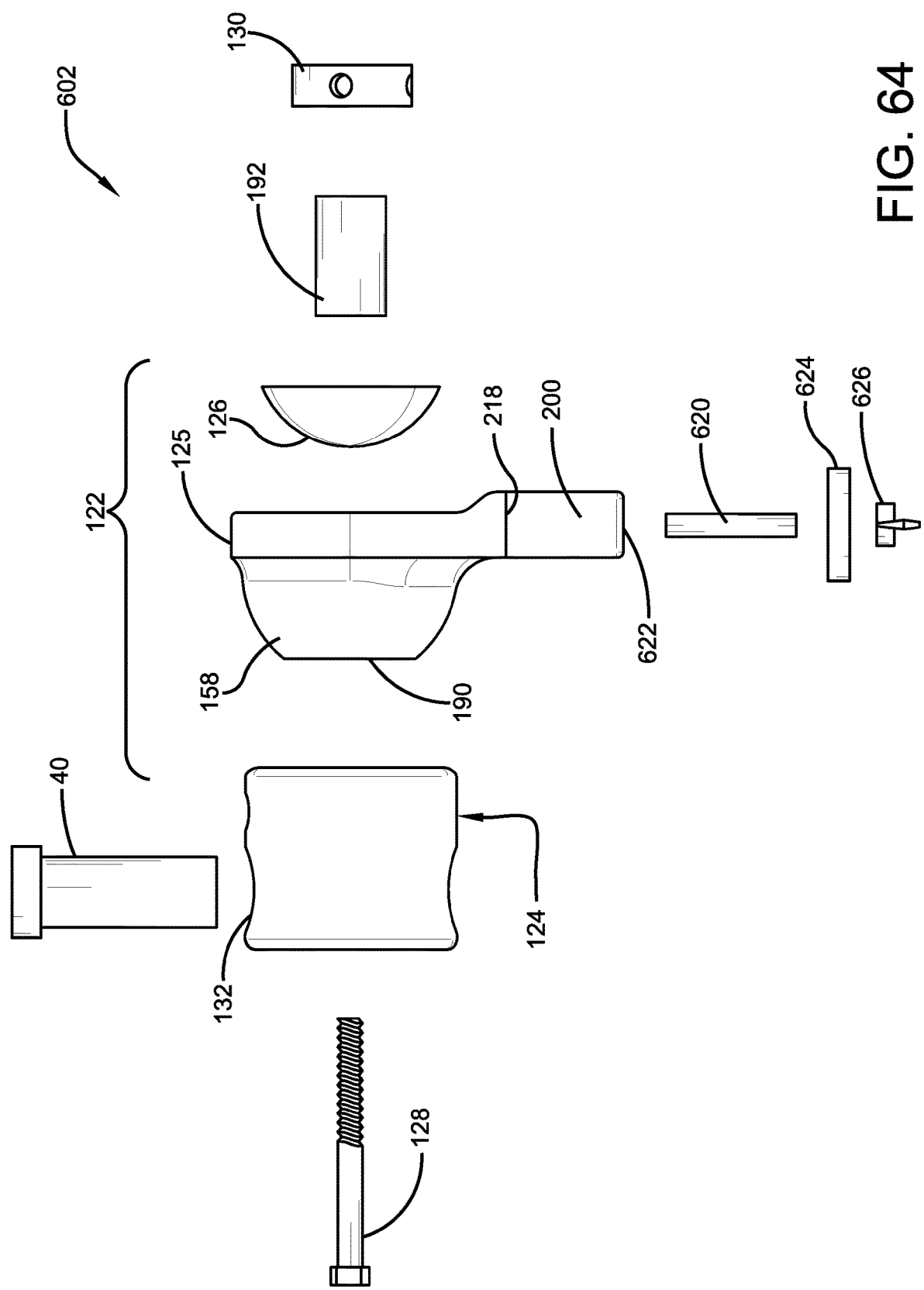
FIG. 64 is an exploded view of the third configuration of the adjustable utility mount.
Figure 65:
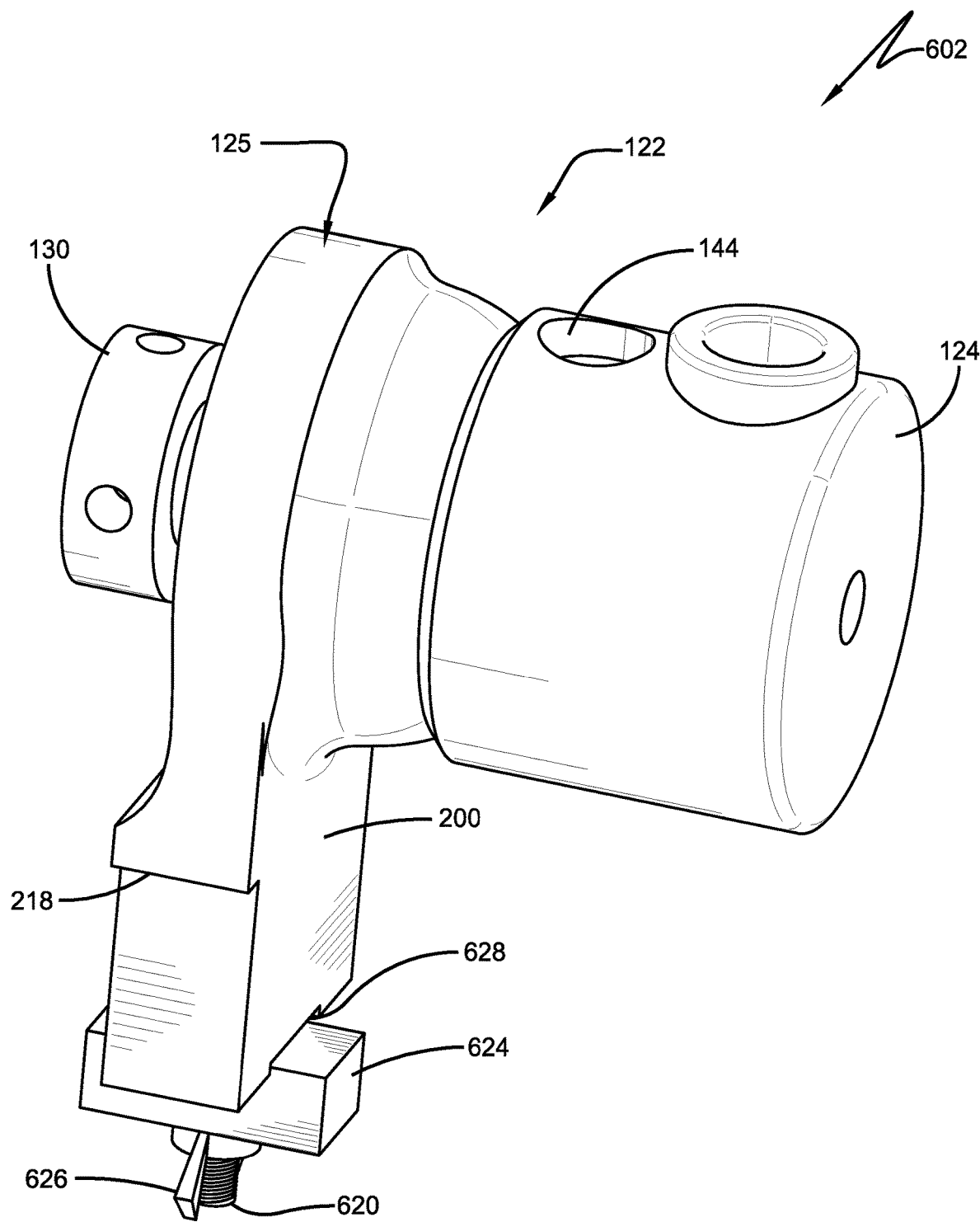
FIG. 65 is a perspective view of a third configuration of the adjustable utility mount.

FIGS. 62-63 depict a floor or ground stand 500 that can be used to mount electronic devices such as cameras. In the embodiment depicted in the drawings, a base mounting bracket 120 is carried near the top of stand 500 so that ball joint 122 and arm 104 can be mounted to stand 500. Stand 500 provides a plurality of mounting locations at different heights for a base mounting bracket 120.

Stand 500 includes a vertical support 502, a pair of legs 504, and angled braces 506 (shown schematically in dashed lines) that form triangular support configurations to hold the position of vertical support 502 upright with respect to legs 504. Braces 506 can be locked in place with pins, bolts, or latches. Each of these items can be provided in a telescoping configuration to allow the length of each to be adjusted as needed. Legs 504 can pivot with respect to vertical support 502 so stand 500 can be collapsed for transport. Locks, latches, or straps can be used to hold stand 500 with legs 504 against vertical support 502. When set up for use, legs 504 can be disposed ninety degrees with respect to each other and about ninety degrees to vertical support 502 which allows stand 500 to be placed at the corner (inner or outer) of a blind where it is out of the way of the hunter. Only arm 104 extends out from or into the corner. This allows a camera to be mounted for hands free operation in a desirable location inside or outside a blind without taking up the floor space required by a tripod. Feet 508 can be provided to allow stand 500 to be driven into the earth or as height adjustments for placing legs 504 on uneven ground.

Figure 66:
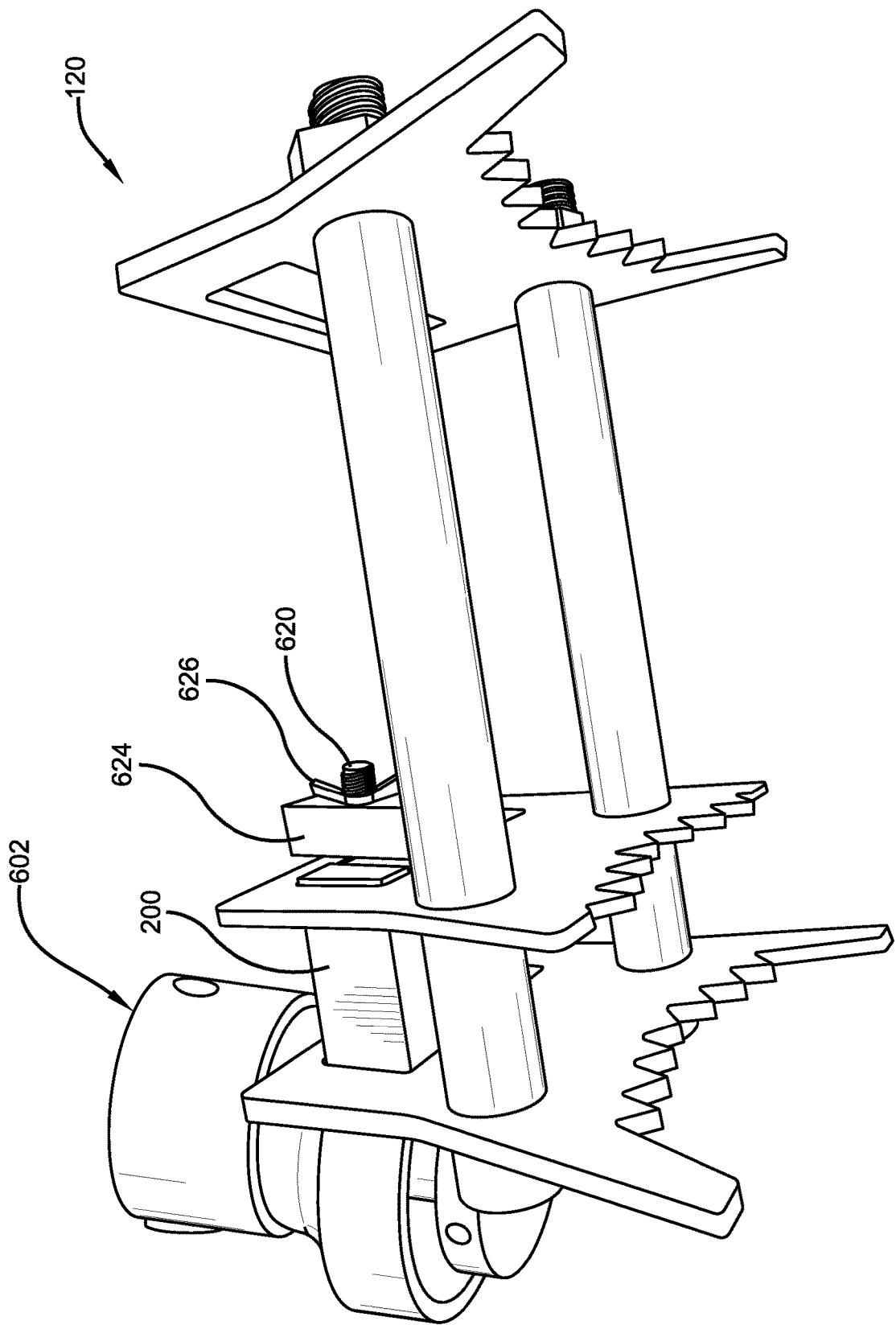
FIG. 66 is a perspective view of the third configuration of the adjustable utility mount secured to the base mounting bracket of FIG. 55.

FIGS. 64-67 depict a third exemplary configuration for the adjustable utility mount which is indicated generally by the reference numeral 602. Adjustable mount 602 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 602. Adjustable utility mount 602 can also be used to support camouflage, used as a gun rest, used as a bow rest, or to support other gear. Adjustable utility mount 602 has some elements that are the same as or substantially similar to the second configuration and the same reference numbers are used to identify these elements. Adjustable utility mount 602 is used, for example, with a base mounting bracket 120 as shown in FIG. 66 or a mount 604 that can be mounted to a flat surface. Adjustable utility mount 602 includes a ball joint 122 having an outer portion 124, a center portion or ball joint cup 125, and an inner portion 126. A clamping bolt 128 extends through outer portion 124, center portion 125, and inner portion 126 and threadedly engages a handle 130 that is used to tighten ball joint 122 to a clamped configuration. An option includes an inner ball joint portion that integrally includes the handle. The adjustability of the ball joint 122 allows base mounting bracket 120 to be mounted to a tree trunk or tree branch or other member that is disposed at essentially any angle and orientation to level because the combination of the ball joint 122 and the manner in mounting base mounting bracket 120 provides a large degree of adjustability for the electronic device 10 that is being carried by mount 102.

In this third exemplary configuration of utility mount 602, outer portion 124 of the ball joint 122 defines an opening 132 configured to directly receive anchor rod 134 of device mount 104 in a sliding and rotating configuration. Alternatively, outer portion 124 can be configured to receive insert 40 described above or an insert 40 that is free of the locking feet. A bubble level 142 can be carried in a recess 144 defined by outer portion 124 to allow the user to determine the position of outer portion 124 with respect to level.

As described above, ball joint 122 of utility mount 602 includes center portion 125 that defines a ball joint cup 158. Ball joint cup 158 has an inner surface that matches the rounded front surface of inner portion 126 of the ball joint. Ball joint cup 158 has an outer surface that matches the inner curved surface of outer portion 124 of the ball joint 122. Ball joint cup 158 defines a large opening 190 that allows clamping bolt 128 and ball joint portions 124 and 126 to be adjusted as defined above.

Inner portion 126 of the ball joint 122 includes a stem 192 that receives handle 130. In the configuration of utility mount 602, stem 192 is a separable from inner portion 126. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the ball joint. The end of stem 192 abuts washer 154 within handle 130. Stem 192 defines a recess 194 that can receive a ridge 96 (as with the first configuration) on handle 130 so that handle 130 can fully rotate about stem 192.

Center portion 125 includes neck 200 that extends down away from ball joint cup 158 to allow center portion to be removably and replaceably (selectively) mounted to base mounting bracket 120 by being received in openings 202. To mount center portion 125, neck 200 is slid down through aligned, spaced openings 202 defined by base mounting bracket 120. Neck 200 can be configured to frictionally engage bracket 120 or be loosely disposed in openings 202 until a clamp is tightened. In this configuration, neck 200 defines shoulders 218 on opposite sides sized to engage bracket 120 to stop neck 200 from moving through openings 202. A threaded rod 620 extends down from the lower end 622 of neck 200. Shoulders 218 position lower end 622 even with or just below the lower surface of intermediate plate 404 in the exemplary configuration (or a lower plate in the configuration of FIG. 67). A clamping block 624 is slidably carried on threaded rod 620 and is pushed up against mounting bracket 120 with a nut 626 such as the wingnut depicted in the drawings. Tightening nut 626 clamps a portion of bracket 120 between neck 200 and clamping block 624 to secure utility mount 602 in place. Lower end wall 622 defines a notch 628 that receives clamping block 624 as shown in FIG. 66 to allow clamping block 624 to engage mounting bracket 120 instead of being clamped against neck 200. Notch 628 has a width that is larger than the width of clamping block 624 and notch 628 extends entirely from front to back of neck 200 with clamping block 624 having a length longer than the thickness of neck 200.

Figure 67:
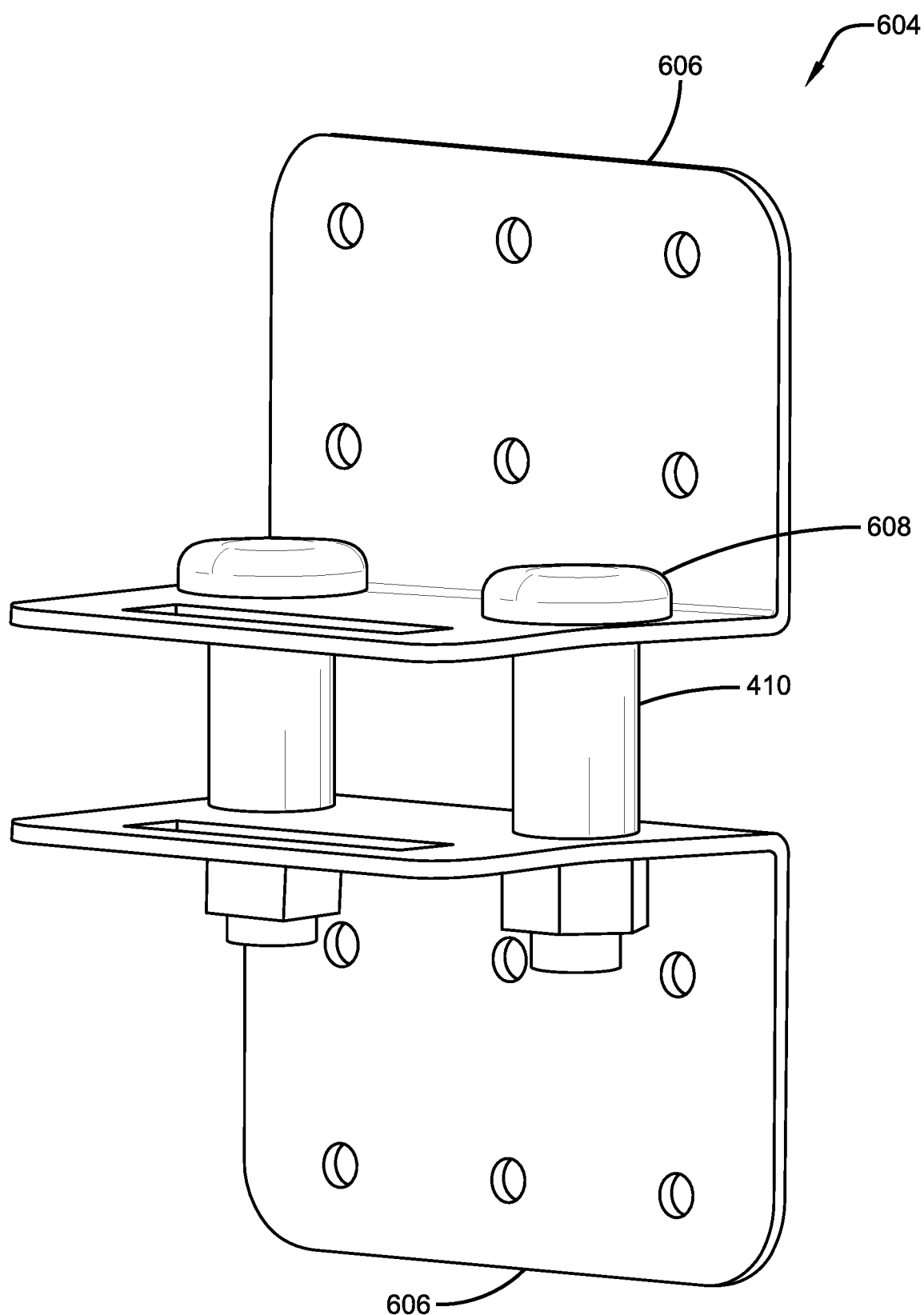
FIG. 67 is a perspective view of an alternate base mounting bracket.
Figure 68:
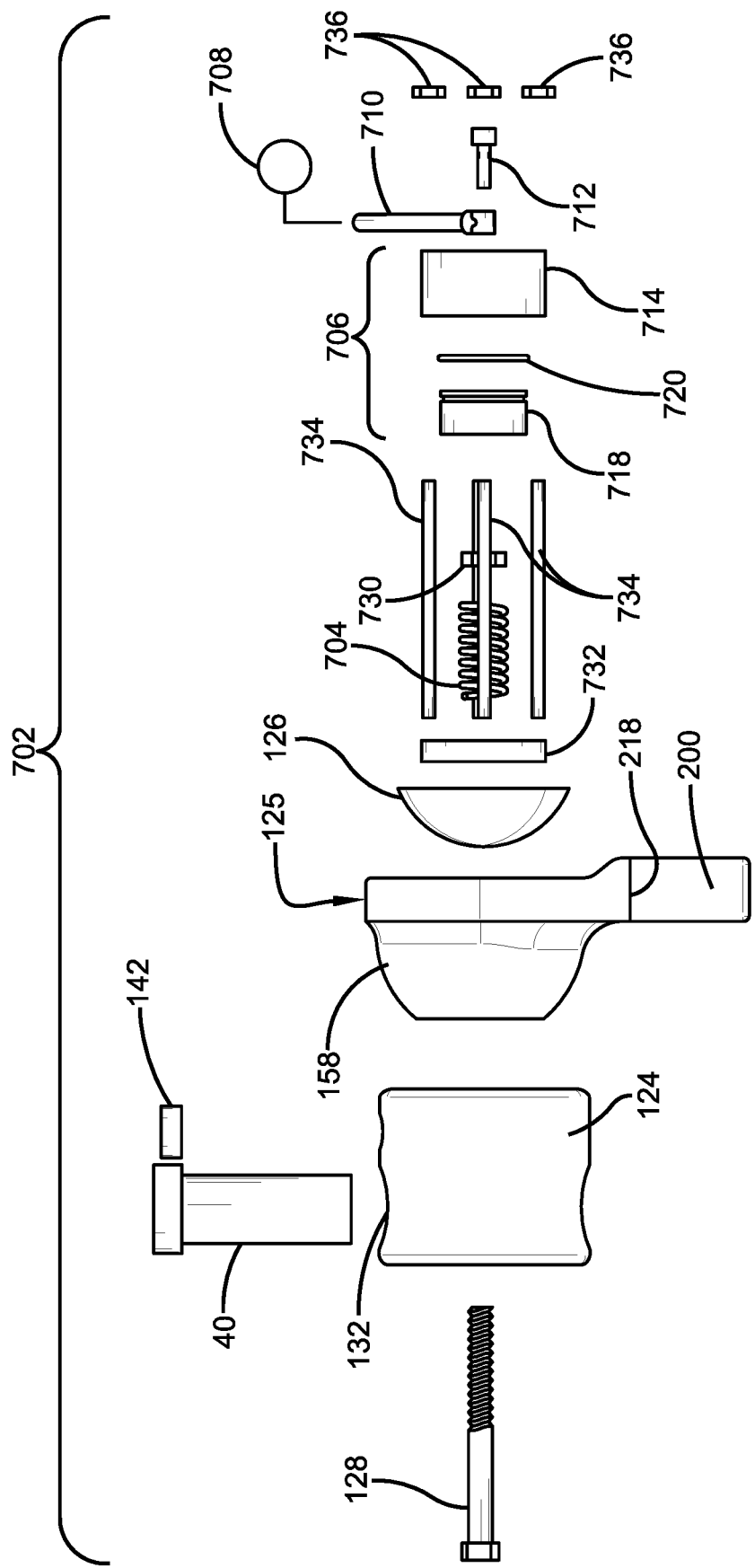
FIG. 68 is an exploded view of the fourth configuration of the adjustable utility mount.
Figure 69:
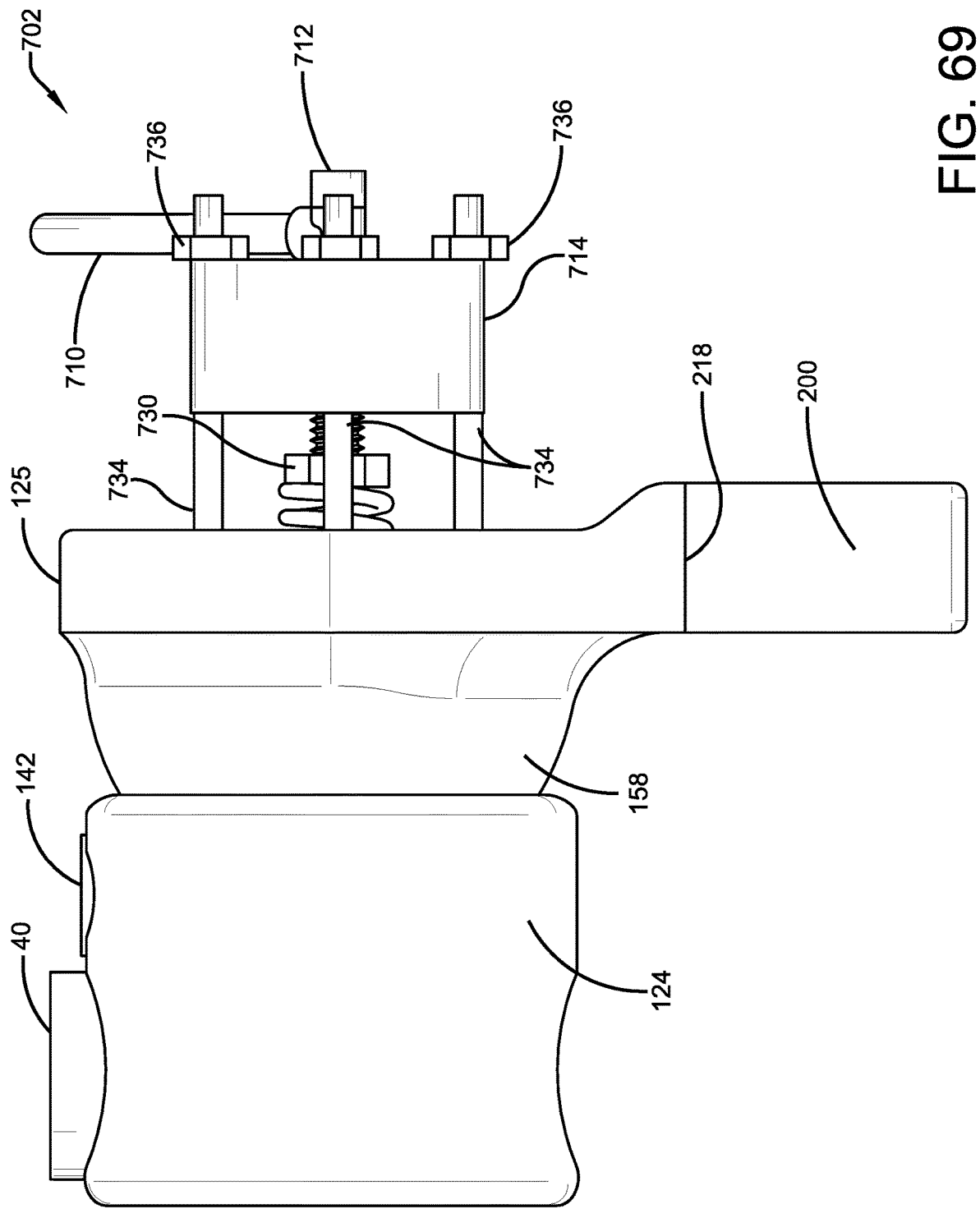
FIG. 69 is a side view of the fourth configuration of the adjustable utility mount.
Figure 70:
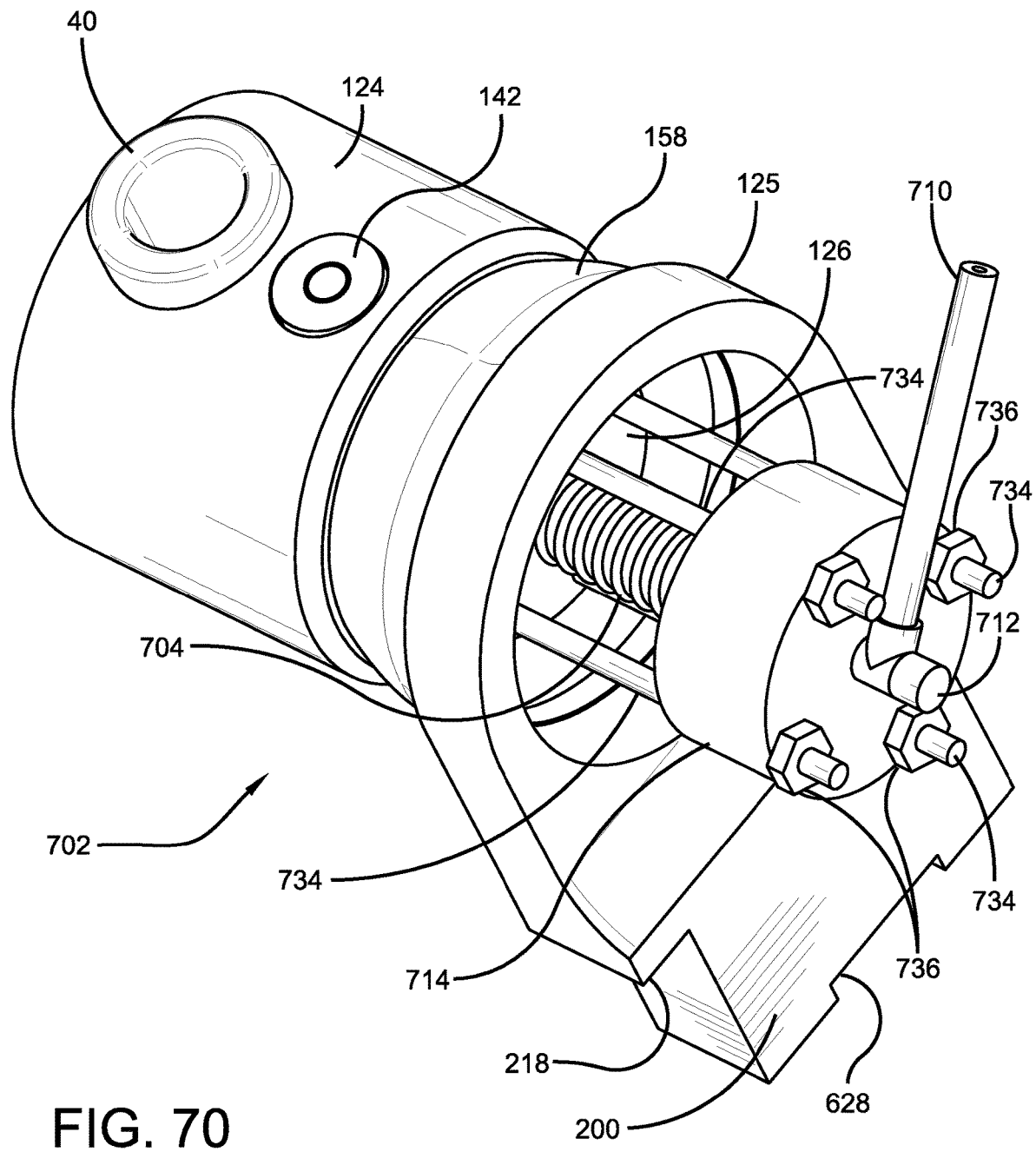
FIG. 70 is a rear perspective view of the fourth configuration of the adjustable utility mount.
Figure 71:
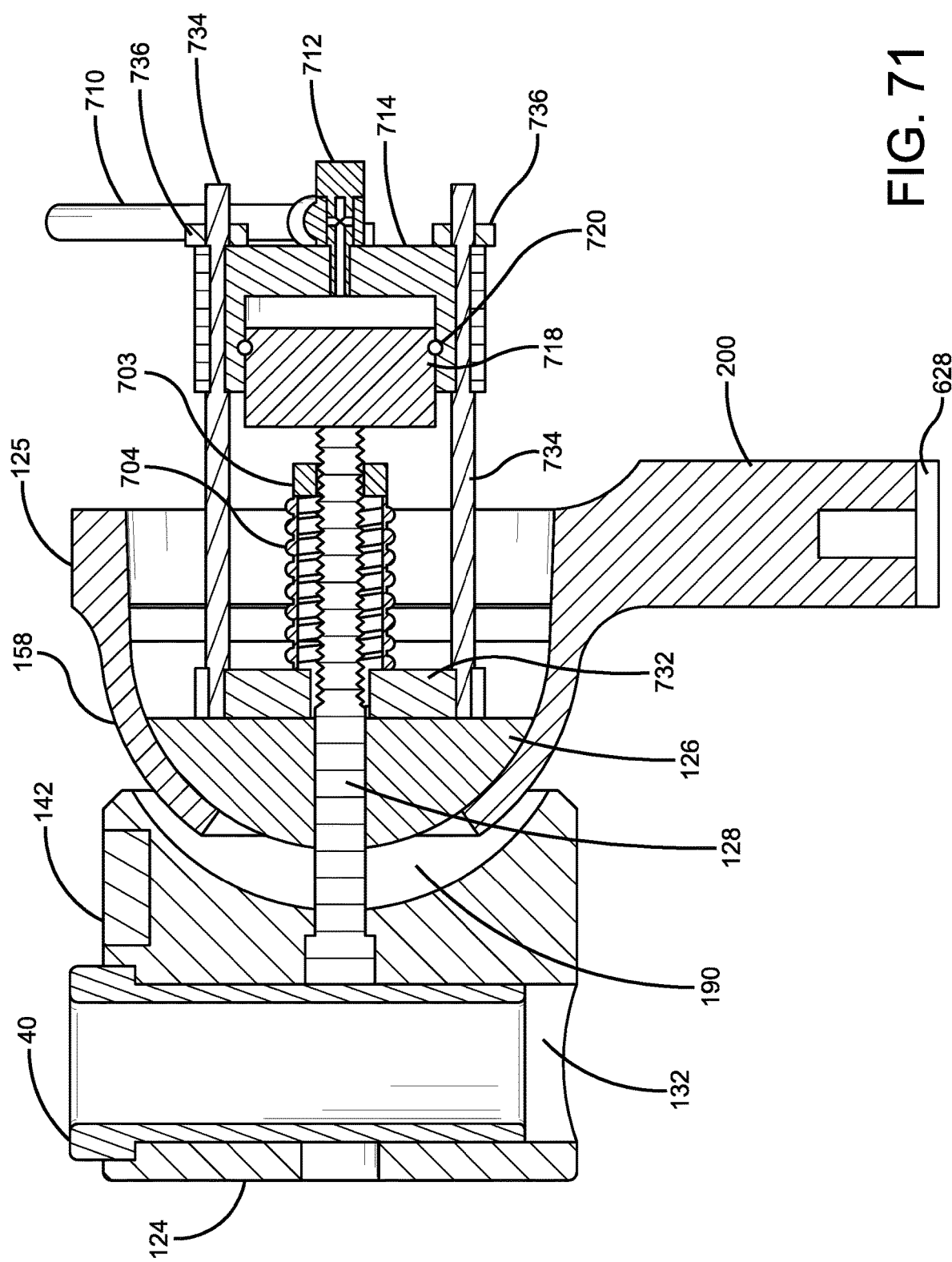
FIG. 71 is a section view of the fourth configuration in an unclamped configuration.

Neck 200 with shoulders 218 functions the same way with mounting bracket 604 shown in FIG. 67. Bracket 604 is configured to be mounted directly to a flat surface with fasteners such as screws. The surface could be the wall of the 2x4 lumber member. Bracket 604 includes two right-angled mounts 606 that each define an opening 202 that are aligned to receive neck 200. Bodies 606 are connected with bolt 608 and tube 410 configurations with tube 410 being based on the length of neck 200 under should 218.

This configuration allows utility mount 602 to be readily mounted to bracket 120 in a quick and quiet manner. Tightening nut 626 can be performed quickly and quietly to secure utility mount 602 in place.

Figure 72:
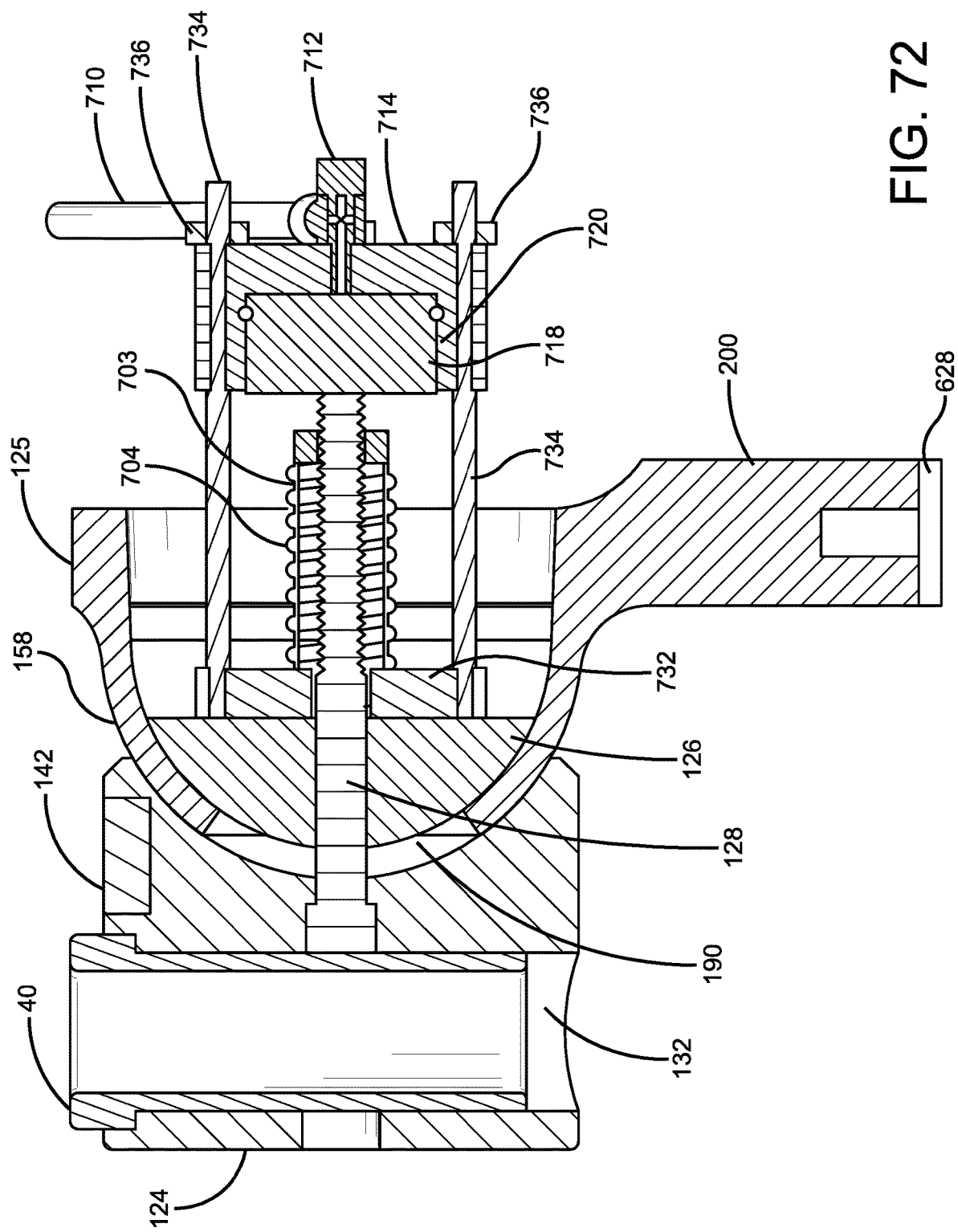
FIG. 72 is a section view of the fourth configuration in a clamped configuration.
Figure 73:
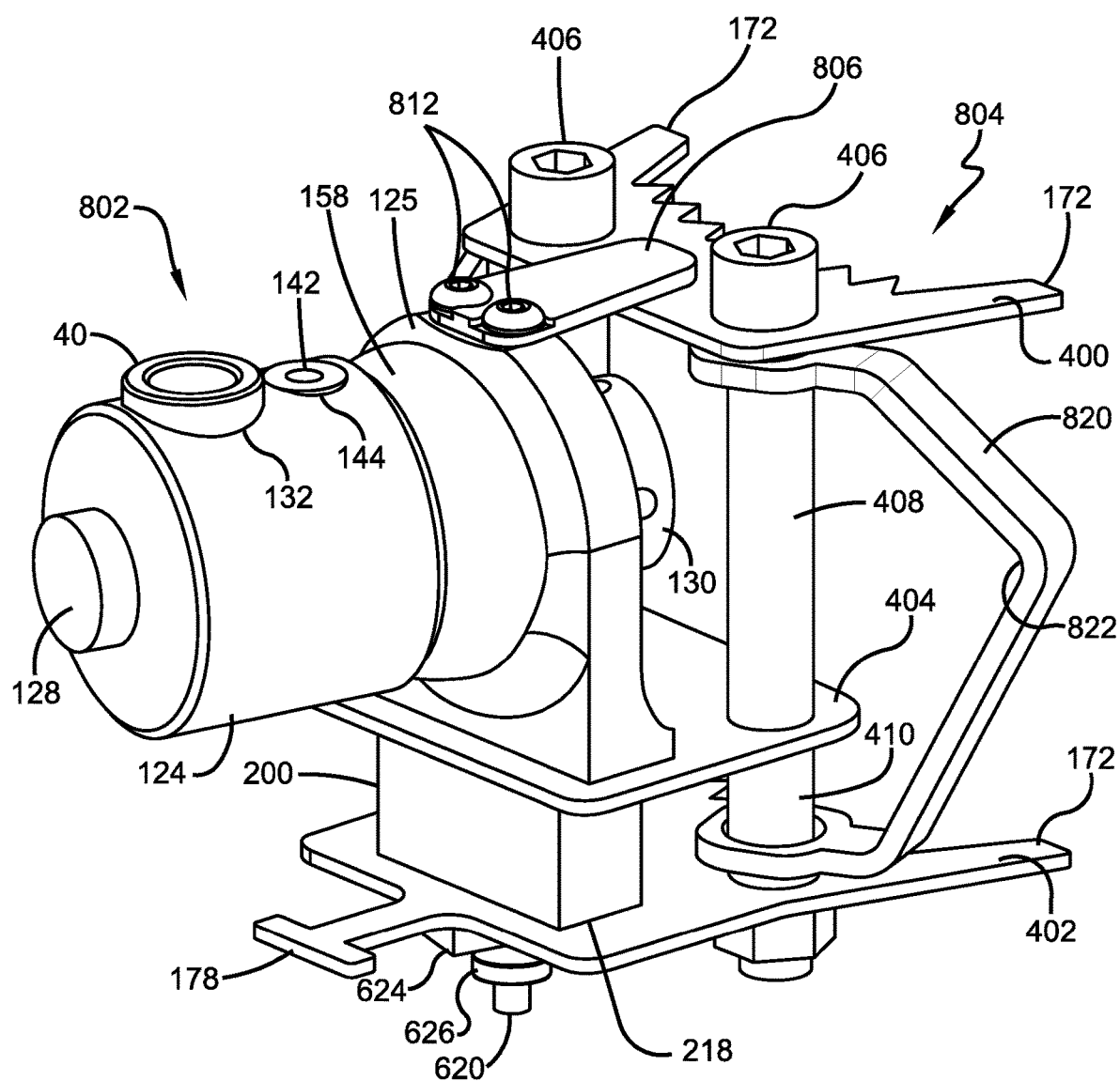
FIG. 73 is a top perspective view of a fifth configuration of the adjustable utility mount secured to a modified base bracket based on the base mounting bracket of FIG. 55.
Figure 74:
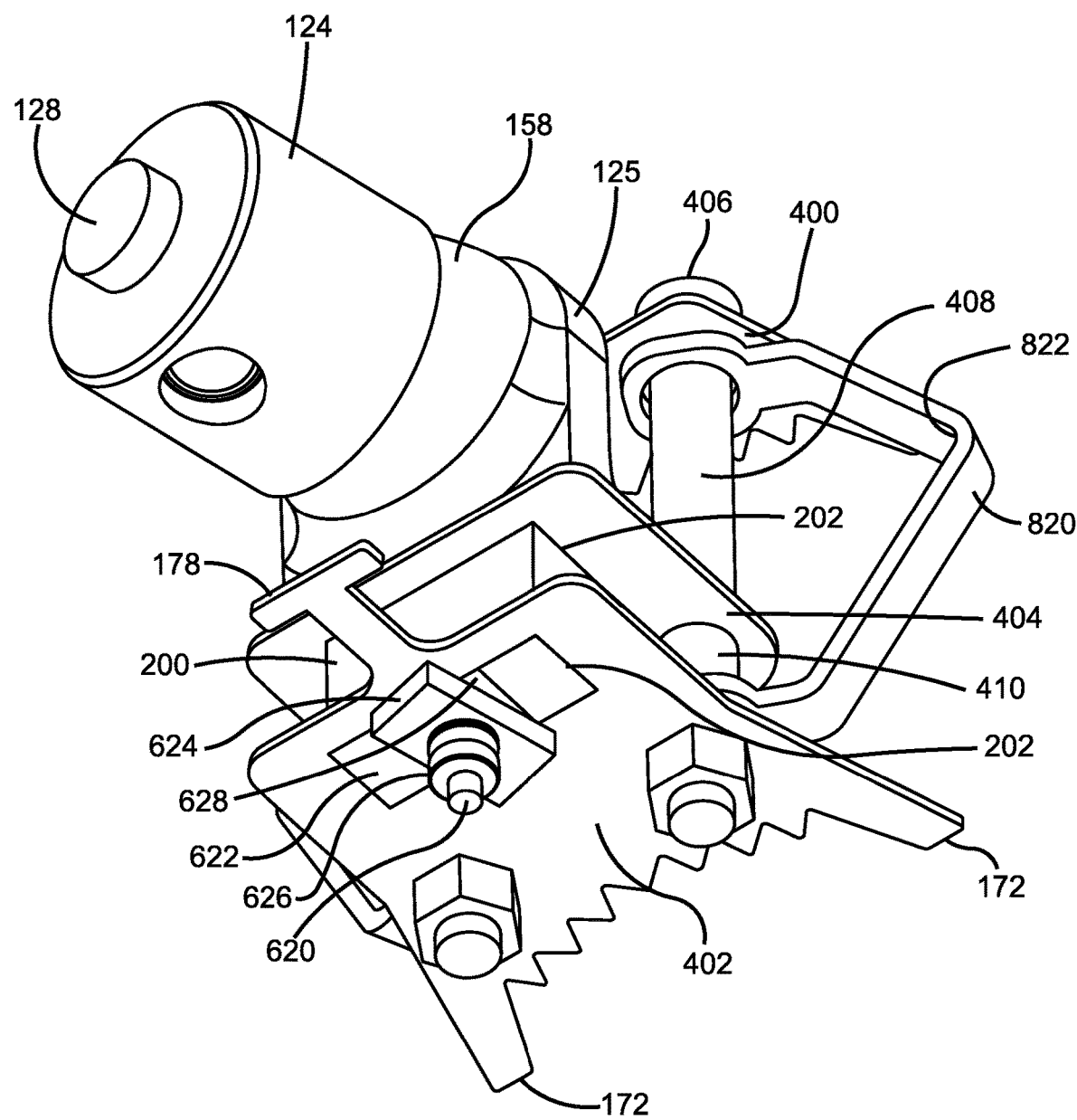
FIG. 74 is a bottom perspective view of the fifth configuration of the adjustable utility mount.
Figure 79:
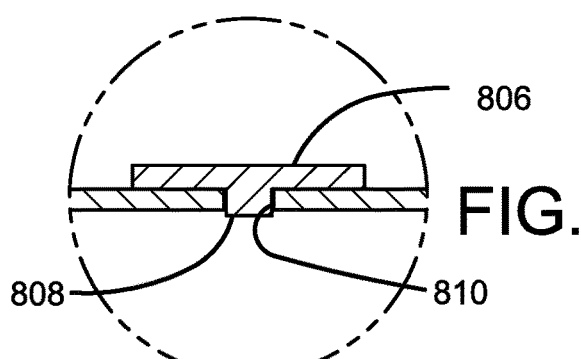
FIG. 79 is a section view taken along line 79-79 of FIG. 75.
Figure 75:
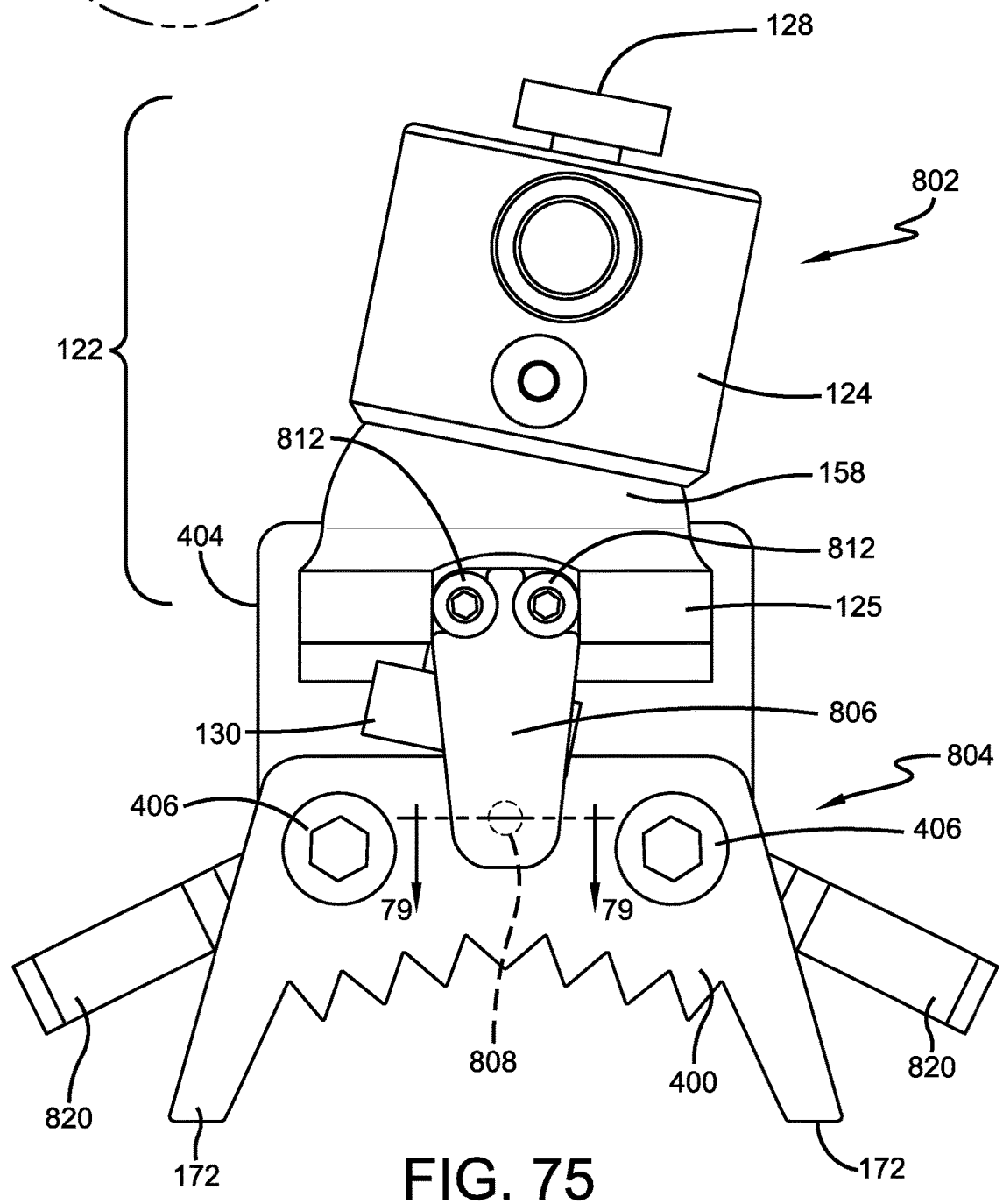
FIG. 75 is a top plan view of mount of FIG. 73.
Figure 76:
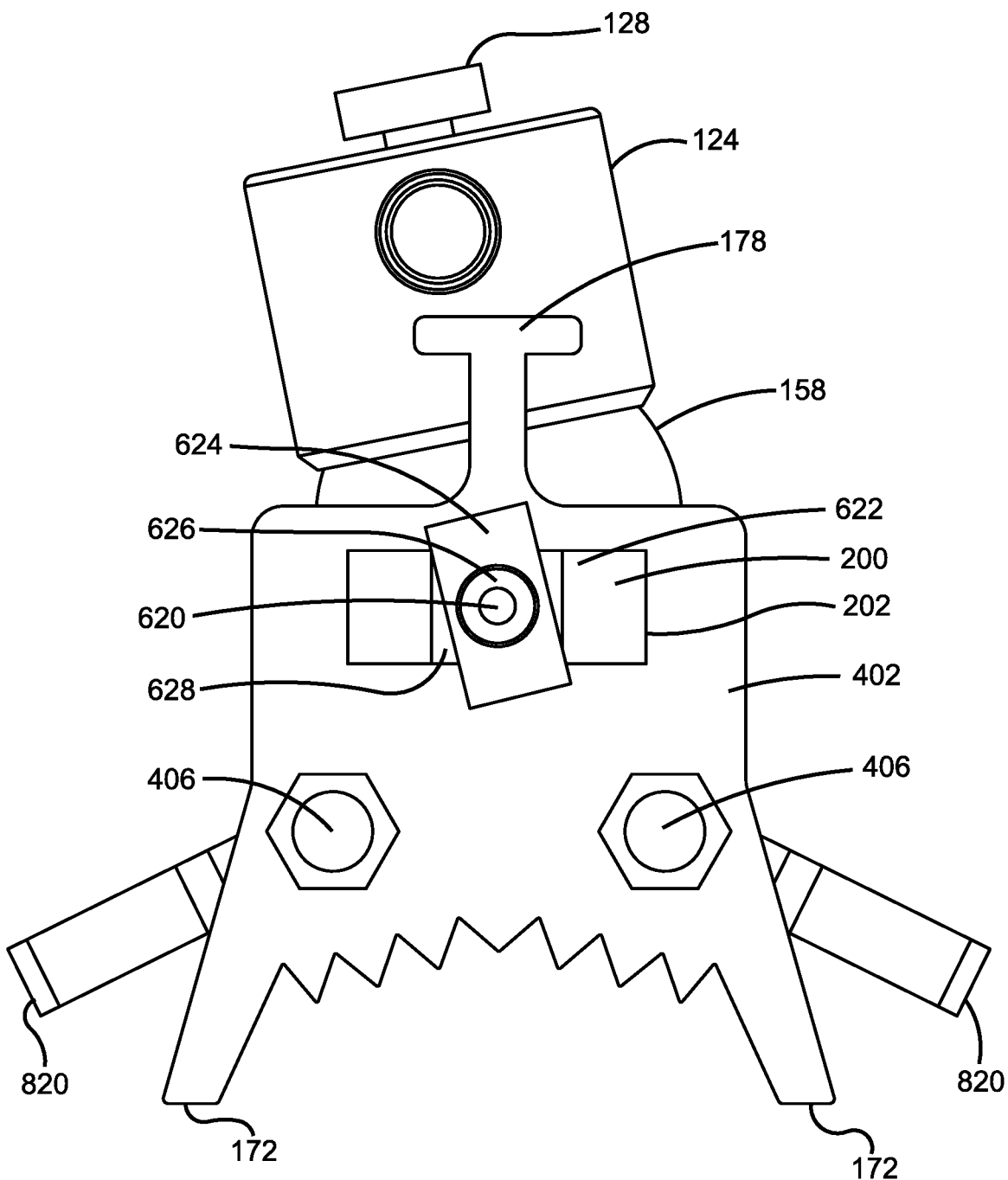
FIG. 76 is a bottom plan view of the mount of FIG. 73.

The fourth configuration of the utility mount is indicated generally by the reference numeral 702 in FIGS. 68-72. The fourth configuration uses a spring 704 to provide the clamping force that holds outer portion 124 of the ball joint in place against center portion 125. In this condition, the clamp member is in a clamped condition. A piston cylinder unit 706 is used to compress spring 704 to allow the user to adjust the position of outer portion 124. When piston cylinder unit 706 compresses spring 704, then outer portion then the clamp member is in the unclamped condition. Unit 706 can be pneumatic or hydraulic. A pump such as a hand-held squeeze bulb 708 or a small electric pump is used to force the fluid through an inlet tube 710 into an adapter 712 which delivers the fluid through the end of cylinder 714 into a fluid chamber defined between a piston 718 and the inside of cylinder 714. A seal 720 is used to seal this chamber. Forcing the fluid into the chamber moves piston to the left in FIG. 71 to compress spring 704 to allow the position of outer portion 124 to be adjusted. When the pressure on the fluid is released, spring 704 forces piston 718 back to the closed position as shown in FIG. 72.

Piston 718 moves bolt 128 on which a nut 730 is carried and threadedly engages. When piston 718 moves, bolt 128 and nut 730 move to compress spring 704. Spring 704 is disposed around bolt 128 and is trapped between nut 730 and a spacer 732 which is connected to inner portion 126 with fasteners or connectors or is integrally formed with inner portion 126. Cylinder 714 is supported on threaded rods 734 which are threaded into spacer 732. Cylinder 714 can slide over rods 734 and be held on rods 734 with nuts 736.

FIGS. 73-79 depict a fifth exemplary configuration for the adjustable utility mount which is indicated generally by the reference numeral 802. Adjustable utility mount 802 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 802. Adjustable utility mount 802 can also be used to support camouflage, used as a gun rest, used as a bow rest, or to support other gear. Adjustable utility mount 802 has some elements that are the same as or substantially similar to the third configuration and the same reference numbers are used to identify these elements. Adjustable utility mount 802 is used, for example, with a base mounting bracket 120 as shown in FIG. 66, a mount 604 (FIG. 67) that can be mounted to a flat surface, or the alternate configuration 804 of base mounting bracket depicted in FIGS. 73-79.

Adjustable utility mount 802 includes a ball joint 122 having an outer portion 124, a center portion or ball joint cup 125, and an inner portion 126. A clamping bolt 128 extends through outer portion 124, center portion 125, and inner portion 126 and threadedly engages a handle 130 that is used to tighten ball joint 122 to a clamped configuration. In this configuration, clamping bolt 128 includes a head that is disposed outside outer portion 124 to allow the user to grip clamping bolt 128 with his hand. An option includes an inner ball joint portion 126 that integrally includes the handle 130. The adjustability of the ball joint 122 allows base mounting bracket 120, 604, or 804 to be mounted to a tree trunk or tree branch or other member that is disposed at essentially any angle and orientation to level because the combination of the ball joint 122 and the manner in mounting base mounting bracket 120, 604, or 804 provides a large degree of adjustability for the electronic device 10 that is being carried by mount 802.

In this fifth exemplary configuration of utility mount 802, outer portion 124 of the ball joint 122 defines an opening 132 configured to directly receive anchor rod 134 of device mount 104 in a sliding and rotating configuration. Alternatively, outer portion 124 can be configured to receive insert 40 described above or an insert 40 that is free of the locking feet. A bubble level 142 can be carried in a recess 144 defined by outer portion 124 to allow the user to determine the position of outer portion 124 with respect to level.

As described above, ball joint 122 of utility mount 802 includes center portion 125 that defines a ball joint cup 158. Ball joint cup 158 has an inner surface that is engaged by the front surface of inner portion 126 of the ball joint. These surfaces may complement each other to increase the surface contact area between the two. For example, both can be flat or curved. Ball joint cup 158 has an outer surface that matches the inner curved surface of outer portion 124 of ball joint 122. Ball joint cup 158 defines a large opening 190 that allows clamping bolt 128 and ball joint portions 124 and 126 to be adjusted as defined above.

Inner portion 126 of the ball joint 122 includes a stem 192 that receives handle 130. In the configuration of utility mount 802, stem 192 is a separable from inner portion 126. In other configurations, stem 192 can be integral with inner portion 126 or handle 130. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the position of ball joint 122.

Center portion 125 includes a top end and a neck 200 that extends down away from a lower end of ball joint cup 158 to allow center portion 125 to be removably and replaceably (selectively) mounted to base mounting bracket 120, 604, or 804 by being received in aligned openings 202. To mount center portion 125, neck 200 is slid down through aligned, spaced openings 202 defined by base mounting bracket 120, 604, or 804. Neck 200 can be configured to frictionally engage bracket 120, 604, or 804 or be loosely disposed in openings 202 until a clamp is tightened. In this configuration, neck 200 defines shoulders 218 on opposite sides sized to engage bracket 120, 604, or 804 to stop neck 200 from moving through openings 202. A threaded rod 620 extends down from the lower end 622 of neck 200. Shoulders 218 position lower end 622 even with or just below the lower surface of the lower plate. A clamping block 624 is slidably carried on threaded rod 620 and is pushed up against mounting bracket 120, 604, or 804 with a nut 626 such as the round nut depicted in the drawings. Tightening nut 626 clamps a portion or portions of bracket 120, 604, or 804 between neck 200 and clamping block 624 to secure utility mount 602 in place. Lower end wall 622 defines a notch 628 that receives clamping block 624 as shown in FIG. 66 to allow clamping block 624 to engage mounting bracket 120, 604, or 804 instead of being clamped against neck 200. Notch 628 has a width that is larger than the width of clamping block 624 and notch 628 extends entirely from front to back of neck 200 with clamping block 624 having a length longer than the thickness of neck 200.

A locking arm 806 is connected to the top end of center portion 125 and extends rearwardly above the upper portion of base mounting bracket 804. Locking arm 806 includes a locking finger 808 (see FIG. 79) that is slid into a locking opening 810 (see FIG. 79) defined by base mounting bracket 804 when neck 200 is slid into openings 202. The distance between the lower surface of locking arm 806 and shoulder 218 is thus the same as the distance between the top surface of intermediate plate 404 and the top surface of upper end plate 400. Locking arm 806 stabilizes utility mount 802 with respect to base mounting bracket 804. Locking arm 806 can be integrally connected to center portion 125 or connected with another connection that does not allow locking arm 806 to pivot with respect to center portion 125. A pair of spaced threaded connectors 812 are used in the exemplary configuration.

Like base mounting bracket 120, base mounting bracket 804 is assembled by the user from components that can be shipped in a small flat container. In this configuration, base mounting bracket 804 includes upper 400 and lower 402 mounts in the form of end plates that each include spaced legs 172. Mounts can be provided in a variety of shapes and configurations. In the exemplary configuration, mounts 400 and 402 are in the form of flat plates which allows base mounting bracket to be stored in a flat configuration and transported in a compact configuration. Base mounting bracket 120 also includes an intermediate plate 404 that is positioned between upper 400 and lower 402 end plates. In this configuration, lower end plate 402 and intermediate plate 404 define aligned openings 202 that receive the neck 200 of the ball joint center portion 125. Upper end plate 400 is disposed level with the top of center portion 125 so that locking arm 806 rests on top of upper end plate 400 with locking finger 808 being disposed in opening 810 defined by upper end plate 400.

Plates 400, 402, and 404 are assembled to form base mounting bracket 804 with a plurality of connectors 406 and tubes 408 and 410. Tubes 408 and 410 function as spacers for plates 400, 402, and 404 while connectors 406 are disposed through tubes 408 and 410 to clamp the plates 400, 402, and 404 against and between tubes 408 and 410. Connectors 406 can be bolt and nut combinations. In the exemplary configuration, four tubes are used to define base mounting bracket 120 with tubes 410 being shorter than tubes 408. For example, tubes 408 can each be half inch to nine long and tubes 410 can each be zero (not used) to six inches long. In the exemplary configuration, tubes 410 are about one inch long and tubes 408 are about three inches long. For example, each bolt 406 can be four inches to ten inches long. Bolt 406 can be a half inch with 13 thread. Each tube 408 and 410 defines a through hole that receives the bolt portion of 406. Each plate 400, 402, and 404 defines holes 414 large enough for the bolts and smaller than the outer diameter of the tubes 408 and 410 so that each tube 408 and 410 abuts the plates. Tightening connectors 406 to clamp the plates onto the tubes creates base mounting bracket 804.

End plates 400 and 402 define toothed inset portions so that they can grip a tree trunk or branch. Lower plate 402 defines cleat 178 or one or a plurality of T-shaped hooks on which gear can be hung in a manner similar to hook 98.

Figure 77:
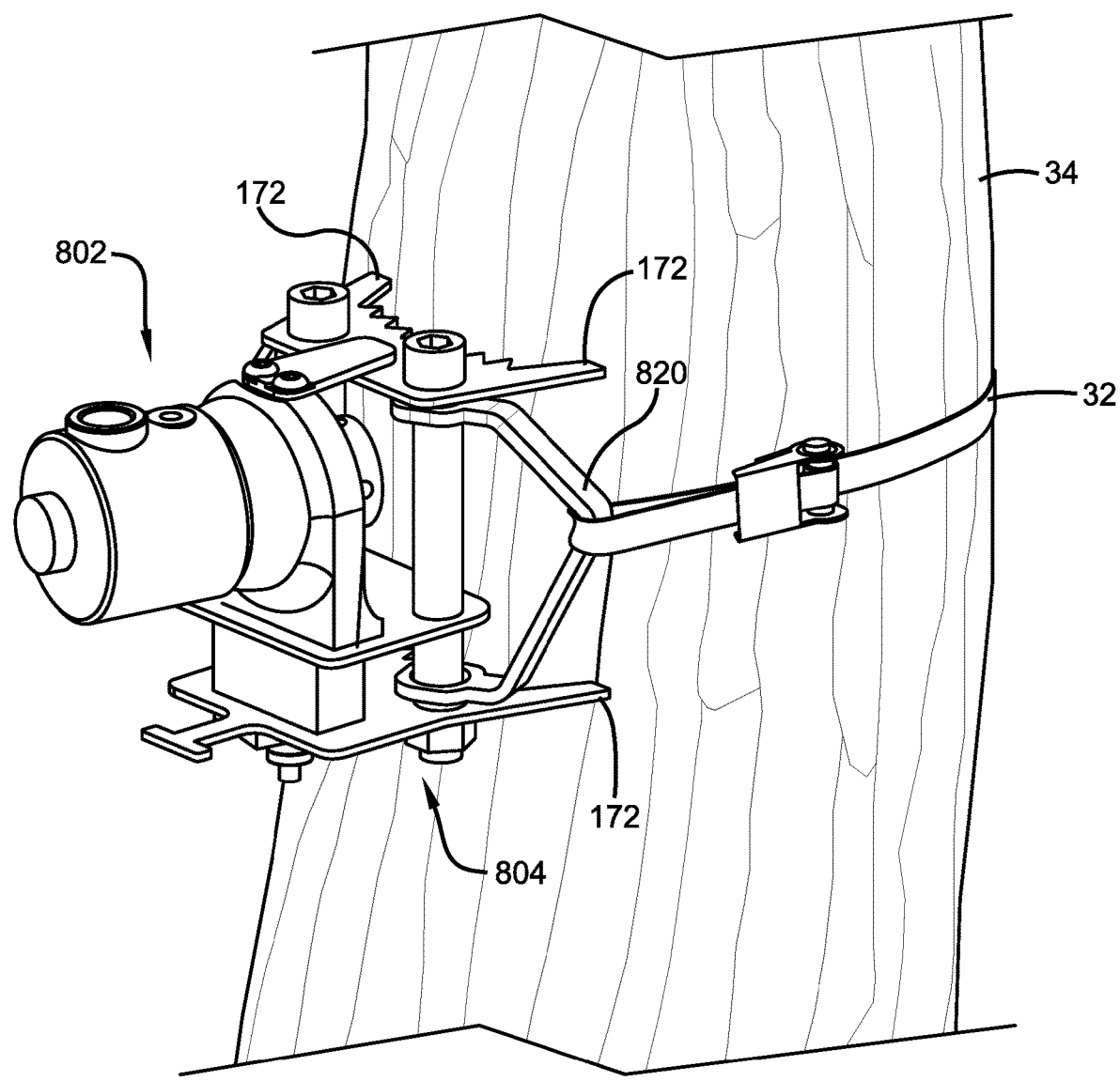
FIG. 77 is a perspective view of the fifth configuration of the adjustable utility mount secured to a tree.
Figure 78:
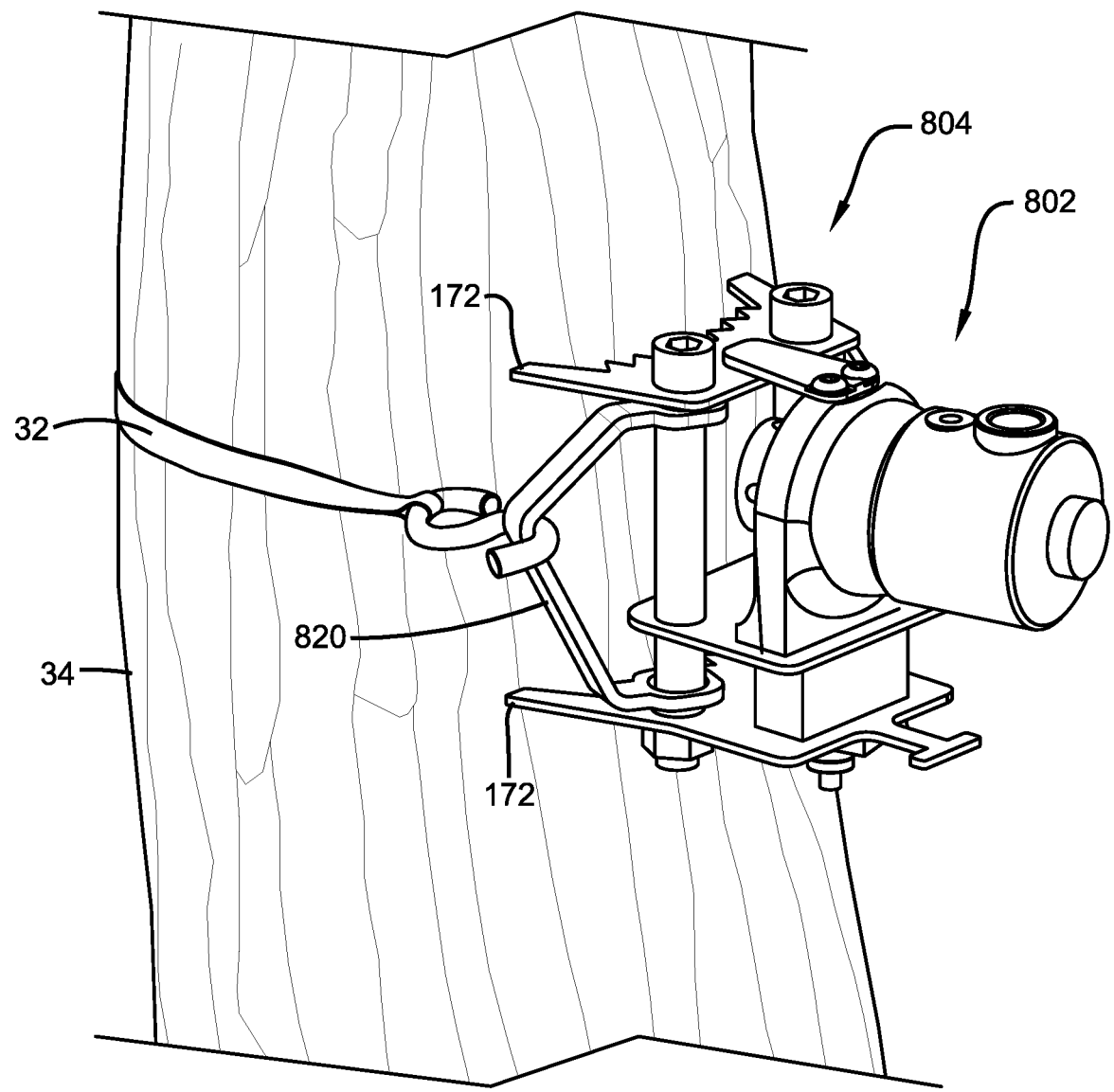
FIG. 78 is another perspective view of the fifth configuration of the adjustable utility mount secured to a tree.

A pair of strap mounts 820 are carried by one or a combination of tubes 408 and 410. In the exemplary configuration, each strap mount 820 is connected at one end to tube 408 and at a second end to tube 410. Strap 32 is connected to strap mounts 820 to secure base mounting bracket 804 to a structure such as tree 34. Strap mounts 820 pivot to a position aligned with the angle of strap 32 when strap 32 is tightened. One end of strap 32 shown in FIG. 77 is wrapped around mount 820 and held with a buckle or a ratchet. The other end of strap 32 can be connected to the other mount 820 with a hook as shown in FIG. 78. This allows strap 32 to be quickly connected to base mounting bracket 804. Each strap mount 820 has opposed ends with openings that are larger than the outer dimension of tubes 408 and 410 so that mount 820 pivots about tubes 408 and 410. Between the ends, each mount 820 defines a corner 822 wherein strap 32 settles when it is tightened.

This configuration allows the base mounting bracket 804 to be packaged and shipped in a flat configuration and allows it to be inexpensive so that the user can position multiple base mounting brackets 804 for use with ball joint 122.

Figure 80:
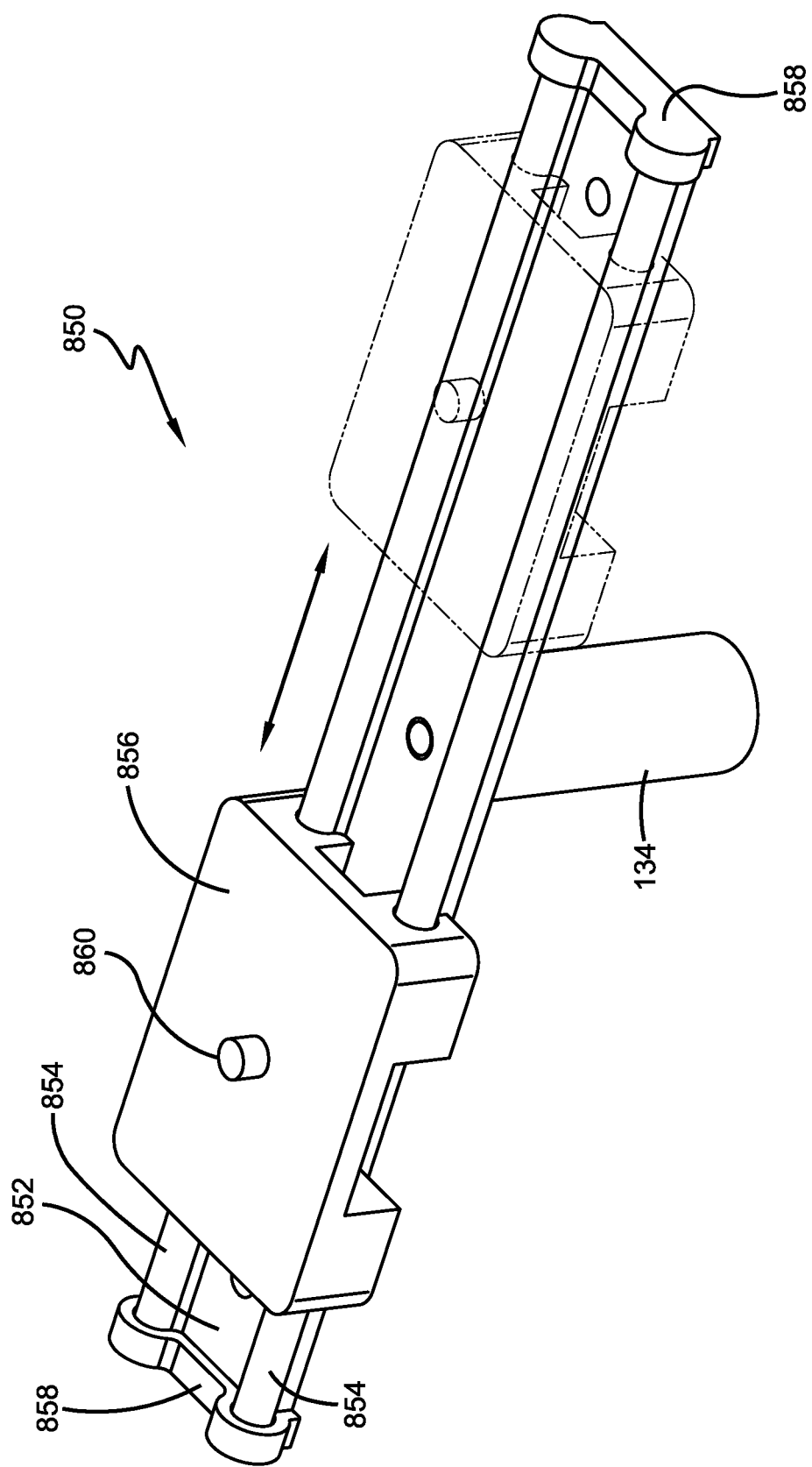
FIG. 80 is a perspective view of a sliding mount that can be supported by the adjustable utility mount.
Figure 81:
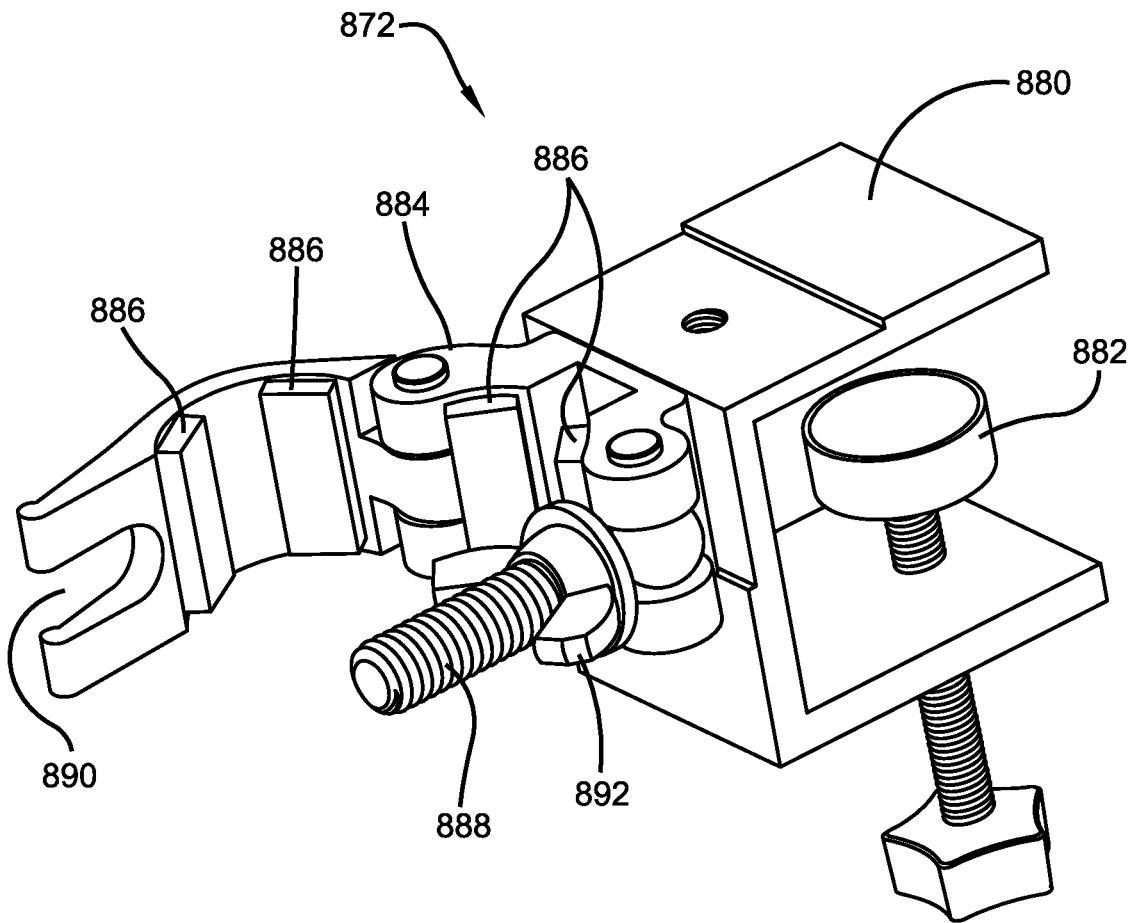
FIG. 81 is a perspective view of a monopod clamp.

Another exemplary device mount 850 is depicted in FIG. 80. Device mount 850 includes a base 852 with a pair of spaced rails 854. A mounting block 856 is carried on rails 854 and can be slid between a first end and a second end of base 852. The position of mounting block 856 can be locked at any position along base 852 between the first and second ends. End caps 858 are secured to base 852 and prevent mounting block 856 from sliding off the ends of base 852. A threaded locking screw extends through mounting block 856 to engage a rail 854. When tightened, the screw locks the position of mounting block 856. A finger-thumb twist handle is carried on the locking screw to allow the user to manually unlock the position of mounting block 856, adjust the position, and re-lock mounting block 856 in its new position. Mounting block 856 includes a threaded connector 860 used to mount standard cameras. The user can mount a camera on mounting block 856 or can mount another accessory such as a gun rest, a spotting scope, a motion sensor, or a light. An anchor rod 134 extends from the bottom of base 852 to allow device mount 850 to be carried by insert 40.

Figure 82:
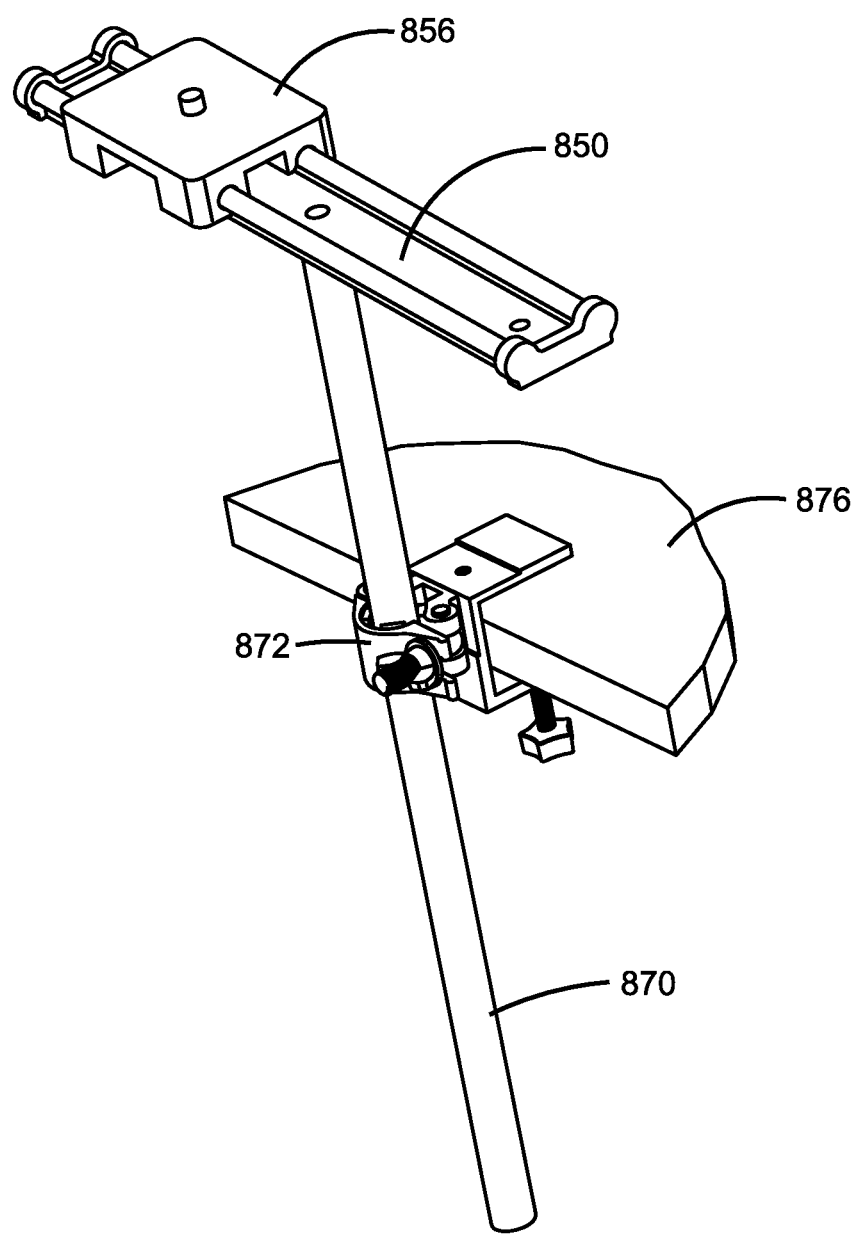
FIG. 82 is a perspective view of the sliding mount carried by a monopod which is mounted to a horizontal member with the monopod clamp of FIG. 81.

Device mount 850 is carried on the top of a monopod 870 in FIG. 82. Monopod 870 is, itself, carried by a monopod mount 872 which is secured to a structure such as the shelf 876 depicted in FIG. 82. Monopod mount 872 can be secured at a variety of locations along the length of monopod 870 to allow the height of monopod 870 to be readily adjusted.

Monopod mount 872 includes a U-clamp 880 that fits around the object to which monopod 870 is being mounted. A threaded fastener 882 is used to secure U-clamp 880 to structure 876. Monopod mount 872 also includes an adjustable, openable gripping clamp 884 disposed at a right angle to U-clamp such that monopod 870 will be disposed vertical when U-clamp 880 is secured to a horizontal shelf 876. Clamp 884 includes a plurality of compressible pads 886 that grip the outer surface of monopod 870 when gripping clamp 884 is closed around monopod 870. Clamp 884 has a first fixed portion that is secured to U-clamp 880 and a second portion that pivots between open and closed positions. A threaded fastener 888 is pivotably carried by the first portion such that it is received in a slot 890 defined by the second portion when the second portion is closed. A nut 892 is used to tighten the second portion against monopod 870.

Figure 83:
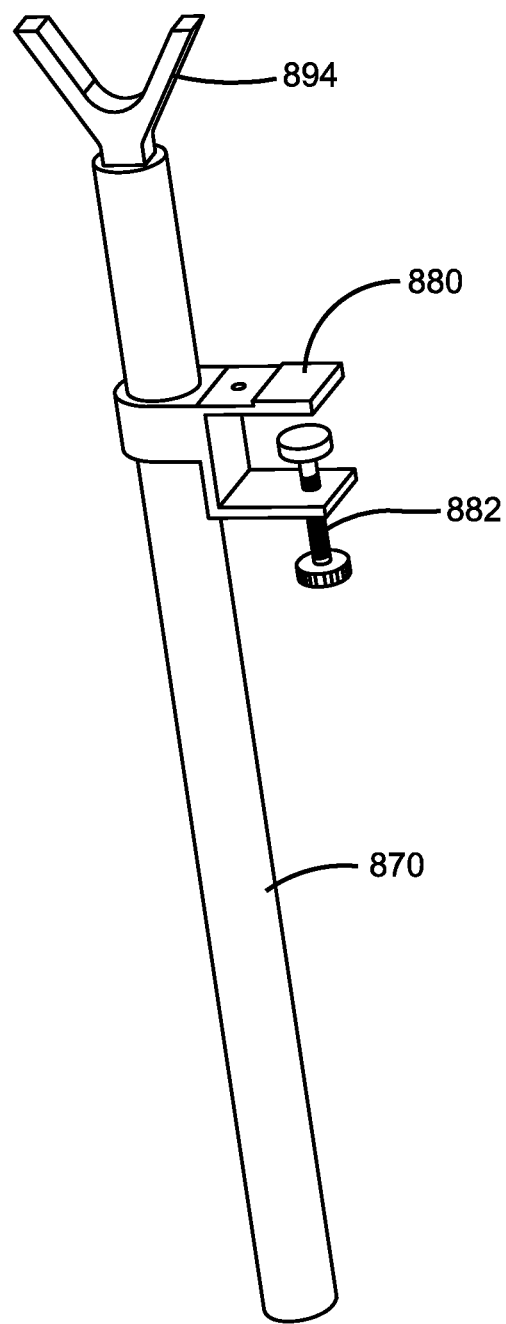
FIG. 83 is a perspective view of a gun rest.

FIG. 83 depicts Y-shaped gun rest 894 carried at the top of monopod 870. In this configuration, monopod 870 is mounted with U-clamp 880 that can be slid up and down along monopod 870 and secured with a set screw.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A device mount assembly for supporting a device from a stable structure; the assembly comprising:
   a selectively collapsible base mounting bracket and a mounting strap; the mounting strap adapted to wrap around a portion of the stable structure to secure the base mounting bracket to the stable structure;
   the base mounting bracket including a first mount and a second mount; the first mount defining an opening;
   a ball joint assembly selectively mountable to the base mounting bracket; the ball joint assembly including a ball joint cup supported by a ball joint body;
   the ball joint body disposed in the opening of the first mount;
   a locking arm connecting the ball joint assembly to the second mount;
   the ball joint assembly also including a clamp and device mount holder assembly having a portion that extends through the ball joint cup;
   the clamp and device mount holder assembly having a clamped configuration and an unclamped configuration; the position of the clamp and device mount holder assembly being adjustable with respect to the ball joint cup in the unclamped configuration; and
   the ball joint cup defining an opening that is larger than the portion of the clamp and device mount assembly disposed through the opening such that clamp and device mount assembly swivels with respect to the ball joint cup when the clamp member is in the unclamped configuration.

2. The assembly of claim 1, wherein the first and second mounts are spaced apart by tubes with a connector disposed through each tube.

3. The assembly of claim 2, wherein the base mounting bracket includes a pair of movable strap mounts adapted to be connected to the strap; the movable strap mounts being carried on the tubes.

4. The assembly of claim 1, further comprising a base clamp carried by the ball joint body; the base clamp being configurable between an unclamped configuration and a clamped configuration; the base clamp engaging the base mounting bracket to secure the ball joint assembly to the base mounting bracket.

5. The assembly of claim 4, wherein the ball joint body includes an end wall that defines a notch, a portion of the base clamp being disposed in the notch when the base clamp is in the clamped configuration.

6. A mount assembly comprising:
   a base mounting bracket adapted to be secured to stable structure at a first location;
   the base mounting bracket including a first mount;
   a ball joint assembly selectively mountable to the base mounting bracket; the ball joint assembly including a ball joint cup supported by a ball joint body;
   the ball joint body removably connected to the first mount;
   a locking arm having a first portion connected to the ball joint assembly and a second portion connected to the base mounting bracket;
   the ball joint assembly also including a clamp and device mount holder assembly having a portion that extends through the ball joint cup;
   the clamp and device mount holder assembly having a clamped configuration and an unclamped configuration; the position of the clamp and device mount holder assembly being adjustable with respect to the ball joint cup in the unclamped configuration; and
   the ball joint cup defining an opening that is larger than the portion of the clamp and device mount assembly disposed through the opening such that clamp and device mount assembly swivels with respect to the ball joint cup when the clamp member is in the unclamped configuration.

7. The assembly of claim 6, wherein the first mount defines an opening; the ball joint body being disposed in the opening defined by the first mount.

8. The assembly of claim 7, further comprising a base clamp carried by the ball joint body; the base clamp being configurable between an unclamped configuration and a clamped configuration; the base clamp engaging the base mounting bracket to secure the ball joint body to the base mounting bracket.

9. The assembly of claim 8, wherein the ball joint body includes an end wall that defines a notch, a portion of the base clamp being aligned with the notch when the base clamp is in the clamped configuration.

10. The mount assembly of claim 6, wherein the base mounting bracket is collapsible to a storage condition.

11. The mount of claim 6, further comprising a mounting strap; the mounting strap adapted to wrap around a portion of the stable structure to secure the base mounting bracket to the stable structure.

12. The assembly of claim 6 wherein clamp and device mount holder assembly also being fully rotatable about its axis when in the unclamped configuration.

13. The mount of claim 6 wherein the clamp and device mount holder assembly is hydraulically operated.

14. The mount of claim 6, wherein the base mounting bracket includes a second mount spaced from the first mount; the first and second mounts being spaced by a pair of selectively removable tubes; a connector securing each tube to the first and second mounts.

15. The assembly of claim 6, wherein the base mounting bracket includes spaced legs.

* * * * *